United States Patent
Eryurek et al.

(10) Patent No.: US 7,079,984 B2
(45) Date of Patent: Jul. 18, 2006

(54) ABNORMAL SITUATION PREVENTION IN A PROCESS PLANT

(75) Inventors: Evren Eryurek, Edina, MN (US); Kadir Kavaklioglu, Eden Prairie, MN (US); John P. Miller, Eden Prairie, MN (US)

(73) Assignee: Fisher-Rosemount Systems, Inc., Austin, TX (US)

( * ) Notice: Subject to any disclaimer, the term of this patent is extended or adjusted under 35 U.S.C. 154(b) by 0 days.

(21) Appl. No.: 10/971,361

(22) Filed: Oct. 22, 2004

(65) Prior Publication Data

US 2005/0197803 A1 Sep. 8, 2005

Related U.S. Application Data

(60) Provisional application No. 60/549,796, filed on Mar. 3, 2004.

(51) Int. Cl.
*G06F 11/00* (2006.01)

(52) U.S. Cl. .......................... 702/185; 700/1

(58) Field of Classification Search ............... 702/185, 702/182–184; 700/1; 709/236; 370/232, 370/469
See application file for complete search history.

(56) References Cited

U.S. PATENT DOCUMENTS

| | | |
|---|---|---|
| 4,527,271 A | 7/1985 | Hallee et al. |
| 4,607,325 A | 8/1986 | Horn |
| 4,657,179 A | 4/1987 | Aggers et al. |
| 4,734,873 A | 3/1988 | Malloy et al. |
| 4,763,243 A | 8/1988 | Barlow et al. |
| 4,764,862 A | 8/1988 | Barlow et al. |
| 4,853,175 A | 8/1989 | Book, Sr. |
| 4,885,694 A | 12/1989 | Pray et al. |
| 4,907,167 A | 3/1990 | Skeirik |
| 4,910,691 A | 3/1990 | Skeirik |
| 4,944,035 A | 7/1990 | Aagardl et al. |
| 4,956,793 A | 9/1990 | Bonne et al. |
| 4,965,742 A | 10/1990 | Skeirik |
| 5,006,992 A | 4/1991 | Skeirik |
| 5,008,810 A | 4/1991 | Kessel et al. |
| 5,015,934 A | 5/1991 | Holley et al. |
| 5,018,215 A | 5/1991 | Nasr et al. |
| 5,043,863 A | 8/1991 | Bristol et al. |

(Continued)

FOREIGN PATENT DOCUMENTS

EP 0 612 039 A3 8/1994

(Continued)

OTHER PUBLICATIONS

Wernwe Kalkhoff, "Agent-Oriented Robot Task Transformation", Proceedings of the International Symposium on Intelligent Control, IEEE, pp. 242-247 (Aug. 27, 1995).

(Continued)

*Primary Examiner*—Edward Raymond
(74) *Attorney, Agent, or Firm*—Marshall, Gerstein & Borun LLP

(57) ABSTRACT

A system detects abnormal conditions associated with a process plant. The system receives signal processing data generated by signal processing data collection blocks implemented by a plurality of devices. The signal processing data collection blocks may generate data such as statistical data, frequency analysis data, auto regression data, wavelets data, etc. The system includes an analysis engine configured to detect at least one abnormal condition associated with the process plant. The signal processing data is provided to the analysis engine, and the analysis engine determines if an action should be taken.

41 Claims, 37 Drawing Sheets

U.S. PATENT DOCUMENTS

| | | |
|---|---|---|
| 5,050,095 A | 9/1991 | Samad |
| 5,070,458 A | 12/1991 | Gilmore et al. |
| 5,121,467 A | 6/1992 | Skeirik |
| 5,134,574 A | 7/1992 | Beaverstock et al. |
| 5,140,530 A | 8/1992 | Guha et al. |
| 5,142,612 A | 8/1992 | Skeirik |
| 5,161,013 A | 11/1992 | Rylander et al. |
| 5,167,009 A | 11/1992 | Skeirik |
| 5,187,674 A | 2/1993 | Bonne |
| 5,189,232 A | 2/1993 | Shabtai et al. |
| 5,193,143 A | 3/1993 | Kaemmerer et al. |
| 5,197,114 A | 3/1993 | Skeirik |
| 5,212,765 A | 5/1993 | Skeirik |
| 5,224,203 A | 6/1993 | Skeirik |
| 5,282,261 A | 1/1994 | Skeirik |
| 5,291,190 A | 3/1994 | Scarola et al. |
| 5,301,101 A | 4/1994 | MacArthur et al. |
| 5,311,447 A | 5/1994 | Bonne |
| 5,311,562 A | 5/1994 | Palusamy et al. |
| 5,325,522 A | 6/1994 | Vaughn |
| 5,333,298 A | 7/1994 | Bland et al. |
| 5,351,184 A | 9/1994 | Lu et al. |
| 5,353,207 A | 10/1994 | Keeler et al. |
| 5,369,599 A | 11/1994 | Sadjadi et al. |
| 5,373,452 A | 12/1994 | Guha |
| 5,384,698 A | 1/1995 | Jelinek |
| 5,390,326 A | 2/1995 | Shah |
| 5,396,415 A | 3/1995 | Konar et al. |
| 5,398,303 A | 3/1995 | Tanaka |
| 5,408,406 A | 4/1995 | Mathur et al. |
| 5,442,544 A | 8/1995 | Jelinek |
| 5,461,570 A | 10/1995 | Wang et al. |
| 5,486,920 A | 1/1996 | Killpatrick et al. |
| 5,486,996 A | 1/1996 | Samad et al. |
| 5,488,697 A | 1/1996 | Kaemmerer et al. |
| 5,499,188 A | 3/1996 | Kline, Jr. et al. |
| 5,504,863 A | 4/1996 | Yoshida |
| 5,521,842 A | 5/1996 | Yamoda |
| 5,533,413 A | 7/1996 | Kobayashi et al. |
| 5,537,310 A | 7/1996 | Tanake et al. |
| 5,541,833 A | 7/1996 | Bristol et al. |
| 5,546,301 A | 8/1996 | Agrawal et al. |
| 5,559,690 A | 9/1996 | Keeler et al. |
| 5,561,599 A | 10/1996 | Lu |
| 5,566,065 A | 10/1996 | Hansen et al. |
| 5,570,282 A | 10/1996 | Hansen et al. |
| 5,572,420 A | 11/1996 | Lu |
| 5,574,638 A | 11/1996 | Lu |
| 5,596,704 A | 1/1997 | Geddes et al. |
| 5,640,491 A | 6/1997 | Bhat et al. |
| 5,640,493 A | 6/1997 | Skeirik |
| 5,666,297 A | 9/1997 | Britt et al. |
| 5,680,409 A | 10/1997 | Qin et al. |
| 5,687,090 A | 11/1997 | Chen et al. |
| 5,692,158 A | 11/1997 | Degeneff et al. |
| 5,704,011 A | 12/1997 | Hansen et al. |
| 5,715,158 A | 2/1998 | Chen |
| 5,729,661 A | 3/1998 | Keeler et al. |
| 5,740,324 A | 4/1998 | Mathur et al. |
| 5,742,513 A | 4/1998 | Bouhenguel et al. |
| 5,761,518 A | 6/1998 | Boehling et al. |
| 5,764,891 A | 6/1998 | Warrior |
| 5,768,119 A | 6/1998 | Havekost et al. |
| 5,777,872 A | 7/1998 | He |
| 5,781,432 A | 7/1998 | Keeler et al. |
| 5,790,898 A | 8/1998 | Kishima et al. |
| 5,796,609 A | 8/1998 | Tao et al. |
| 5,798,939 A | 8/1998 | Ochoa et al. |
| 5,805,442 A | 9/1998 | Crater et al. |
| 5,809,490 A | 9/1998 | Guiver et al. |
| 5,812,394 A | 9/1998 | Lewis et al. |
| 5,819,050 A | 10/1998 | Boehling et al. |
| 5,819,232 A | 10/1998 | Shipman |
| 5,825,645 A | 10/1998 | Konar et al. |
| 5,826,249 A | 10/1998 | Skeirik |
| 5,842,189 A | 11/1998 | Keeler et al. |
| 5,847,952 A | 12/1998 | Samad |
| 5,859,773 A | 1/1999 | Keeler et al. |
| 5,859,964 A | 1/1999 | Wang et al. |
| 5,877,954 A | 3/1999 | Klimasauskas et al. |
| 5,892,679 A | 4/1999 | He |
| 5,892,939 A | 4/1999 | Call et al. |
| 5,898,869 A | 4/1999 | Anderson |
| 5,901,058 A | 5/1999 | Steinman et al. |
| 5,903,455 A | 5/1999 | Sharpe, Jr. et al. |
| 5,905,989 A | 5/1999 | Biggs |
| 5,907,701 A | 5/1999 | Hanson |
| 5,909,370 A | 6/1999 | Lynch |
| 5,909,541 A | 6/1999 | Sampson et al. |
| 5,909,586 A | 6/1999 | Anderson |
| 5,914,875 A | 6/1999 | Monta et al. |
| 5,918,233 A | 6/1999 | La Chance et al. |
| 5,924,086 A | 7/1999 | Mathur et al. |
| 5,940,290 A | 8/1999 | Dixon |
| 5,948,101 A | 9/1999 | David et al. |
| 5,949,417 A | 9/1999 | Calder |
| 5,960,214 A | 9/1999 | Sharpe, Jr. et al. |
| 5,960,441 A | 9/1999 | Bland et al. |
| 5,975,737 A | 11/1999 | Crater et al. |
| 5,984,502 A | 11/1999 | Calder |
| 5,988,847 A | 11/1999 | McLaughlin et al. |
| 6,008,985 A | 12/1999 | Lake et al. |
| 6,017,143 A | 1/2000 | Eryurek et al. |
| 6,026,352 A | 2/2000 | Burns et al. |
| 6,033,257 A | 3/2000 | Lake et al. |
| 6,041,263 A | 3/2000 | Boston et al. |
| 6,047,220 A | 4/2000 | Eryurek |
| 6,047,221 A | 4/2000 | Piche et al. |
| 6,055,483 A | 4/2000 | Lu |
| 6,061,603 A | 5/2000 | Papadopoulos et al. |
| 6,067,505 A | 5/2000 | Bonoyer et al. |
| 6,076,124 A | 6/2000 | Korowitz et al. |
| 6,078,843 A | 6/2000 | Shavit |
| 6,093,211 A | 7/2000 | Hamielec et al. |
| 6,106,785 A | 8/2000 | Havlena et al. |
| 6,108,616 A | 8/2000 | Borchers et al. |
| 6,110,214 A | 8/2000 | Klimasauskas |
| 6,119,047 A | 9/2000 | Eryurek et al. |
| 6,122,555 A | 9/2000 | Lu |
| 6,128,279 A | 10/2000 | O'Neil et al. |
| 6,144,952 A | 11/2000 | Keeler et al. |
| 6,169,980 B1 | 1/2001 | Keeler et al. |
| 6,266,726 B1 | 7/2001 | Nixon et al. |
| 6,298,377 B1 | 10/2001 | Hartikainen et al. |
| 6,298,454 B1 | 10/2001 | Schleiss et al. |
| 6,317,701 B1 | 11/2001 | Pyötsiä et al. |
| 6,332,110 B1 | 12/2001 | Wolfe |
| 6,397,114 B1 | 5/2002 | Eryurek et al. |
| 6,421,571 B1 | 7/2002 | Spriggs et al. |
| 6,445,963 B1 | 9/2002 | Blevins et al. |
| 6,532,392 B1 | 3/2003 | Eryurek et al. |
| 6,539,267 B1 | 3/2003 | Eryurek et al. |
| 6,615,090 B1 | 9/2003 | Blevins et al. |
| 6,633,782 B1 | 10/2003 | Schleiss et al. |
| 2002/0022894 A1 | 2/2002 | Eryurek et al. |
| 2002/0038156 A1 | 3/2002 | Eryurek et al. |
| 2002/0077711 A1 | 6/2002 | Nixon et al. |
| 2002/0147511 A1 | 10/2002 | Eryurek et al. |
| 2002/0161940 A1 | 10/2002 | Eryurek et al. |
| 2002/0163427 A1 | 11/2002 | Eryurek et al. |
| 2003/0014500 A1 | 1/2003 | Schleiss et al. |
| 2003/0028269 A1 | 2/2003 | Spriggs et al. |
| 2003/0065409 A1* | 4/2003 | Raeth et al. .................. 700/31 |
| 2003/0236579 A1* | 12/2003 | Hauhia et al. ................ 700/79 |

| | | | |
|---|---|---|---|
| 2004/0095237 A1* | 5/2004 | Chen et al. | 340/506 |
| 2005/0015624 A1* | 1/2005 | Ginter et al. | 713/201 |

FOREIGN PATENT DOCUMENTS

| | | |
|---|---|---|
| EP | 0 626 697 A1 | 11/1994 |
| EP | 0 961 184 A2 | 12/1999 |
| EP | 0 964 325 A1 | 12/1999 |
| EP | 0 965 897 A1 | 12/1999 |
| GB | 2 294 129 A | 4/1996 |
| GB | 2 294 793 A | 5/1996 |
| GB | 2 347 234 A | 8/2000 |
| WO | WO 00/62256 | 10/2000 |
| WO | WO 03/019304 A1 | 3/2003 |
| WO | WO 03/075206 A2 | 9/2003 |

OTHER PUBLICATIONS

"GE PREDICTOR™ Services: GE PREDICTOR Services Overview," GE Industrial Systems, available at http://www.geindustrial.com/cwc/services?id=71 on Jul. 18, 2002.

"Electrical Equipment Coverage," GE Indudtrial Systems, available at http://www.geindustrial.com/cwc/services?id=72 on Jul. 18, 2002.

"Customer Impact," GE Indudtrial Systems, available at http://www.geindustrial.com/cwc/services?id=73 on Jul. 18, 2002.

"Components of GE PREDICTOR™ Services," GE Industrial Systems, available at http://www.geindustrial.com/cwc/services?id=74 on Jul. 18, 2002.

"Customer Benefits," GE Industrial Systems, available at http://www.geindustrial.com/cwc/services?id=75 on Jul. 18, 2002.

Ashish Mehta, et al., "Feedforward Neural Networks for Process Indentification and Prediction," presented at ISA 2001, Houston, Texas, Sep. 2001.

Vasiliki Tzovia, et al., "Abnormal Condition Management Using Expert Systems," presented at ISA 2001, Houston, Texas, Sep. 2001.

Partial International Search Report for PCT US2005/006319, mailed Jul. 22, 2005.

Partial International Search Report for PCT US2005/006155, mailed Jul. 11, 2005.

Partial International Search Report for PCT/US2005/006325 mailed Jul. 8, 2005.

International Search Report received in International (PCT) Application PCT/US2005/006155, mailed Nov. 7, 2005.

Written Opinion of the International Search Authority for Application PCT/US2005/006155, mailed NOv. 7, 2005.

International Search Report for PCT/US2005/006319, mailed Sep. 16, 2005.

Written Opinion for PCT/US/2005/006319, mailed Sep. 16, 2005.

International Search Report for PCT/US2005/06155, mailed Sep. 5, 2005.

Written Opinion for PCT/US2005/06155, mailed Sep. 5, 2005.

International Search Report for PCT/US2005/006325, mailed Sep. 5, 2005.

Written Opinion for PCT/US2005/006325, mailed Sep. 5, 2005.

* cited by examiner

FIG. 6
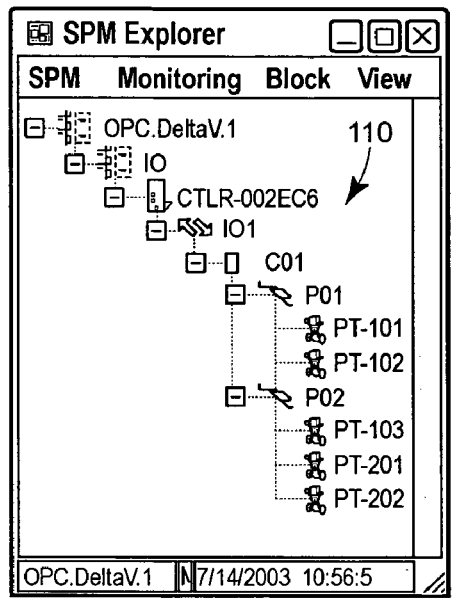
FIG. 7
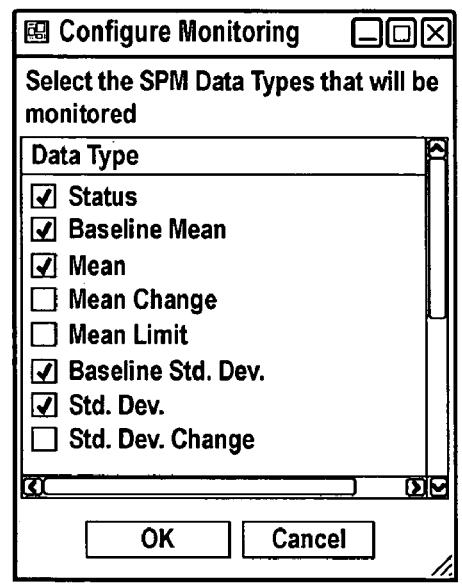
FIG. 8

FIG. 19
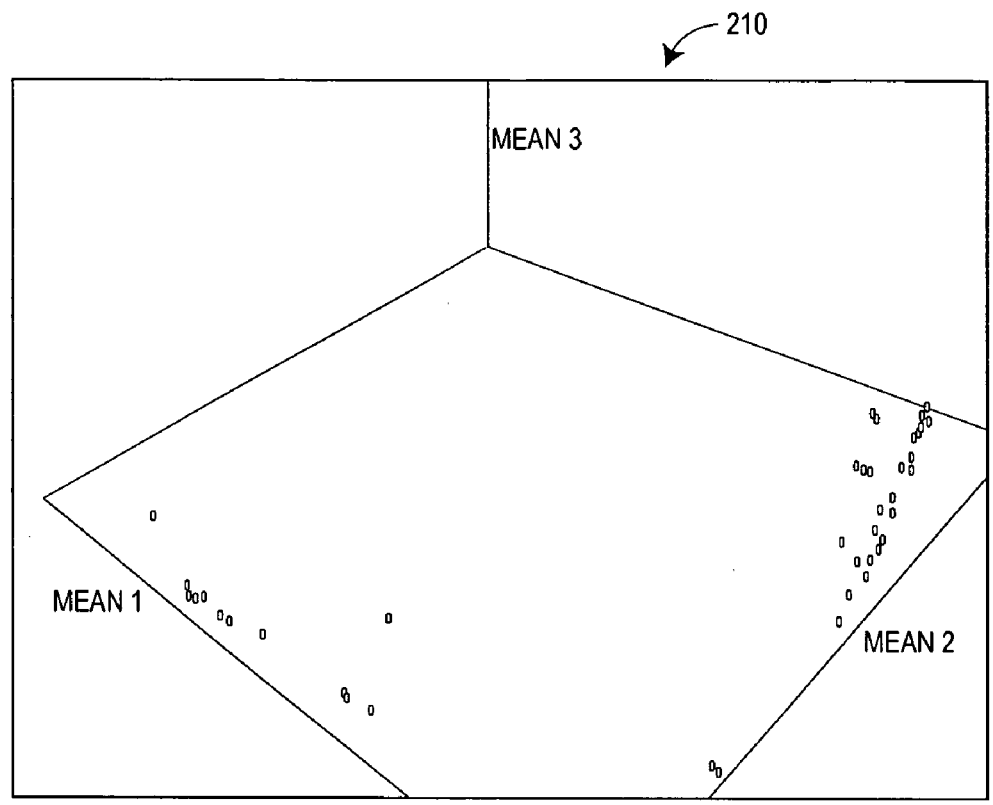
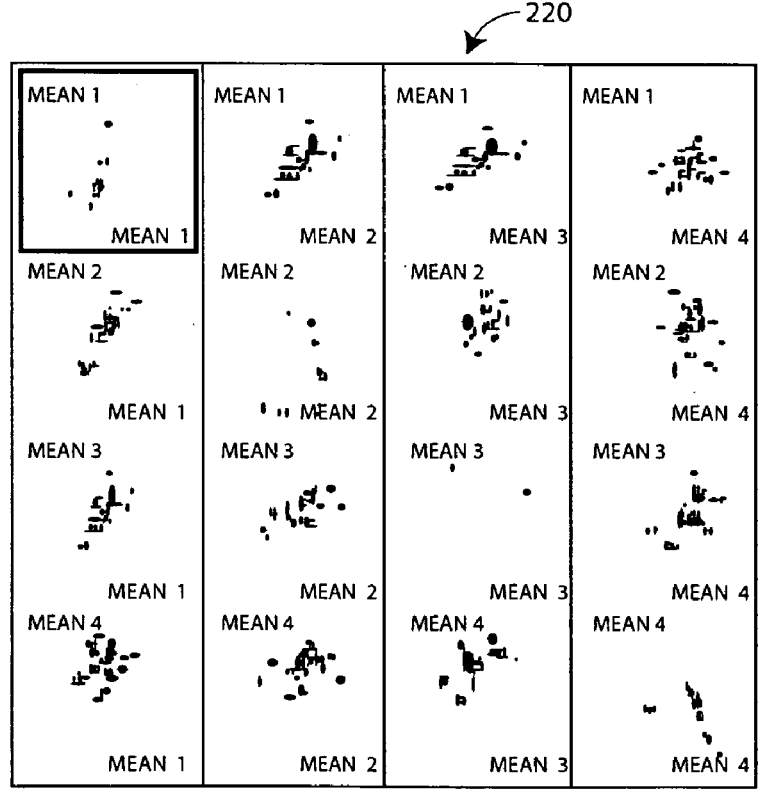
FIG. 20

230

| Sensor Name | Sensor 1 | Sensor 2 | Sensor 3 | Sensor 4 | Sensor 5 | Sensor 6 | Sensor 7 | Sensor 8 |
|---|---|---|---|---|---|---|---|---|
| | CascadeLoop | CascadeLoop | CascadeLoop | CascadeLoop | CascadeLoop | CascadeLoop | CascadeLoop | CascadeLo |
| CascadeLoop | 1.019 | 0.165 | -0.084 | 0.003 | -0.201 | -0.150 | -0.139 | -0.136 |
| CascadeLoop | 0.165 | 1.019 | -0.142 | -0.072 | 0.154 | 0.192 | 0.196 | 0.190 |
| CascadeLoop | -0.084 | -0.142 | 1.019 | -0.016 | 0.022 | 0.052 | 0.050 | 0.055 |
| CascadeLoop | 0.003 | -0.072 | -0.018 | 1.019 | -0.891 | -0.890 | -0.867 | -0.865 |
| CascadeLoop | -0.201 | 0.154 | 0.022 | -0.891 | 1.019 | 1.008 | 1.007 | 1.008 |
| CascadeLoop | -0.150 | 0.192 | 0.052 | -0.890 | 1.006 | 1.019 | 1.011 | 1.011 |
| CascadeLoop | -0.135 | 0.196 | 0.050 | -0.867 | 1.007 | 1.011 | 1.019 | 1.018 |
| CascadeLoop | -0.136 | 0.180 | 0.055 | -0.868 | 1.008 | 1.011 | 1.018 | 1.019 |
| CascadeLoop | -0.253 | 0.207 | 0.032 | -0.650 | 0.935 | 0.938 | 0.961 | 0.961 |
| CascadeLoop | 0.058 | 0.193 | 0.029 | -0.910 | 0.977 | 0.988 | 0.993 | 0.993 |
| CascadeLoop | 0.051 | 0.200 | 0.017 | -0.909 | 0.981 | 0.991 | 0.994 | 0.995 |
| CascadeLoop | 0.063 | 0.213 | 0.023 | -0.907 | 0.980 | 0.991 | 0.993 | 0.994 |
| CascadeLoop | 0.045 | 0.188 | -0.006 | -0.871 | 0.974 | 0.996 | 0.994 | 0.994 |
| CascadeLoop | 0.000 | 0.000 | 0.000 | 0.000 | 0.000 | 0.000 | 0.000 | 0.000 |

| SPM Block | FT-101 SPM 1 | FT-101 SPM 2 | FT-101 SPM 3 | FT-101 SPM 4 | F |
|---|---|---|---|---|---|
| FT-101 SPM 1 |  | 0.0027 | 0.0037 | 0.0092 |  |
| FT-101 SPM 2 | 0.0027 |  | 0.0111 | 0.0027 |  |
| FT-101 SPM 3 | 0.0037 | 0.0111 |  | 0.0009 |  |
| FT-101 SPM 4 | 0.0092 | 0.0027 | 0.0009 |  |  |
| FT-102 SPM 1 |  |  |  |  |  |
| FT-102 SPM 2 |  |  |  |  |  |
| FT-102 SPM 3 |  |  |  |  |  |
| FT-102 SPM 4 |  |  |  |  |  |
| PT-103 SPM 1 | 0.1856 | 0.1700 | 0.2022 | 0.1672 |  |
| PT-103 SPM 2 |  |  |  |  |  |
| PT-103 SPM 3 |  |  |  | 0.1212 |  |
| PT-103 SPM 4 | 0.0341 | 0.0290 | 0.0586 | 0.0571 |  |
| PT-104 SPM 1 |  |  |  |  |  |
| PT-105 SPM 1 | 0.0367 | 0.0360 | 0.0584 | 0.0472 |  |
| PT-107 SPM 1 | 0.0378 | 0.0150 | 0.0118 | 0.0159 |  |
| PT-107 SPM 2 | 0.0001 | 0.0032 | 0.0064 | 0.0070 |  |
| PT-107 SPM 3 | 0.0267 | 0.0393 | 0.0634 | 0.0603 |  |
| PT-107 SPM 4 | 0.0347 | 0.0391 | 0.0709 | 0.0628 |  |

R = Correlation Coefficient

θ = Angle corresponding to slope of best fit line ies on the devices and other equipment, such as sensors, within the process plant. Still further, many process plants have equipment monitoring devices connected to or as part of the field devices to measure process performance, process product variability, etc. for the purpose of detecting problems associated with the quality of the process product. Generally, equipment monitoring devices include an alarm generation routine which sends an alarm or alert signal to the operator when an unacceptable or out-of-tolerance condition exists.

ABNORMAL SITUATION PREVENTION IN A PROCESS PLANT

CROSS-REFERENCES TO RELATED APPLICATIONS

This application claims the benefit of U.S. Provisional Patent Application No. 60/549,796, filed on Mar. 3, 2004, and entitled "ABNORMAL SITUATION PREVENTION IN A PROCESS PLANT," which is hereby incorporated by reference herein in its entirety for all purposes.

This application also is related to the following patent applications:

U.S. patent application Ser. No. 10/972,224, filed on the same day as the present application, and entitled "CONFIGURATION SYSTEM AND METHOD FOR ABNORMAL SITUATION PREVENTION IN A PROCESS PLANT;"

U.S. patent application Ser. No. 10/972,155, filed on the same day as the present application, and entitled "DATA PRESENTATION SYSTEM FOR ABNORMAL SITUATION PREVENTION IN A PROCESS PLANT."

The above-referenced patent applications are hereby incorporated by reference herein in their entireties for all purposes.

TECHNICAL FIELD

This patent relates generally to performing diagnostics and maintenance in a process plant and, more particularly, to providing predictive diagnostics capabilities within a process plant in a manner that reduces or prevents abnormal situations within the process plant.

DESCRIPTION OF THE RELATED ART

Process control systems, like those used in chemical, petroleum or other processes, typically include one or more centralized or decentralized process controllers communicatively coupled to at least one host or operator workstation and to one or more process control and instrumentation devices such as, for example, field devices, via analog, digital or combined analog/digital buses. Field devices, which may be, for example, valves, valve positioners, switches, transmitters, and sensors (e.g., temperature, pressure, and flow rate sensors), are located within the process plant environment, and perform functions within the process such as opening or closing valves, measuring process parameters, increasing or decreasing fluid flow, etc. Smart field devices such as field devices conforming to the well-known FOUNDATION™ Fieldbus (hereinafter "Fieldbus") protocol or the HART® protocol may also perform control calculations, alarming functions, and other control functions commonly implemented within the process controller.

The process controllers, which are typically located within the process plant environment, receive signals indicative of process measurements or process variables made by or associated with the field devices and/or other information pertaining to the field devices, and execute controller applications. The controller applications implement, for example, different control modules that make process control decisions, generate control signals based on the received information, and coordinate with the control modules or blocks being performed in the field devices such as HART and Fieldbus field devices. The control modules in the process controllers send the control signals over the communication lines or signal paths to the field devices, to thereby control the operation of the process.

Information from the field devices and the process controllers is typically made available to one or more other hardware devices such as, for example, operator workstations, maintenance workstations, personal computers, handheld devices, data historians, report generators, centralized databases, etc. to enable an operator or a maintenance person to perform desired functions with respect to the process such as, for example, changing settings of the process control routine, modifying the operation of the control modules within the process controllers or the smart field devices, viewing the current state of the process or of particular devices within the process plant, viewing alarms generated by field devices and process controllers, simulating the operation of the process for the purpose of training personnel or testing the process control software, diagnosing problems or hardware failures within the process plant, etc.

While a typical process plant has many process control and instrumentation devices such as valves, transmitters, sensors, etc. connected to one or more process controllers, there are many other supporting devices that are also necessary for or related to process operation. These additional devices include, for example, power supply equipment, power generation and distribution equipment, rotating equipment such as turbines, motors, etc., which are located at numerous places in a typical plant. While this additional equipment does not necessarily create or use process variables and, in many instances, is not controlled or even coupled to a process controller for the purpose of affecting the process operation, this equipment is nevertheless important to, and ultimately necessary for proper operation of the process.

As is known, problems frequently arise within a process plant environment, especially a process plant having a large number of field devices and supporting equipment. These problems may take the form of broken or malfunctioning devices, logic elements, such as software routines, being in improper modes, process control loops being improperly tuned, one or more failures in communications between devices within the process plant, etc. These and other problems, while numerous in nature, generally result in the process operating in an abnormal state (i.e., the process plant being in an abnormal situation) which is usually associated with suboptimal performance of the process plant. Many diagnostic tools and applications have been developed to detect and determine the cause of problems within a process plant and to assist an operator or a maintenance person to diagnose and correct the problems, once the problems have occurred and been detected. For example, operator workstations, which are typically connected to the process controllers through communication connections such as a direct or wireless bus, Ethernet, modem, phone line, and the like, have processors and memories that are adapted to run software or firmware, such as the DeltaV™ and Ovation control systems, sold by Emerson Process Management which includes numerous control module and control loop diagnostic tools. Likewise, maintenance workstations, which may be connected to the process control devices, such as field devices, via the same communication connections as the controller applications, or via different communication connections, such as OPC connections handheld connections, etc., typically include one or more applications designed to view maintenance alarms and alerts generated by field devices within the process plant, to test devices within the process plant and to perform maintenance activities on the field devices and other devices within the process plant. Similar diagnostic applications have been developed to diagnose problems within the supporting equipment within the process plant.

Thus, for example, the Asset Management Solutions (AMS) application (at least partially disclosed in U.S. Pat. No. 5,960,214 entitled "Integrated Communication Network for use in a Field Device Management System") sold by Emerson Process Management, enables communication with and stores data pertaining to field devices to ascertain and track the operating state of the field devices. In some instances, the AMS application may be used to communicate with a field device to change parameters within the field device, to cause the field device to run applications on itself such as, for example, self-calibration routines or self-diagnostic routines, to obtain information about the status or health of the field device, etc. This information may include, for example, status information (e.g., whether an alarm or other similar event has occurred), device configuration information (e.g., the manner in which the field device is currently or may be configured and the type of measuring units used by the field device), device parameters (e.g., the field device range values and other parameters), etc. Of course, this information may be used by a maintenance person to monitor, maintain, and/or diagnose problems with field devices.

Similarly, many process plants include equipment monitoring and diagnostic applications such as, for example, RBMware provided by CSI Systems, or any other known applications used to monitor, diagnose, and optimize the operating state of various rotating equipment. Maintenance personnel usually use these applications to maintain and oversee the performance of rotating equipment in the plant, to determine problems with the rotating equipment, and to determine when and if the rotating equipment must be repaired or replaced. Similarly, many process plants include power control and diagnostic applications such as those provided by, for example, the Liebert and ASCO companies, to control and maintain the power generation and distribution equipment. It is also known to run control optimization applications such as, for example, real-time optimizers (RTO+), within a process plant to optimize the control activities of the process plant. Such optimization applications typically use complex algorithms and/or models of the process plant to predict how inputs may be changed to optimize operation of the process plant with respect to some desired optimization variable such as, for example, profit.

These and other diagnostic and optimization applications are typically implemented on a system-wide basis in one or more of the operator or maintenance workstations, and may provide preconfigured displays to the operator or maintenance personnel regarding the operating state of the process plant, or the devices and equipment within the process plant. Typical displays include alarming displays that receive alarms generated by the process controllers or other devices within the process plant, control displays indicating the operating state of the process controllers and other devices within the process plant, maintenance displays indicating the operating state of the devices within the process plant, etc. Likewise, these and other diagnostic applications may enable an operator or a maintenance person to retune a control loop or to reset other control parameters, to run a test on one or more field devices to determine the current status of those field devices, to calibrate field devices or other equipment, or to perform other problem detection and correction activities on devices and equipment within the process plant.

While these various applications and tools are very helpful in identifying and correcting problems within a process plant, these diagnostic applications are generally configured to be used only after a problem has already occurred within a process plant and, therefore, after an abnormal situation already exists within the plant. Unfortunately, an abnormal situation may exist for some time before it is detected, identified and corrected using these tools, resulting in the suboptimal performance of the process plant for the period of time during which the problem is detected, identified and corrected. In many cases, a control operator will first detect that some problem exists based on alarms, alerts or poor performance of the process plant. The operator will then notify the maintenance personnel of the potential problem. The maintenance personnel may or may not detect an actual problem and may need further prompting before actually running tests or other diagnostic applications, or performing other activities needed to identify the actual problem. Once the problem is identified, the maintenance personnel may need to order parts and schedule a maintenance procedure, all of which may result in a significant period of time between the occurrence of a problem and the correction of that problem, during which time the process plant runs in an abnormal situation generally associated with the sub-optimal operation of the plant.

Additionally, many process plants can experience an abnormal situation which results in significant costs or damage within the plant in a relatively short amount of time. For example, some abnormal situations can cause significant damage to equipment, the loss of raw materials, or significant unexpected downtime within the process plant if these abnormal situations exist for even a short amount of time. Thus, merely detecting a problem within the plant after the problem has occurred, no matter how quickly the problem is corrected, may still result in significant loss or damage within the process plant. As a result, it is desirable to try to prevent abnormal situations from arising in the first place, instead of simply trying to react to and correct problems within the process plant after an abnormal situation arises.

There is currently one technique that may be used to collect data that enables a user to predict the occurrence of certain abnormal situations within a process plant before these abnormal situations actually arise, with the purpose of taking steps to prevent the predicted abnormal situation before any significant loss within the process plant takes place. This procedure is disclosed in U.S. patent application Ser. No. 09/972,078, entitled "Root Cause Diagnostics" (based in part on U.S. patent application Ser. No. 08/623, 569, now U.S. Pat. No. 6,017,143). The entire disclosures of both of these applications are hereby incorporated by reference herein. Generally speaking, this technique places statistical data collection and processing blocks or statistical processing monitoring (SPM) blocks, in each of a number of devices, such as field devices, within a process plant. The statistical data collection and processing blocks collect, for example, process variable data and determine certain statistical measures associated with the collected data, such as a mean, a median, a standard deviation, etc. These statistical measures may then sent to a user and analyzed to recognize patterns suggesting the future occurrence of a known abnormal situation. Once a particular suspected future abnormal situation is detected, steps may be taken to correct the underlying problem, thereby avoiding the abnormal situation in the first place. However, the collection and analysis of this data may be time consuming and tedious for a typical maintenance operator, especially in process plants having a large number of field devices collecting this statistical data.

Still further, while a maintenance person may be able to collect the statistical data, this person may not know how to best analyze or view the data or to determine what, if any, future abnormal situation may be suggested by the data.

Also, generally speaking, it is very cumbersome and tedious to configure a plant to collect and view all of the statistical process data generated by the SPMs, especially in large processes. In fact, at the present time, a user must generally create an OPC client that individually monitors each of the parameters of interest within the different field devices, which means that every field device must be individually configured to collect this data. This configuration process is very time consuming and is vulnerable to human errors.

SUMMARY OF THE DISCLOSURE

In one aspect, a system detects abnormal conditions associated with a process plant. The system receives signal processing data generated by signal processing data collection blocks implemented by a plurality of devices. The signal processing data collection blocks may generate data such as statistical data, frequency analysis data, auto regression data, wavelets data, etc. The system includes an analysis engine configured to detect at least one abnormal condition associated with the process plant. The signal processing data is provided to the analysis engine, and the analysis engine determines if an action should be taken.

In another aspect, a system for configuring an analysis engine to detect an abnormal condition associated with a proces plant includes user interface mechanisms for specifying signal processing parameters to be analyzed by the analysis engine. The signal processing parameters may be generated by signal processing data collection blocks implemented by a plurality of deice in the process plant. Another user interface mechanism may be used to specify an analysis of the specified signal processing parameters. Configuration data is received via the user interface mechanisms and stored.

BRIEF DESCRIPTION OF THE DRAWINGS

FIG. 6 is a depiction of a display screen illustrating a hierarchy of plant elements associated with devices having statistical process monitoring blocks therein;

FIG. 7 is a depiction of a display screen which, enables a user to select a set of statistical process monitoring parameters to be monitored within a statistical process monitoring block;

FIG. 8 is a depiction of a display screen that may be provided to illustrate collected statistical process monitoring data generated within devices having statistical process monitoring blocks;

FIG. 19 is a depiction of a screen display illustrating a three-dimensional scatter chart for a set of three statistical process monitoring parameters;

FIG. 20 is a depiction of a screen display illustrating a four-dimensional scatter chart for a set of four statistical process monitoring parameters;

DETAILED DESCRIPTION

Figure 1:
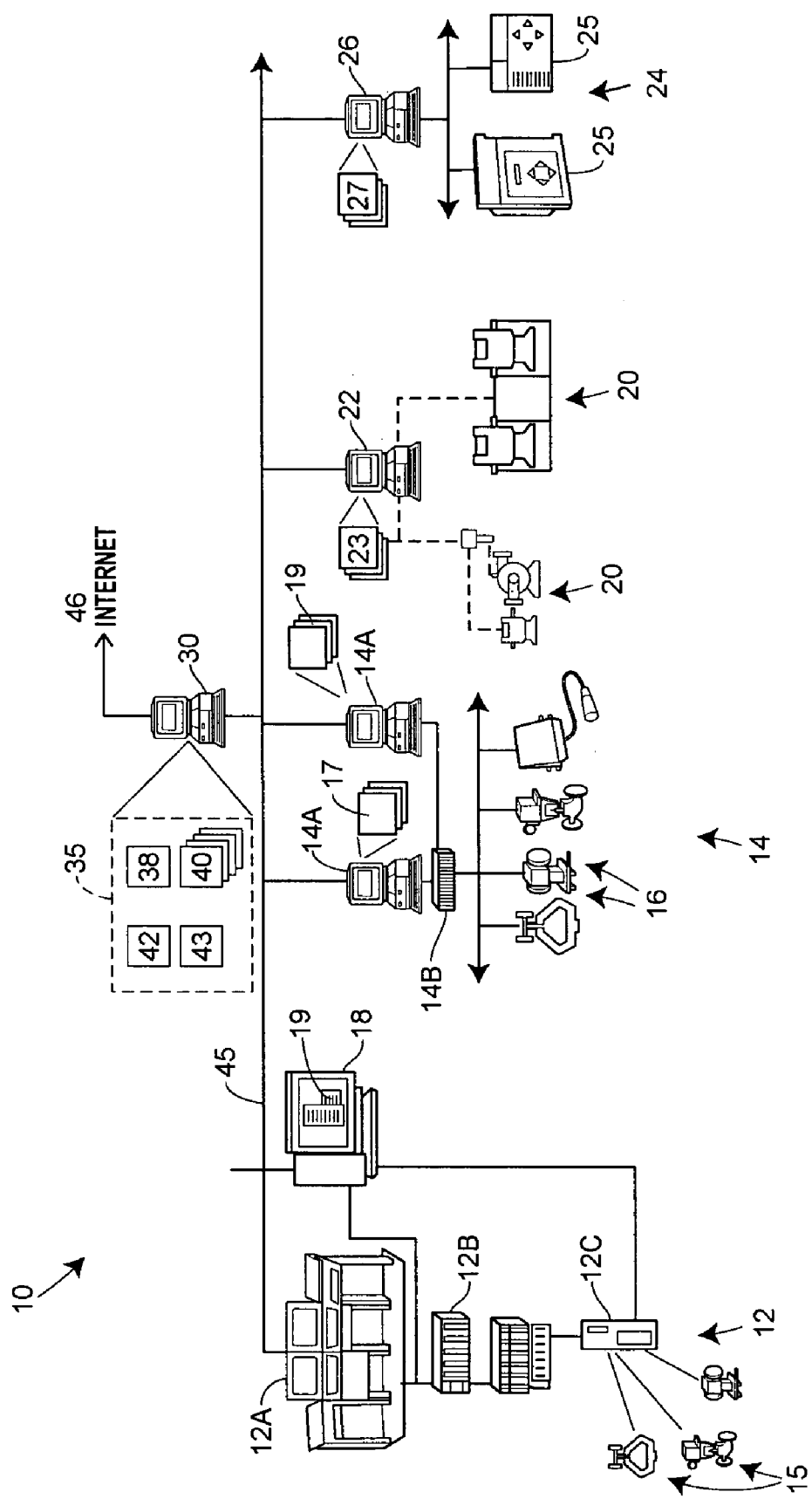
FIG. 1 is an exemplary block diagram of a process plant having a distributed control and maintenance network including one or more operator and maintenance workstations, controllers, field devices and supporting equipment.

Referring now to FIG. 1, an example process plant 10 in which an abnormal situation prevention system may be implemented includes a number of control and maintenance systems interconnected together with supporting equipment via one or more communication networks. In particular, the process plant 10 of FIG. 1 includes one or more process control systems 12 and 14. The process control system 12 may be a traditional process control system such as a PROVOX or RS3 system or any other control system which includes an operator interface 12A coupled to a controller 12B and to input/output (PO) cards 12C which, in turn, are coupled to various field devices such as analog and Highway Addressable Remote Transmitter (HART) field devices 15. The process control system 14, which may be a distributed process control system, includes one or more operator interfaces 14A coupled to one or more distributed controllers 14B via a bus, such as an Ethernet bus. The controllers 14B may be, for example, DeltaV™ controllers sold by Emerson Process Management of Austin, Tex. or any other desired type of controllers. The controllers 14B are connected via I/O devices to one or more field devices 16, such as for example, HART or Fieldbus field devices or any other smart or non-smart field devices including, for example, those that use any of the PROFIBUS®, WORLDFIP®, Device-Net®, AS-Interface and CAN protocols. As is known, the field devices 16 may provide analog or digital information to the controllers 14B related to process variables as well as to other device information. The operator interfaces 14A may store and execute tools available to the process control operator for controlling the operation of the process including, for example, control optimizers, diagnostic experts, neural networks, tuners, etc.

Still further, maintenance systems, such as computers executing the AMS application or any other device monitoring and communication applications may be connected to the process control systems 12 and 14 or to the individual devices therein to perform maintenance and monitoring activities. For example, a maintenance computer 18 may be connected to the controller 12B and/or to the devices 15 via any desired communication lines or networks (including wireless or handheld device networks) to communicate with and, in some instances, reconfigure or perform other maintenance activities on the devices 15. Similarly, maintenance applications such as the AMS application may be installed in and executed by one or more of the user interfaces 14A associated with the distributed process control system 14 to perform maintenance and monitoring functions, including data collection related to the operating status of the devices 16.

The process plant 10 also includes various rotating equipment 20, such as turbines, motors, etc. which are connected to a maintenance computer 22 via some permanent or temporary communication link (such as a bus, a wireless communication system or hand held devices which are connected to the equipment 20 to take readings and are then removed). The maintenance computer 22 may store and execute known monitoring and diagnostic applications 23 provided by, for example, CSI (an Emerson Process Management Company) or other any other known applications used to diagnose, monitor and optimize the operating state of the rotating equipment 20. Maintenance personnel usually use the applications 23 to maintain and oversee the performance of rotating equipment 20 in the plant 10, to determine problems with the rotating equipment 20 and to determine when and if the rotating equipment 20 must be repaired or replaced. In some cases, outside consultants or service organizations may temporarily acquire or measure data pertaining to the equipment 20 and use this data to perform analyses for the equipment 20 to detect problems, poor performance or other issues effecting the equipment 20. In these cases, the computers running the analyses may not be connected to the rest of the system 10 via any communication line or may be connected only temporarily.

Similarly, a power generation and distribution system 24 having power generating and distribution equipment 25 associated with the plant 10 is connected via, for example, a bus, to another computer 26 which runs and oversees the operation of the power generating and distribution equipment 25 within the plant 10. The computer 26 may execute known power control and diagnostics applications 27 such as those provided by, for example, Liebert and ASCO or other companies to control and maintain the power generation and distribution equipment 25. Again, in many cases, outside consultants or service organizations may use service applications that temporarily acquire or measure data pertaining to the equipment 25 and use this data to perform analyses for the equipment 25 to detect problems poor performance or other issues effecting the equipment 25. In these cases, the computers (such as the computer 26) running the analyses may not be connected to the rest of the system 10 via any communication line or may be connected only temporarily.

As illustrated in FIG. 1, a computer system 30 implements at least a portion of an abnormal situation prevention system 35, and in particular, the computer system 30 stores and implements a configuration and data collection application 38, a viewing or interface application 40, which may include statistical collection and processing blocks, and a rules engine development and execution application 42 and, additionally, stores a statistical process monitoring database 43 that stores statistical data generated within certain devices within the process. Generally speaking, the configuration and data collection application 38 configures and communicates with each of a number of statistical data collection and analysis blocks (not shown in FIG. 1) located in the field devices 15, 16, the controllers 12B, 14B, the rotating equipment 20 or its supporting computer 22, the power generation equipment 25 or its supporting computer 26 and any other desired devices and equipment within the process plant 10, to thereby collect statistical data (or in some cases, process variable data) from each of these blocks with which to perform abnormal situation prevention. The configuration and data collection application 38 may be communicatively connected via a hardwired bus 45 to each of the computers or devices within the plant 10 or, alternatively, may be connected via any other desired communication connection including, for example, wireless connections, dedicated connections which use OPC, intermittent connections, such as ones which rely on handheld devices to collect data, etc. Likewise, the application 38 may obtain data pertaining to the field devices and equipment within the process plant 10 via a LAN or a public connection, such as the Internet, a telephone connection, etc. (illustrated in FIG. 1 as an Internet connection 46) with such data being collected by, for example, a third party service provider. Further, the application 38 may be communicatively coupled to computers/devices in the, plant 10 via a variety of techniques and/or protocols including, for example, Ethernet, Modbus, HTML, XML, proprietary techniques/protocols, etc. Thus, although particular examples using OPC to communicatively couple the application 38 to computers/devices in the plant 10 are described herein, one of ordinary skill in the art will recognize, that a variety of other methods of coupling the application 38 to computers/devices in the plant 10 can be used as well. The application 38 may generally store the collected data in the database 43.

Once the statistical data (or process variable data) is collected, the viewing application 40 may be used to process this data and/or to display the collected or processed statistical data (e.g., as stored in the database 43) in different manners to enable a user, such as a maintenance person, to better be able to determine the existence of or the predicted future existence of an abnormal situation and to take preemptive corrective actions. The rules engine development and execution application 42 may use one or more rules stored therein to analyze the collected data to determine the existence of, or to predict the future existence of an abnormal situation within the process plant 10. Additionally, the rules engine development and execution application 42 may enable an operator or other user to create additional rules to be implemented by a rules engine to detect or predict abnormal situations.

Figure 2:
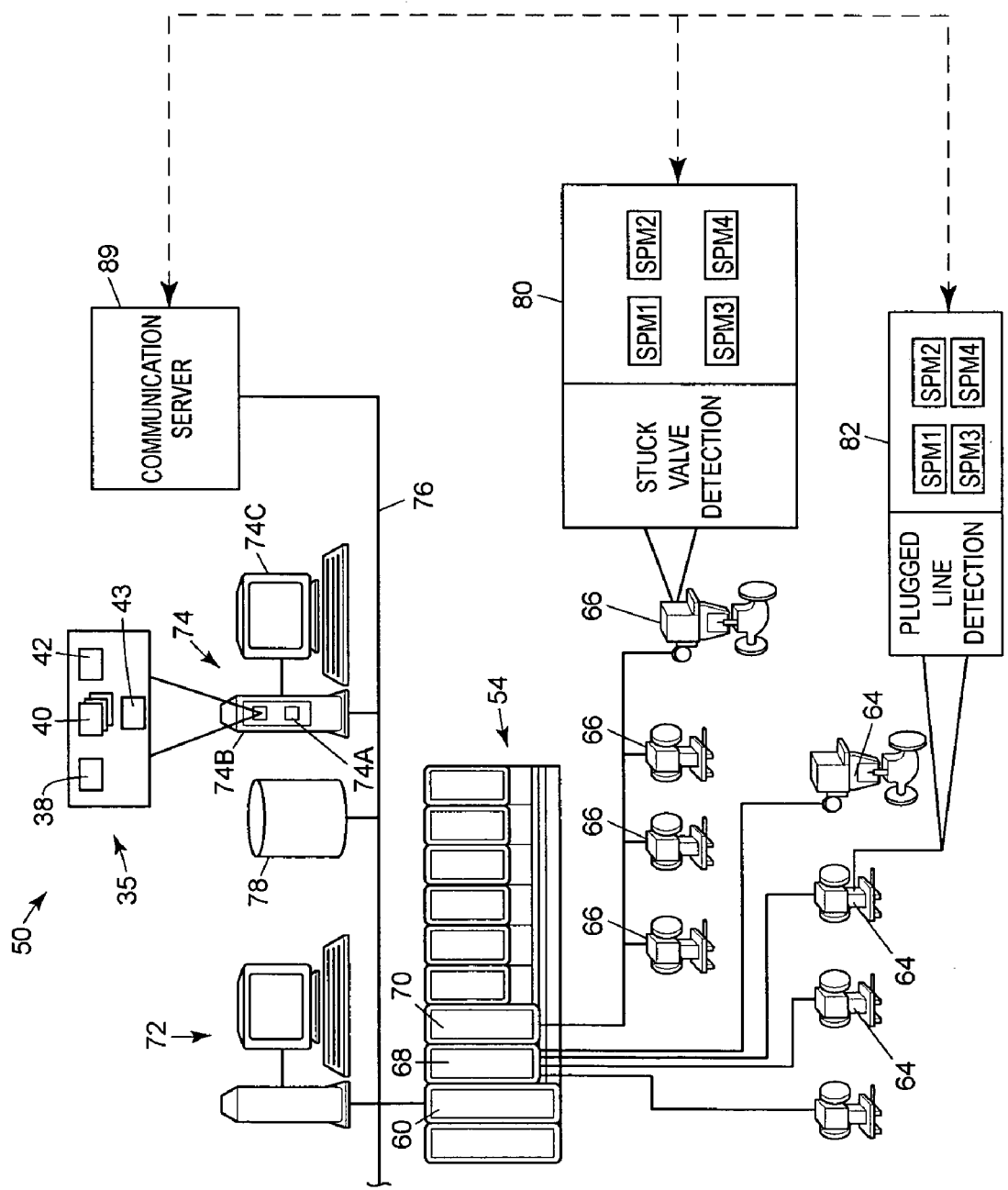
FIG. 2 is an exemplary block diagram of a portion of the process plant of FIG. 1, illustrating communication interconnections between various components of an abnormal situation prevention system located within different elements of the process plant.

FIG. 2 illustrates a portion 50 of the example process plant 10 of FIG. 1 for the purpose of describing one manner in which statistical data collection may be performed by the abnormal situation prevention system 35. While FIG. 2 illustrates communications between the abnormal situation prevention system applications 38, 40 and 42 and the database 43 and one or more data collection blocks within HART and Fieldbus field devices, it will be understood that similar communications can occur between the abnormal situation prevention system applications 38, 40 and 42 and other devices and equipment within the process plant 10, including any of the devices and equipment illustrated in FIG. 1.

The portion 50 of the process plant 10 illustrated in FIG. 2 includes a distributed process control system 54 having one or more process controllers 60 connected to one or more field devices 60 and 66 via input/output (I/O) cards or devices 68 and 70, which may be any desired types of I/O devices conforming to any desired communication or controller protocol. The field devices 60 are illustrated as HART field devices and the field devices 66 are illustrated as Fieldbus field devices, although these field devices could use any other desired communication protocols. Additionally, the field devices 60 and 66 may be any types of devices such as, for example, sensors, valves, transmitters, positioners, etc., and may conform to any desired open, proprietary or other communication or programming protocol, it being understood that the I/O devices 68 and 70 must be compatible with the desired protocol used by the field devices 60 and 66.

In any event, one or more user interfaces or computers 72 and 74 (which may be any types of personal computers, workstations, etc.) accessible by plant personnel such as configuration engineers, process control operators, maintenance personnel, plant managers, supervisors, etc. are coupled to the process controllers 60 via a communication line or bus 76 which may be implemented using any desired hardwired or wireless communication structure, and using any desired or suitable communication protocol such as, for example, an Ethernet protocol. In addition, a database 78 may be connected to the communication bus 76 to operate as a data historian that collects and stores configuration information as well as on line process variable data, parameter data, status data, and other data associated with the process controllers 60 and field devices 60 and 66 within the process plant 10. Thus, the database 78 may operate as a configuration database to store the current configuration, including process configuration modules, as well as control configuration information for the process control system 54 as downloaded to and stored within the process controllers 60 and the field devices 60 and 66. Likewise, the database 78 may store historical abnormal situation prevention data, including statistical data collected by the field devices 60 and 66 within the process plant 10 or statistical data determined from process variables collected by the field devices 60 and 66.

While the process controllers 60, I/O devices 68 and 70, and field devices 60 and 66 are typically located down within and distributed throughout the sometimes harsh plant environment, the workstations 72 and 74, and the database

78 are usually located in control rooms, maintenance rooms or other less harsh environments easily accessible by operators, maintenance personnel, etc.

Generally speaking, the process controllers 60 store and execute one or more controller applications that implement control strategies using a number of different, independently executed, control modules or blocks. The control modules may each be made up of what are commonly referred to as function blocks, wherein each function block is a part or a subroutine of an overall control routine and operates in conjunction with other function blocks (via communications called links) to implement process control loops within the process plant 10. As is well known function blocks, which may be objects in an object oriented programming protocol, typically perform one of an input function, such as that associated with a transmitter, a sensor or other process parameter measurement device, a control function such as that associated with a control routine that performs PID, fuzzy logic, etc. control, or an output function, which controls the operation of some device, such as a valve to perform some physical function within the process plant 10. Of course, hybrid and other types of complex function blocks exist, such as model predictive controllers (MPCs), optimizers, etc. It is to be understood that while the Fieldbus protocol and the DeltaV™ system protocol use control modules and function blocks designed and implemented in an object-oriented programming protocol, the control modules may be designed using any desired control programming scheme including, for example, sequential function blocks, ladder logic, etc., and are not limited to being designed using function blocks or any other particular programming technique.

As illustrated in FIG. 2, the maintenance workstation 74 includes a processor 74A, a memory 74B and a display device 74C. The memory 74B stores the abnormal situation prevention applications 38, 40 and 42 discussed with respect to FIG. 1 in a manner that these applications can be implemented on the processor 74A to provide information to a user via the display 74C (or any other display device, such as a printer).

Additionally, as shown in FIG. 2, some (and potentially all) of the field devices 60 and 66 include data collection and processing blocks 80 and 82. While, the blocks 80 and 82 are described with respect to FIG. 2 as being advanced diagnostics blocks (ADBs), which are known Foundation Fieldbus function blocks that can be added to Fieldbus devices to collect and process statistical data within Fieldbus devices, for the purpose of this discussion, the blocks 80 and 82 could be or could include any other type of block or module located within a process device that collects device data and calculates or determines one or more statistical measures or parameters for that data, whether or not these blocks are located in Fieldbus devices or conform to the Fieldbus protocol. While the blocks 80 and 82 of FIG. 2 are illustrated as being located in one of the devices 60 and in one of the devices 66, these or similar blocks could be located in any number of the field devices 60 and 66, could be located in other devices, such as the controller 60, the I/O devices 68, 70 or any of the devices illustrated in FIG. 1. Additionally, the blocks 80 and 82 could be in any subset of the devices 64 and 66.

Generally speaking, the blocks 80 and 82 or sub-elements of these blocks, collect data, such a process variable data, within the device in which they are located and perform statistical processing or analysis on the data for any number of reasons. For example, the block 80, which is illustrated as being associated with a valve, may have a stuck valve detection routine which analyzes the valve process variable data to determine if the valve is in a stuck condition. In addition, the block 80 includes a set of four statistical process monitoring (SPM) blocks or units SPM1–SPM4 which may collect process variable or other data within the valve and perform one or more statistical calculations on the collected data to determine, for example, a mean, a median, a standard deviation, a root-mean-square (RMS), a rate of change, a range, a minimum, a maximum, etc. of the collected data and/or to detect events such as drift, bias, noise, spikes, etc., in the collected data. The specific statistical data generated, nor the method in which it is generated is not critical. Thus, different types of statistical data can be generated in addition to, or instead of, the specific types described above. Additionally, a variety of techniques, including known techniques, can be used to generate such data. The term statistical process monitoring (SPM) block is used herein to describe functionality that performs statistical process monitoring on at least one process variable or other process parameter, and may be performed by any desired software, firmware or hardware within the device or even outside of a device for which data is collected. It will be understood that, because the SPMs are generally located in the devices where the device data is collected, the SPMs can acquire quantitatively more and qualitatively more accurate process variable data. As a result, the SPM blocks are generally capable of determining better statistical calculations with respect to the collected process variable data than a block located outside of the device in which the process variable data is collected.

As another example, the block 82 of FIG. 2, which is illustrated as being associated with a transmitter, may have a plugged line detection unit that analyzes the process variable data collected by the transmitter to determine if a line within the plant is plugged. In addition, the block 82 includes a set of four SPM blocks or units SPM1–SPM4 which may collect process variable or other data within the transmitter and perform one or more statistical calculations on the collected data to determine, for example, a mean, a median, a standard deviation, etc. of the collected data. If desired, the underlying operation of the blocks 80 and 82 may be performed or implemented as described in U.S. Pat. No. 6,017,143 referred to above. While the blocks 80 and 82 are illustrated as including four SPM blocks each, the blocks 80 and 82 could have any other number of SPM blocks therein for collecting and determining statistical data. Likewise, while the blocks 80 and 82 are illustrated as including detection software for detecting particular conditions within the plant 10, they need not have such detection software. Still further, while the SPM blocks discussed herein are illustrated as being sub-elements of ADBs, they may instead be stand-alone blocks located within a device. Also, while the SPM blocks discussed herein may be known Foundation Fieldbus SPM blocks, the term statistical process monitoring (SPM) block is used herein to refer to any type of block or element that collects data, such as process variable data, and performs some statistical processing on this data to determine a statistical measure, such as a mean, a standard deviation, etc. As a result, this term is intended to cover software or firmware or other elements that perform this function, whether these elements are in the form of function blocks, or other types of blocks, programs, routines or elements and whether or not these elements conform to the Foundation Fieldbus protocol, or some other protocol, such as PROFIBUS, WORLDFIP, Device-Net, AS-Interface, HART, CAN, etc., protocols.

Figure 3:
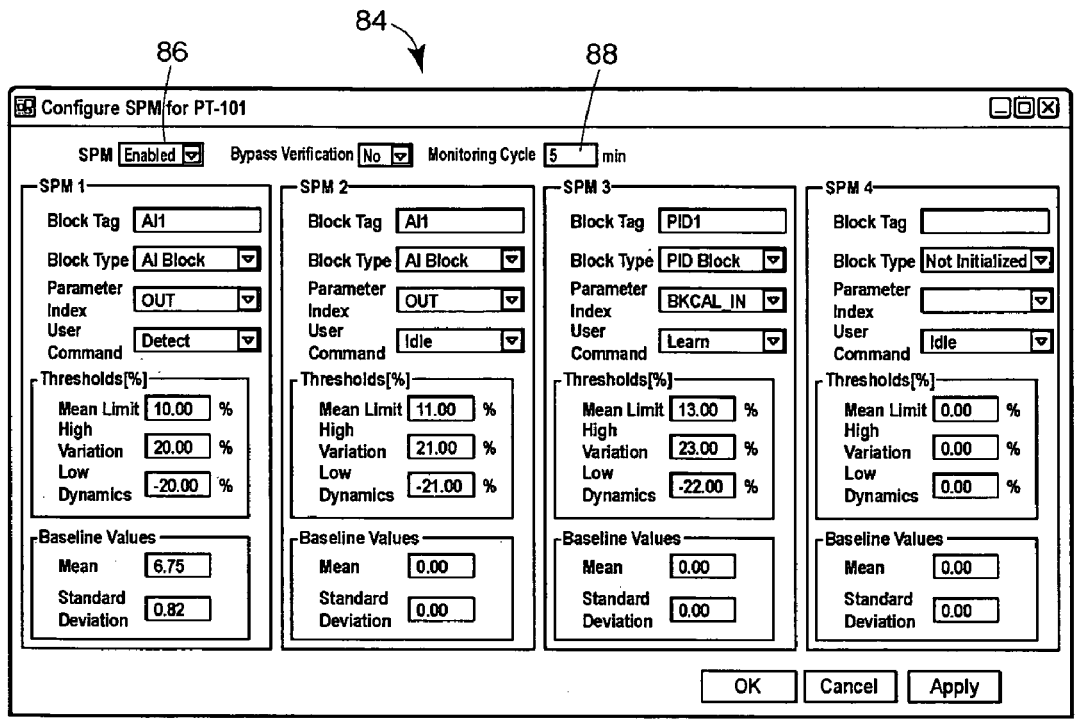
FIG. 3 is a display illustrating the configuration of a set of statistical process monitoring blocks within a device of the process plant of FIG. 1 or 2.

In one embodiment, each SPM block within the ADBs 80 and 82 can be either active or inactive. An active SPM block is one that is currently monitoring a process variable (or other process parameter) while an inactive SPM block is one that is not currently monitoring a process variable. Generally speaking, SPM blocks are, by default, inactive and, therefore, each one must generally be individually configured to monitor a process variable. FIG. 3 illustrates an example configuration display 84 that may be presented to a user, engineer, etc. to depict and change the current SPM configuration for a device. As indicated in the display 84, SPM blocks 1, 2 and 3 for this particular device have all been configured, while SPM block 4 has not been configured. Each of the configured SPM blocks SPM1, SPM2 and SPM3 is associated with a particular block within a device (as indicated by the block tag), a block type, a parameter index within the block (i.e., the parameter being monitored) and a user command which indicates the monitoring functionality of the SPM block. Still further, each configured SPM block includes a set of thresholds to which determined statistical parameters are to be compared, including for example, a mean limit, a high variation limit (which specifies a value that indicates too much variation in the signal) and low dynamics (which specifies a value that indicates too little variation in the signal). Essentially, detecting a change in a mean may indicate that the process is drifting up or down, detecting a high variation may mean that an element within the process is experiencing unexpected noise (such as that caused by increased vibration) and detecting a low variation may mean that a process signal is getting filtered or that an element is getting suspiciously quiet, like a stuck valve for example. Still further, baseline values, such as a mean and a standard deviation may be set for each SPM block. These baseline values may be used to determine whether limits have been met or exceeded within the device. SPM blocks 1 and 3 of FIG. 3 are both active because they have received user commands to start monitoring. On the other hand, SPM block 2 is inactive because it is in the Idle state. Also, in this example SPM capabilities are enabled for the entire device as indicated by the box 86 and is set to be monitored or calculated every five minutes, as indicated by the box 88. Of course, an authorized user could reconfigure the SPM blocks within the device to monitor other blocks, such as other function blocks, within the device, other parameters associated with these or other blocks within the device, as well as to have other thresholds, baseline values, etc.

While certain statistical monitoring blocks are illustrated in the display 84 of FIG. 3, it will be understood that other parameters could be monitored as well or in addition. For example, the SPM blocks, or the ADBs discussed with respect to FIG. 2 may calculate statistical parameters associated with a process and may trigger certain alerts, based on changes in these values. By way of example, Fieldbus type SPM blocks may monitor process variables and provide 15 different parameters associated with that monitoring. These parameters include Block Tag, Block Type, Mean, Standard Deviation, Mean Change, Standard Deviation Change, Baseline Mean, Baseline Standard Deviation, High Variation Limit, Low Dynamics Limit, Mean Limit, Status, Parameter Index, Time Stamp and User Command. The two most useful parameters are currently considered to be the Mean and Standard Deviation. However, other SPM parameters that are often useful are Baseline Mean, Baseline Standard Deviation, Mean Change, Standard Deviation Change, and Status. Of course, the SPM blocks could determine any other desired statistical measures or parameters and could provide other parameters associated with a particular block to a user or requesting application. Thus, SPM blocks are not limited to the ones discussed herein.

Referring again to FIG. 2, the parameters of the SPM blocks (SPM1–SPM4) within the field devices may be made available to an external client, such as to the workstation 74 through the bus or communication network 76 and the controller 60. Additionally or in the alternative, the parameters and other information gathered by or generated by the SPM blocks (SPM1–SPM4) within the ADBs 80 and 82 may be made available to the workstation 74 through, for example, an OPC server 89. This connection may be a wireless connection, a hardwired connection, an intermittent connection (such as one that uses one or more handheld devices) or any other desired communication connection using any desired or appropriate communication protocol. Of course, any of the communication connections described herein may use an OPC communication server to integrate data received from different types of devices in a common or consistent format.

Still further, it is possible to place SPM blocks in host devices, other devices other than field devices, or other field devices to perform statistical process monitoring outside of the device that collects or generates the raw data, such as the raw process variable data. Thus, for example, the application 38 of FIG. 2 may include one or more SPM blocks which collect raw process variable data via, for example, the OPC server 89 and which calculate some statistical measure or parameter, such as a mean, a standard deviation, etc. for that process variable data. While these SPM blocks are not located in the device which collects the data and, therefore, are generally not able to collect as much process variable data to perform the statistical calculations due to the communication requirements for this data, these blocks are helpful in determining statistical parameters for devices or process variable within devices that do not have or support SPM functionality. Additionally, available throughput of networks may increase over time as technology improves, and SPM blocks not located in the device which collects the raw data may be able to collect more process variable data to perform the statistical calculations. Thus, it will be understood in the discussion below, that any statistical measurements or parameters described to be generated by SPM blocks, may be generated by SPM blocks such as the SPM1–SPM4 blocks in the ADBs 80 and 82, or in SPM blocks within a host or other devices including other field devices.

As the number of statistical data collection blocks or SPMs increases in a process plant, it is helpful to have an automated mechanism that gathers the statistical parameter data from the SPM blocks in the different devices, to trend the data and to provide detection results to an expert system for further data aggregation and decision making. In fact, at present time, it is very cumbersome and tedious to view all of the statistical process data for a large process. Currently, one must create an OPC client that individually monitors each of the SPM parameters of interest and, to do this, must individually configure every device for SPM collection. As indicated above, this configuration and viewing of statistical data is very time consuming and is vulnerable to human errors.

Figure 4:
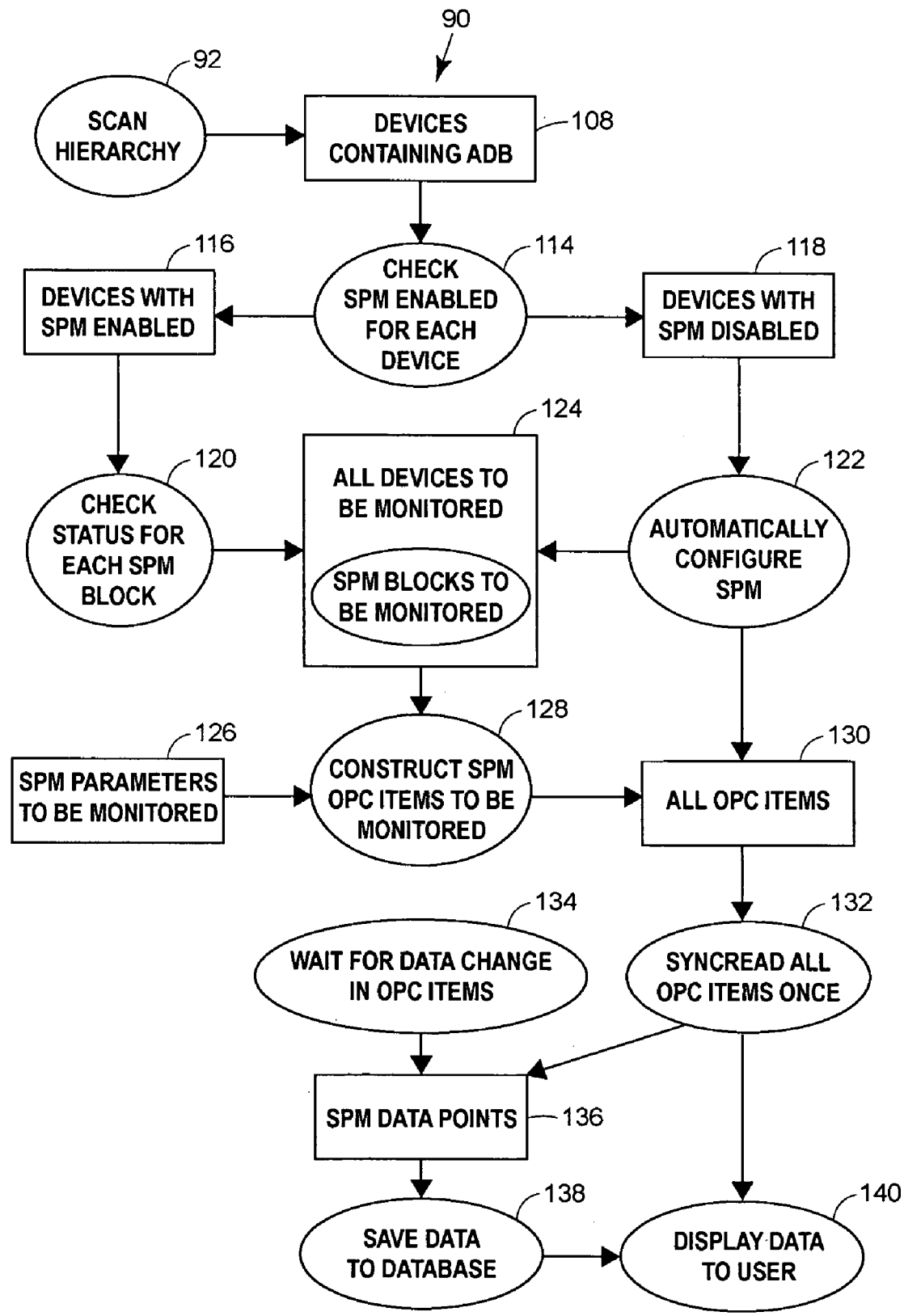
FIG. 4 is a flowchart diagram illustrating a technique for configuring statistical process collection blocks within a process plant and for collecting statistical data from those blocks during operation of the process plant.

The configuration and data collection application 38 is adapted to automatically configure SPM blocks in devices, such as in valves, transmitters, etc., and to gather the SPM data available in a process from these SPM blocks during operation of the process. FIG. 4 illustrates a flow chart 90 depicting an example technique that may be used by the application 38 to configure the devices within a process plant to collect SPM data and to automatically collect that data during operation of the process plant 10. In FIG. 4, circles represent actions performed in the process plant by the application 38, while rectangles represent objects or items that are used by or that are produced by the application 38. It will be understood that, while this example discusses the collection of SPM data from particular types of transmitters using a Fieldbus protocol and having Fieldbus blocks that collect the statistical data, this or a similar technique could be used to collect statistical data (or other parameters) from other devices using other communication and function block protocols, or from other devices or elements within devices which use a programming paradigm other than the function block programming paradigm.

In any event, at a first block 92, the application 38 scans the hierarchy of the process control network (e.g., the process plant) to determine a list of the devices within the process plant that include statistical data collection blocks (such as ADBs) therein. For the purposes of this discussion, it is assumed that the statistical data collection blocks are in the form of SPM blocks within Fieldbus ADBs as discussed above, although the block 92 could search for other types of statistical data collection blocks as well or in addition to Fieldbus type. SPMs in ADBs, and this method is not limited to use with Fieldbus ADBs or to SPM blocks within Fieldbus ADBs. In one embodiment, an OPC server (such as the server 89 of FIG. 2) may be used to allow a client, such as the application 38, to access control and device information. For example, the OPC Automation 2.0 product provides standard methods to browse the contents of an OPC server and these or other browser methods may be used to automatically traverse the OPC hierarchy to find devices that contain ADBs. In addition the new OPC specs include XML definitions, which may be used to integrate the data and make it available in a web environment.

Figure 5:
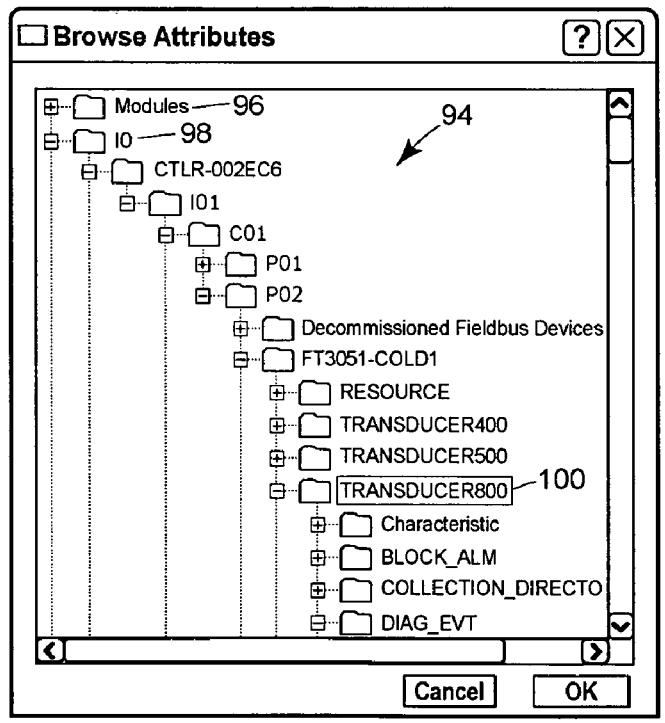
FIG. 5 is a depiction of a display screen illustrating a plant hierarchy as collected by an OPC server within the process plant of FIG. 1 or 2.

FIG. 5 illustrates a portion of an example plant hierarchy 94, created by an OPC server, which depicts the devices and other elements of a process plant being scanned by the OPC server. The top level of the hierarchy 94 has nodes 96 and 98 called Modules and IO, wherein the Modules node 96 includes control strategy information, and the IO node 98 includes the hardware/device information. As illustrated in the example hierarchy of FIG. 5, the IO node 98 includes sub-nodes associated with Controllers (CTLR), Cards (C) and Ports (P) wherein, in this example, the Ports (P) are associated with Fieldbus segments actually present in the controller network. Further down in the hierarchy, Fieldbus devices are listed under their respective ports. In the example of FIG. 5, each Fieldbus device that contains an ADB includes a node named TRANSDUCER800 or TRANSDUCER1300 under the device. (In Rosemount 3051F devices, the ADB is called TRANSDUCER800, while in Rosemount 3051S devices, the ADB is called TRANSDUCER1300). One such node 100 named TRANSDUCER800 is illustrated in the hierarchy of FIG. 5. The ADB node 100 includes the diagnostics information of interest. In this particular case, the application 38 is interested in the statistical process monitoring (SPM) parameters within the ADB node 100, which is expanded in the hierarchy of FIG. 5 to illustrate some of the elements associated with the ADB in a Rosemount 3051F device. Of course, the names "TRANSDUCER800" and "TRANSDUCER1300" are simply examples of names of known function blocks provided by one known manufacturer. Other ADB blocks or the SPM blocks may have other names, and/or the names may be different in a system other than one that utilizes OPC. In other implementations, different names may correspond to ADB blocks or the SPM blocks of other transducer blocks, function blocks, etc. later developed and/or provided by other manufacturers and/or as described in the Foundation Fieldbus specs, or could be blocks or other software elements in any other smart communication protocol (e.g., digital protocol) such as any element in the Profibus, HART, CAN, AS-Interface, HTML, XML, etc. protocols, to name but a few.

To discover the ADBs and, therefore, the SPM blocks within the ADBs, the block 92 (FIG. 4) automatically traverses or searches the OPC hierarchy 94 to locate all of the devices within the plant that contain ADBs. Of course, the block 92 may be programmed beforehand to know the format used by the OPC tree 94 so that the block 92 can traverse or browse the tree 94 to find the devices including the ADBs in the best manner. While the method described herein is based upon a DeltaV OPC Tree, modifications to the method could be made for other OPC servers as well as for plant hierarchies generated by other types of viewing tools.

When searching the hierarchy or tree 94, there is generally a trade-off between speed and robustness. In particular, searching the hierarchy 94 will not generally be 100 percent reliable in finding all of the devices with an ADB and only the devices with an ADB. Typically, the more accurate the method of finding the devices with ADBs, the slower the method will be. For example, if a different manufacturer has devices that show up in the OPC tree 94 with blocks having the same name as the ADB blocks within the 3051F transmitter, then searching the hierarchy may falsely detect this device as having an ADB. Conversely, if the block 92 tries to eliminate this problem by searching too many sub-nodes to assure that only nodes with actual ADBs therein are located, then the speed of the method is reduced.

In any event, in one embodiment, the block 92 may search every node in the hierarchy or tree 94 to locate each node having a name known to be associated with an ADB in some device. While, in some cases such as in large process plants, this may take a significant amount of searching time, it will be the most accurate method of finding each of the ADBs and, therefore, each of the SPMs, within a process plant. On the other hand, the block 92 may search down a hierarchy until it reaches or finds a node having a name associated with known statistical monitoring block, such as TRANSDUCER800 or TRANSDUCER1300 or any other specific name known to be used by some device manufacturer to indicate a known statistical monitoring block. If such a node is found, then the parent node associated with that nodes may be detected as a device with an ADB. While this method is not as robust as searching every node within a particular OPC hierarchy or tree, it should be faster. None-the-less, if another manufacturer makes a device with an OPC node named TRANSDUCER800, this method will still falsely detect the other device as having an ADB.

Alternatively, the block 92 may search under each node that it finds having a name associated with a known ADB for an additional item within a device also known to be uniquely associated with or indicative of an ADB. Thus, the block 92 may, after locating a node having a name known to be used by at least one manufacturer to specify an ADB, search of sub-node to see if the item Characteristic/BLOCK TAG.STRING has a value "ADVANCED DIAGNOSTICS." In this example, the Characteristic/BLOCK TAG.STRING OPC item has a value of "ADVANCED DIAGNOSTICS" only for devices with an ADB. While this method is very robust in locating only devices with ADBs, this method requires reading a value from a device via the OPC server, which takes significantly longer than just browsing the OPC hierarchy. Therefore, this method, while accurate, may be too slow for some circumstances.

Another method that may be implemented by the block 92 of FIG. 4 to search the OPC tree 94 which provides a middle ground between speed and robustness includes searching the OPC hierarchy under a node having a name commonly known to be associated with an ADB, for a sub-node having a name also commonly associated with an ADB. For example, this method may start at the top of the OPC tree 94 (FIG. 5) and search for the IO node 98. The method may then recursively search every sub-node under the 10 node 98. If a sub-node named TRANSDUCER800 or TRANSDUCER1300 (or some other name known to be associated with a statistical monitoring block, such as an ADB) is found, the method then checks to see if this node has a sub-node named SPM_ACTIVE, or any other sub-node that is specifically associated with a statistical monitoring block. If SPM_ACTIVE is found under the, for example, TRANSDUCER800 node, then the block 92 detects the parent node of the TRANSDUCER800 node as a device that contains an ADB.

Of course, the block 92 could use any of these techniques, or any combination of these techniques or any other desired techniques to search for devices having ADBs therein (and therefore having SPMs therein). For example, one implementation may attempt to identify at least all ADBs known to be implemented by devices of at least one manufacturer, but may or may not be able to identify all the ADBs in a process plant. As another example, an implementation may attempt to identify all ADBs known to be implemented by devices of several different manufacturers. Furthermore, while this scanning step has been described as being performed using an OPC hierarchy, i.e., one generated by an OPC server, this method could be applied to or used on hierarchies generated by other devices, such as a controller, a data historian which stores a configuration hierarchy within a process plant, a workstation storing a device hierarchy, etc. Thus, other implementations need not utilize an OPC server and/or an OPC hierarchy, but could use a variety of other computing devices, communication protocols, and hierarchy protocols including, for example, known and later-developed computing devices, communication protocols, and hierarchy protocols. Other implementations may utilize web servers, XML, and/or proprietary computing devices and protocols, for example.

In the process of discovering or searching for the devices containing an ADB, the block 92 may store a list of devices detected as having an ADB, an SPM block or other type of data collection block, as indicated by the box 108 of FIG. 4. If desired, the devices listed in the box 108 may be displayed in a tree-view display according to their hierarchy. An example of such a hierarchical display 110 is illustrated in FIG. 6. As will be understood, the hierarchy 110 displayed in the view of FIG. 6 is a subset of the hierarchy that would be displayed under a control network display generated by a controller, as not all of the devices within the control display will typically include ADBs. In fact, the view 110 of FIG. 6 is actually a copy of a controller hierarchy including only the devices containing an ADB. As will be understood, the display of FIG. 6 illustrates that the devices PT-101 and PT-102 (connected to port P01 of card C01 of input/output device. I01 of the controller named CTLR-002EC6) and devices PT-103, FT-201 and FT-202 (connected to port P02 of card C01 of input/output device I01 of the controller named CTLR-002EC6) each has an ADB therein.

To read any of the SPM parameters from a device, it is generally necessary to know the OPC item ID for that parameter. Typically, i.e., in the case of Fieldbus SPM blocks, the OPC item ID for an SPM parameter includes a Device ID followed by the item specifier. To locate the Device ID, the block 92 may, for each device node which has been determined to contain an ADB, find the sub-node SPM_ACTIVE. Next, the block 92 may obtain the OPC Item ID for the leaf "CV". For example, the OPC Item ID might be "DEVICE:0011513051022201100534-030003969/800/SPM ACTIVE.CV". The Device ID is then the OPC Item ID minus the suffix "SPM ACTIVE.CV". Thus, in this example, the Device ID is "DEVICE: 0011513051022201100534-030003969/800/". Of course, this is but one manner of determining a Device ID in an OPC system, it being possible to use other techniques as well or instead.

In any event, after the block 92 scans the hierarchy to determine the devices having an ADB, the application 38 knows or can easily determine the Device Tag, Device ID, and Device Location for each of these devices. An example of this data for a simple system containing 5 devices with ADB is shown in the table below.

TABLE 1

| Device Tag | Device ID | Device Location |
| --- | --- | --- |
| PT-101 | DEVICE: 0011513051022201100534-030003969/800/ | IO\CTLR-002EC6\IO1\C01\P01 |
| PT-102 | DEVICE: 0011513051021801020526-030003576/800/ | IO\CTLR-002EC6\IO1\C01\P01 |
| PT-103 | DEVICE: 0011513051110901091012-030007090/800/ | IO\CTLR-002EC6\IO1\C01\P02 |
| FT-201 | DEVICE: 0011513051110901101045-020008632/800/ | IO\CTLR-002EC6\IO1\C01\P02 |
| FT-201 | DEVICE: 0011513051110801210450-020008576/800/ | IO\CTLR-002EC6\IO1\C01\P02 |

Referring again to FIG. 4, a block 114 may next determine which of the devices stored in the box 108 have already been configured to perform statistical process monitoring. To perform this function, the block 114 may read the value SPM_ACTIVE.CV from the OPC server for each of the devices stored in the box 108. For example, for the transmitter PT-101 in the table above, the block 114 may read the OPC Item DEVICE:0011513051022201100534-030003969/800/SPM ACTIVE.CV. This OPC item can take a value of 0 or 255. In the case of Fieldbus SPM blocks, if the value is 0, then SPM block is disabled for that device and if the value is 255, then the SPM block is enabled for that device. Upon checking if SPM is enabled for each device, the block 114 can divide all of the devices into two categories, namely, devices with SPM already configured, and devices with SPM not yet configured. These categories or lists of devices are illustrated by the boxes 116 and 118 in FIG. 4.

After the block 114 determines if SPM is enabled in each of the devices listed in the box 108, a block 120 may check the status for each of the SPM blocks within each of the devices having SPM enabled, i.e., those devices listed or stored in the box 116. The block 120 basically performs this step to determine if each SPM block within the devices having SPM enabled is currently configured to monitor a process variable and, if so, to determine which process variable is being monitored. In this example, it is possible to determine if an SPM block is currently monitoring a process variable by reading the status of the SPM block. In Fieldbus SPM blocks, the status may be checked by reading the SPM[n] STATUS.CV item from the OPC server. Thus, for example, to read the status for SPM Block 1 in device PT-101 from the table above, the block 120 may read the OPC Item ID DEVICE: 0011513051022201100534030003969/800/SPM1 STATUS.CV.

Generally speaking, the value of status is an 8-bit number ranging from 0 to 255. The status is a combination of 8 different bits that can be on or off. The bits are: Inactive (1), Learning (2), Verifying (4), No Detections (8), Mean Change (16), High Variation (32), Low Dynamics (64), and Not Licensed (128). All SPM Blocks that are licensed, but have not been configured, have a Status of Inactive. If the Status of an SPM Block is Inactive or Not Licensed, the block 120 may determine that this block will not be monitored because it is not generating any useful information. However, if the Status is any of the other possibilities, the block 120 may monitor the SPM block.

In a similar manner, a block 122 may automatically configure each device not having SPM enabled (i.e., the devices listed in the box 118) to thereby enable at least one SPM block within those devices to detect or monitor a process variable to thereby produce statistical data with respect to that process variable. In many cases, such as with the Rosemount 3051F and 3051S transmitters, the devices are shipped from the factory with the SPM not yet configured, which generally requires a user to manually configure SPM in each device. In a plant with hundreds or thousands of devices with ADB, this would be a very tedious process. To alleviate this manual configuration, the block 122 automatically configures at least one SPM block for each device. To perform this configuration, the block 122 may determine or store an indication of the particular process variable to be monitored within a device. This variable could be the main process input, a PID block output, or any number of other function block variables (inputs or outputs) that are available in the Fieldbus device. The indication of which variable to monitor may be set during a configuration process, may be specified by the user on a case by case basis or may be generally specified by the user before operation of the routine 38.

While any of the process variables can be monitored, a logical variable to monitor for statistical purposes is the primary analog input of a device. For Rosemount 3051F/S transmitters, this variable is the measured pressure or flow (e.g., differential pressure). Thus, the block 122 may be configured to automatically configure one of the SPM blocks in an ADB of a device to monitor the primary analog input or output of the device. If desired, the user can still manually configure the other SPM blocks of the device. Alternatively, the block 122 may store a list of process variables to be monitored for each type of device and could use this list to select or determine which process variable(s) to monitor in any given situation. While the block 122 is described herein as configuring a single SPM block within a device to monitor one process variable, the block 122 could configure more than one SPM block within a particular device, to thereby monitor more than one process variable associated with that device.

In addition, the DeltaV OPC server allows a user (given sufficient administrative privileges) to write values to the certain items within devices. Thus, it is possible to change the SPM parameters in a device by writing to the appropriate item in the OPC server. The block 122 may therefore automatically configure a device to monitor SPM for the main process variables by writing a sequence of values to the OPC Server. In one particular example, the values that are written to the OPC Server are shown in the table below.

TABLE 2

| OPC Item ID | Value |
| --- | --- |
| [Device ID] SMP1_BLOCK_TAG.CV | AI1 |
| [Device ID] SMP1_BLOCK_TYPE.CV | 257 |
| [Device ID] SMP1_PARAM_INDEX.CV | 8 |
| [Device ID] SMP1_USER_COMMAND.CV | 2 |
| [Device ID] SMP_ACTIVE.CV | 255 |

Here, [DeviceID] should be replaced with the Device ID as found in Table 2. So for the device PT-101, the first OPC Item that would be written to is DEVICE: 0011513051022201100534-030003969/800/SPM MONITORING CYCLE.CV. After writing all of these items to the OPC Server, the device is configured to monitor the main pressure variable in the SPM 1 block. Of course, this is but one example of writing to a particular kind of SPM block in Fieldbus devices, it being understood that other methods of writing to other types of SPM blocks can be used as well or instead, with the write commands being determined by the communication protocol used by those SPM blocks.

In any event, the operation of the blocks 120 and 122 of FIG. 4 creates a set or a list of the SPM blocks to be monitored within the devices having ADBs. This list is illustrated as being stored in or associated with the box 124 of FIG. 4. Additionally, a box 126 in FIG. 4 specifies a set of SPM parameters that the application 38 should monitor for each of the SPM blocks being monitored. The list of SPM parameters 126 may be specified or selected by a user before or during operation of the application 38 or may be selected and specified individually for the different SPM blocks being monitored during the configuration process. The table below illustrates all of the SPM parameters that can be read from the OPC server for each Fieldbus SPM block.

TABLE 3

| Parameter Name | OPC Suffix |
| --- | --- |
| Block Tag | SPM[n]_BLOCK_TAG.CV |
| Block Type | SPM[n]_BLOCK_TYPE.CV |
| Mean | SPM[n]_MEAN.CV |
| Standard Deviation | SPM[n]_STDEV.CV |
| Mean Change | SPM[n]_MEAN_CHANGE.CV |
| Standard Deviation Change | SPM[n]_STDEV_CHANGE.CV |
| Baseline Mean | SPM[n]_BASELINE_MEAN.CV |
| Baseline Standard Deviation | SPM[n]_BASELINE_STDEV.CV |
| High Variation Limit | SPM[n]_HIGH_VARIATION_LIM.CV |
| Low Dynamics Limit | SPM[n]_LOW_DYNAMICS_LIM.CV |
| Mean Limit | SPM[n]_MEAN_LIM.CV |
| Status | SPM[n]_STATUS.CV |
| Parameter Index | SPM[n]_PARAM_INDEX.CV |
| Time Stamp | SPM[n]_TIMESTAMP.CV |
| User Command | SPM[n]_USER_COMMAND.CV |

However, it may not be necessary to monitor all of these parameters for each SPM block being monitored. In fact, it is possible that the OPC server may become overloaded if too many items are being monitored. Therefore, the application 38 may provide a mechanism by which a user is enabled to select the set of SPM parameters to be monitored. An example of a screen that would allow for this selection is shown as FIG. 7, wherein a user may check the SPM parameters that the user wishes to have monitored for each of the SPM blocks identified by the box 124.

A block 128 uses the list of SPM parameters to be monitored (as identified by the box 126) and the list of SPM blocks to be monitored (as identified by the box 124) to construct the set of SPM OPC items to be monitored by the application 38 during operation of the process. The block 128 may store this set of OPC items, as indicated by the box 130, for use in later steps of the monitoring process. Generally speaking, the block 128 creates the SPM OPC items for each SPM parameter to be monitored (indicated by the box 126) for each of the SPM blocks to be monitored (indicated by the box 124). In other words, given a set of SPM blocks to be monitored, and a set of SPM parameters to be monitored for each such block, the block 128 constructs a set of OPC items to be monitored as the OPC items for every possible combination of SPM blocks to be monitored and SPM parameters to be monitored. Thus, for example, if there are ten SPM blocks to be monitored, and five, SPM parameters to be monitored per SPM block, the block 128 will create a total of 50 OPC items. In this example, the OPC Item ID is a combination of the Device ID and the OPC Suffix from the tables above. For example, to read the mean for SPM 1 in device PT-101, the OPC Item ID would be: DEVICE: 0011513051022201100534030003969/806/SPM1 MEAN.CV.

After all of the OPC items have been identified and stored in the box 130, blocks 132 and 134 monitor the SPM parameters for changes during operation of the process. Some of the SPM parameters may change, for example, every 5–60 minutes depending upon the configuration of the SPM blocks, while other SPM parameters may change only when the SPM block is configured. As a result, the block 132 may first read the current value of all of the SPM parameters (specified by the OPC items of the box 130) when the process of monitoring the SPM parameters is started. In one embodiment, the block 132 may perform this read using a SyncRead function calling for a read of each of the OPC item IDs. Reading each of the SPM parameters produces a set of SPM data points, as indicated by the box 136 of FIG. 4.

After the first read of the SPM parameters, the block 134 may wait for changes in the SPM parameters. That is, after the initial values of each of the SPM parameters being monitored are read from OPC server to obtain the first set of SPM data points, the block 134 receives or obtains additional data indicating changes in any of the SPM parameters being monitored. Depending upon the configuration of the SPM blocks, the parameters Mean and Standard Deviation may change, for example, every 5–60 minutes. None-the-less, when any of the SPM parameters changes, the OPC server raises a DataChange event, which event is captured by the OPC client, e.g., the application 38. Alternatively, the block 134 may periodically or at preset times poll or read each of the SPM parameters being monitored to obtain new data points (box 136). In this manner, the SPM parameter data is read even if it has not changed. Of course, the block 134 may operate continuously during operation of the process to receive new SPM parameters and to store this SPM parameter data in a database for viewing by a user, for use by a rules engine described in more detail below, or for any other purpose. Of course, if desired, the routine 90 of FIG. 4 may detect and configure SPM blocks or other statistical data collection blocks in the host device to enable these SPM blocks to provide statistical measures or parameters to other elements of the abnormal situation prevention system 35 (FIG. 1).

In fact, at any time after any of the SPM data points of box 136 are read, a block 138 may store or save these data points in a local database (such as the database 43 of FIGS. 1 and 2) so that these data points can be referenced in the future for trending or other viewing purposes. Additionally, a block 140 may be used to present the SPM data to a user in any desired or useful format, for any purpose, such as for detecting or predicting abnormal situations within the process plant. The block 140 may be implemented by the viewing application 40 illustrated in FIGS. 1 and 2, if desired.

Figure 9:
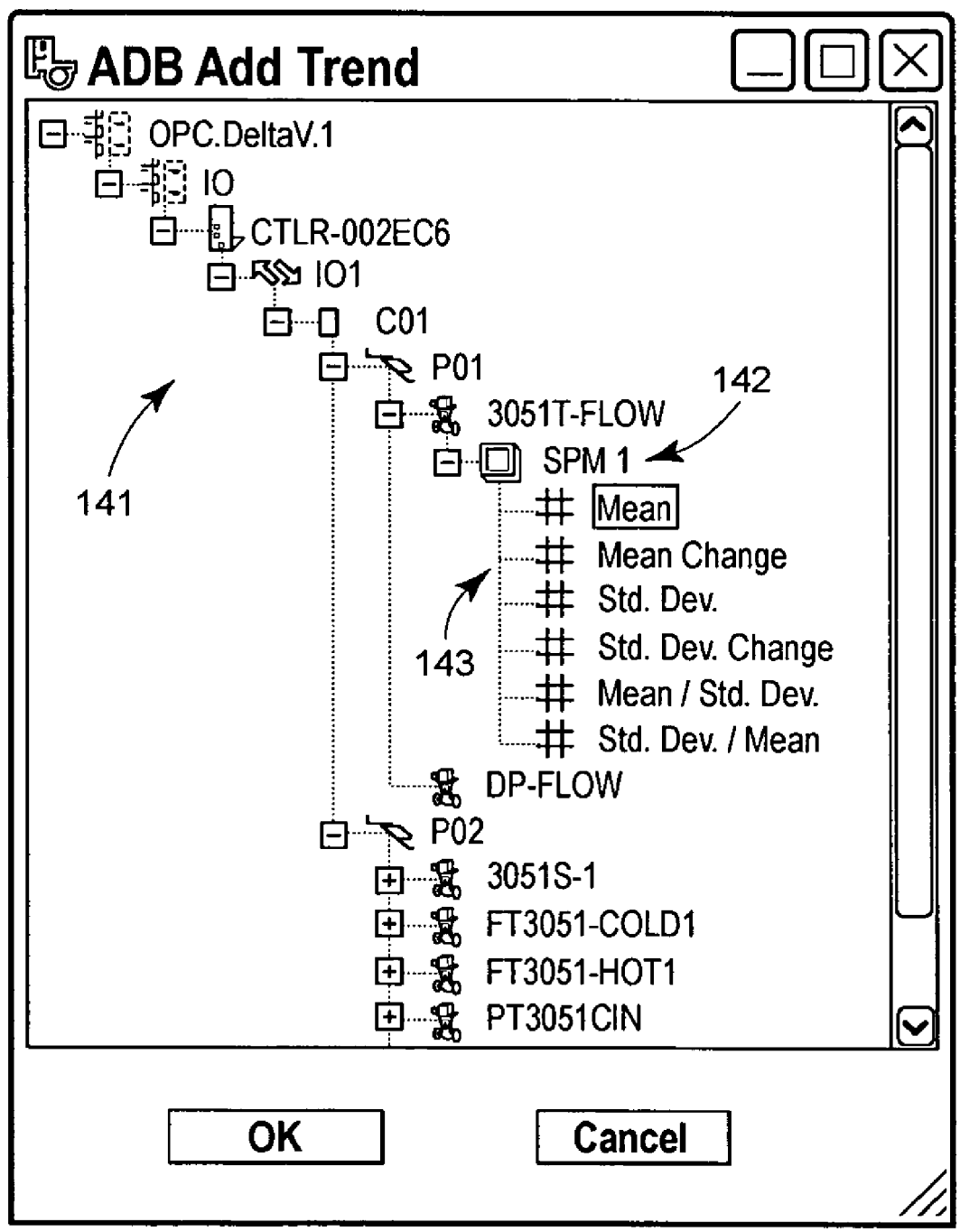
FIG. 9 is a depiction of a screen display illustrating an explorer hierarchy including statistical data elements collected from a data collection block within a device.

Generally speaking, the viewing application 40 (which may be implemented by the block 140 of FIG. 4) may display the SPM parameter data to a user in any desired or useful format to enable the user, for example, to view the most recent SPM data at a glance. For example, the viewing application 40 may display the SPM data using a conventional explorer type display. An example of such a display is depicted in FIG. 8, in which the explorer hierarchy 110 of FIG. 6 is provided on the left Side of the display screen with the SPM parameters being monitored (as specified by the screen of FIG. 7) being depicted on the right side of the display 115 for each of the SPM blocks being monitored. It will be noted that the SPM data is categorized by device in the display section 115 to make it easy to find or view the data as being associated with a particular device. Of course, the user may select any of the items or nodes in the hierarchy 110 to view the SPM data associated with those items or nodes. Additionally, if desired, the viewing application 40 may provide an explorer display such as that of FIG. 9 which includes SPM block elements and the SPM parameters being monitored for the SPM block elements. Thus, in the example hierarchy 141 of FIG. 9, an SPM block 142 named SPM 1 is illustrated as located in a device named 3051-Flow. The elements 143 below the SPM 1 block 142 indicate the SPM parameters being monitored and available to the user for viewing. In this case, these parameters include Mean, Mean Change, Standard Deviation, Standard Deviation Change, Mean divided by Standard Deviation and Standard Deviation divided by Mean.

Figure 10:
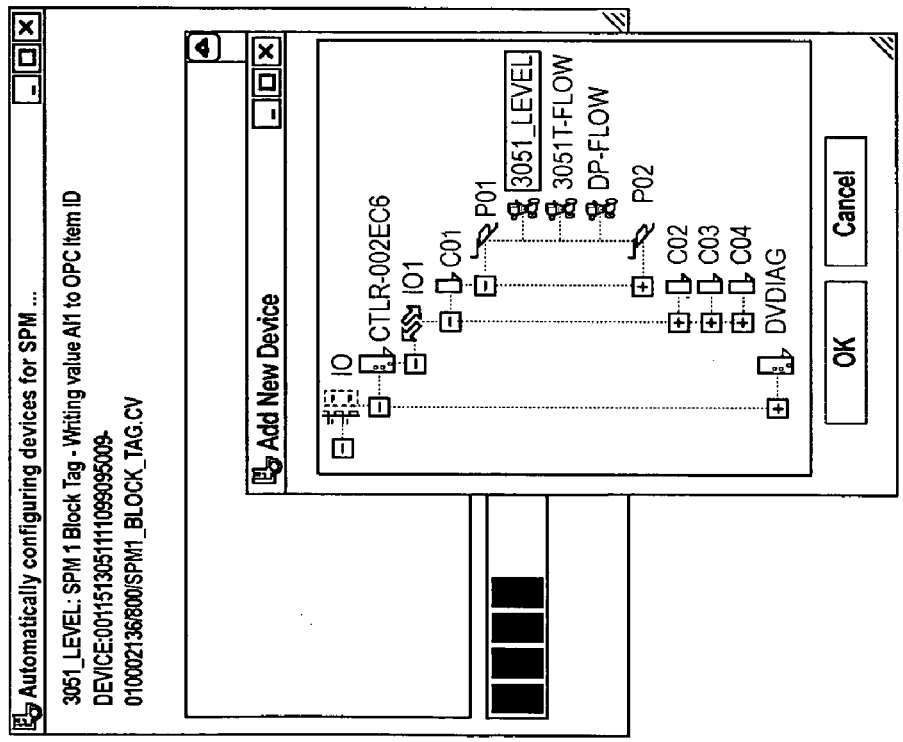
FIG. 10 is a depiction of a screen display illustrating a manner of adding or configuring a statistical data collection block within a field device.

If desired, the viewing application 40 may allow or enable a user to add or reconfigure one or more SPM blocks within a field device or even within a host or other device in which these blocks are located. FIG. 10 illustrates a screen display 144 which, in this case, is enabling a user to add a new device to the port named P01 and, additionally, to add or configure an SPM block within that device, as illustrated by the window 145. Here, the SPM block is named SPM1, is associated with a device tag of FT3051-COLD1 (which is illustrated in the hierarchy on the left side of the screen 144 as the device 3051_LEVEL), and is related to (operates on) the OUT parameter or variable of an Analog Input function block named AI1. In this case, the viewing application 40 also enables the user to specify the SPM parameters of interest (i.e., to be monitored) as well as baseline and threshold values, such as mean, mean change, standard deviation change, etc. for the SPM block.

Figure 11:
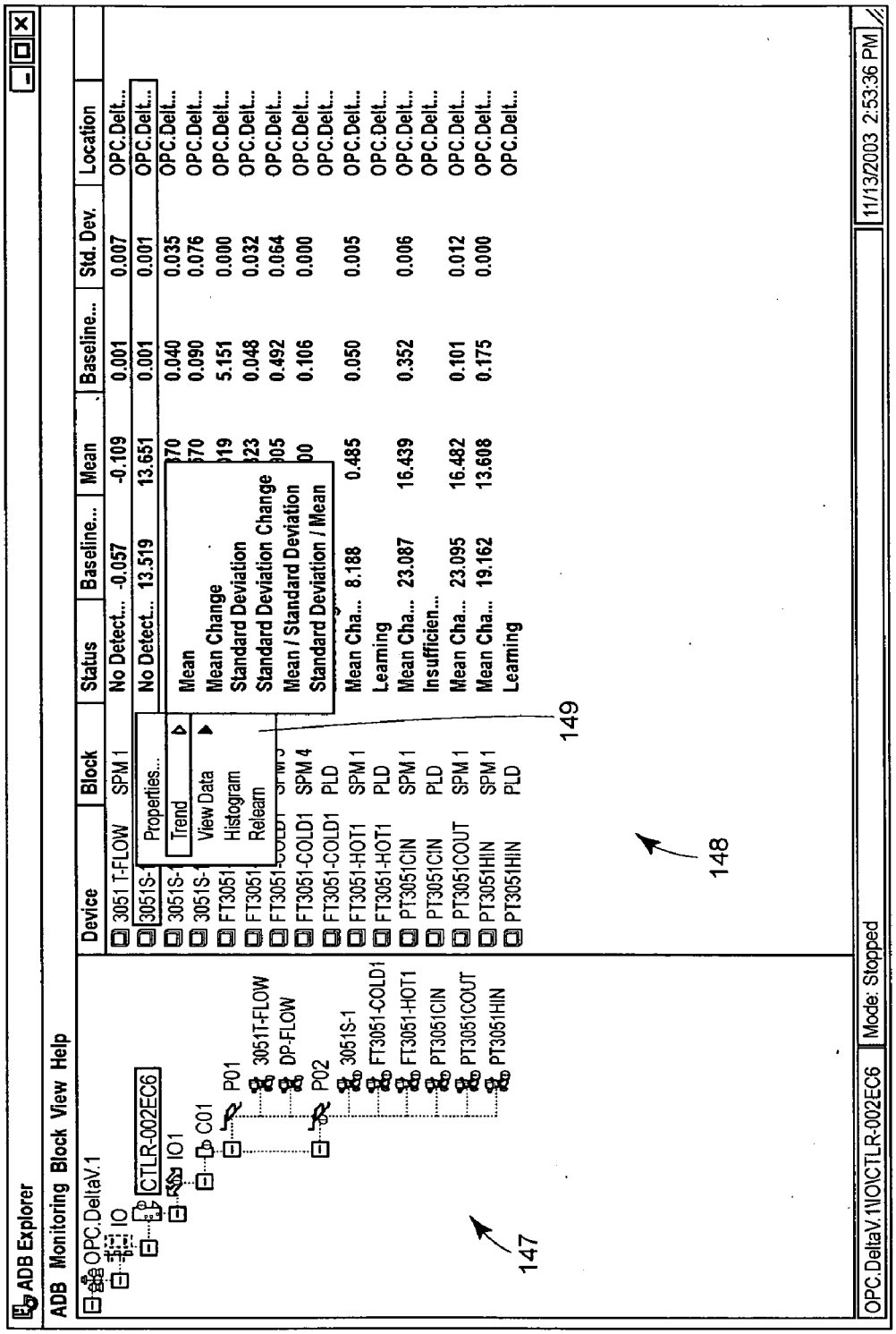
FIG. 11 is a depiction of a screen display illustrating the manner in which a user may navigate to view trend data.

Still further, the viewing application 40 may enable a user to navigate through a hierarchy to obtain a view of certain kinds of data either directly from the SPM blocks (or other monitoring blocks) or data generated therefrom by for example, the application 40. For example, FIG. 11 illustrates a screen display 146 which depicts a plant hierarchy 147 on the left side of the screen and one or more SPM or other blocks associated with the devices in the hierarchy in a view 148 on the right side of the screen 146. Upon selecting one of the SPM blocks (in this case, SPM1 of the 3051S-1 device), the user may use a pull down or pop-up window 149 to select a manner in which to view the data from the SPM1 block. In FIG. 11, the user has selected to view a Trend plot and a further pop-up or pull down window enables the user to specify the specific SPM parameter data (or combinations thereof) to display in a Trend plot. In this case, it will be understood that some of the possible types of data to be trended may be determined as combinations of data from one or more of the SPM blocks and these combinations may be calculated in the host (e.g., by the application 40), or in the field device or other device which has access to this raw data.

Figure 12:
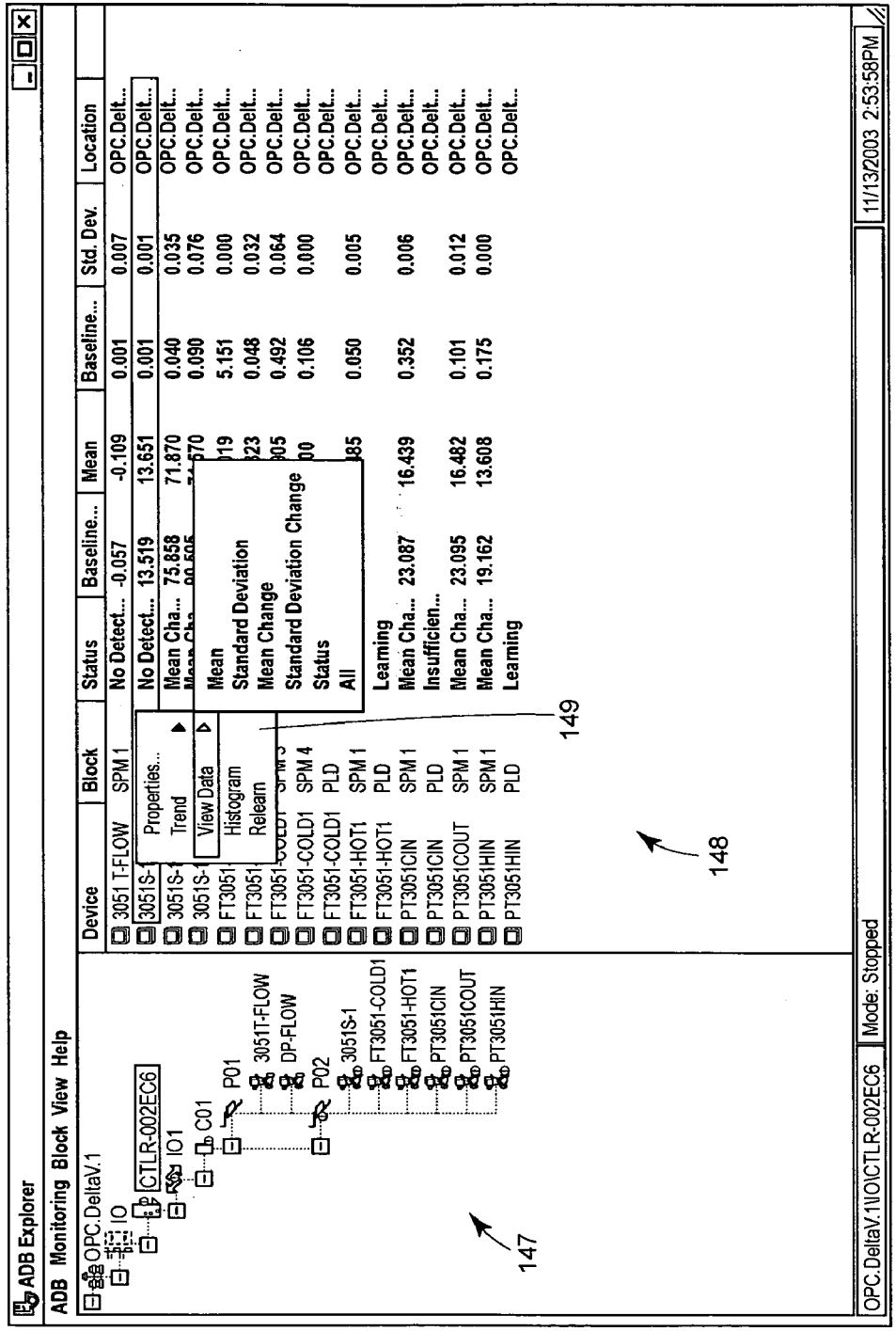
FIG. 12 is a depiction of a screen display illustrating the manner in which a user may navigate to view raw data collected from a statistical collection block.

FIG. 12 illustrates the screen 146 in Which the user has selected to view data directly in the pop-up window 149. Here, of course, the selection of data in the further pop-up window may be different and specify the raw data collected or generated by the SPM block without providing options for data generated within the host device (such as the mean divided by the standard deviation, etc.) It will, of course, be understood that the application 40 may obtain the data from the SPM block or, in some cases, may generate that data from raw statistical data collected from the SPM block. Still further, other types of views or options may be provided to view data (either from SPM blocks or data generated from data from SPM blocks), such as a histogram plot. Also, the user may use the screen 146 and the pop-up window 149 to perform other functions, such as to delete SPM data, to start a new data collection cycle, etc.

Figure 13:
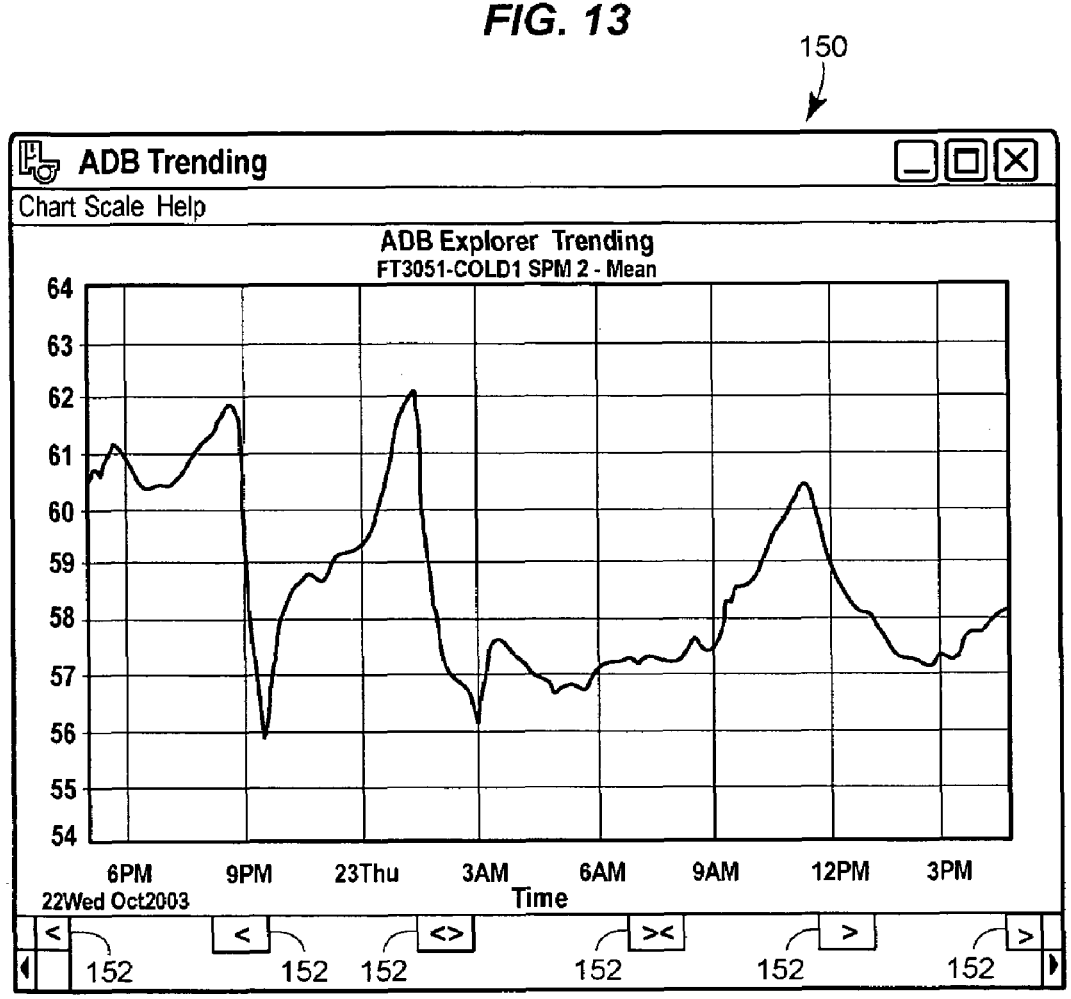
FIG. 13 is a depiction of a screen display illustrating a plot of a statistical process monitoring parameter versus time.

FIG. 13 illustrates an example trend graph 150 that may be generated by the application 40, showing an SPM mean versus time. In this display, a user may use the control buttons 152 to review earlier or later data, to go to the beginning or end of the data, to search for limits within the data, etc. In any event, a trend window, such as that of FIG. 13, enables a user to view the historical behavior for any SPM parameter. Depending upon the process, it is possible to characterize abnormal conditions, based upon the trend of different process variables. However, there is virtually no limit to what the user could do with the statistical process data, it being understood that the user can use this data for other purposes besides detecting current or future abnormal situations within the process plant. Still further, the user can view the collected statistical data in any format or view that makes this data easier to read, understand and to use to detect and predict events within the process plant.

At a fast glance, the graph of FIG. 13 looks just like a regular graph of a process variable over time. However, it should be noted that this graph is not a plot of a pure process variable data over time, but rather, a plot of the mean of the process variable calculated at a certain interval. While it is possible to use a DCS historian to plot the mean of a process variable versus time, the difference here is that the mean of the process variable is being calculated in a device which is, typically, originally collecting that data and wherein the data is obtained at a much faster rate. Therefore, it is believed that measurement noise will not be present in graph of FIG. 13 to the extent it would be in a plot created by the data historian. Additionally, the statistical measure, e.g., the mean, should be more accurate because it will typically be based on more collected data.

Figure 14:
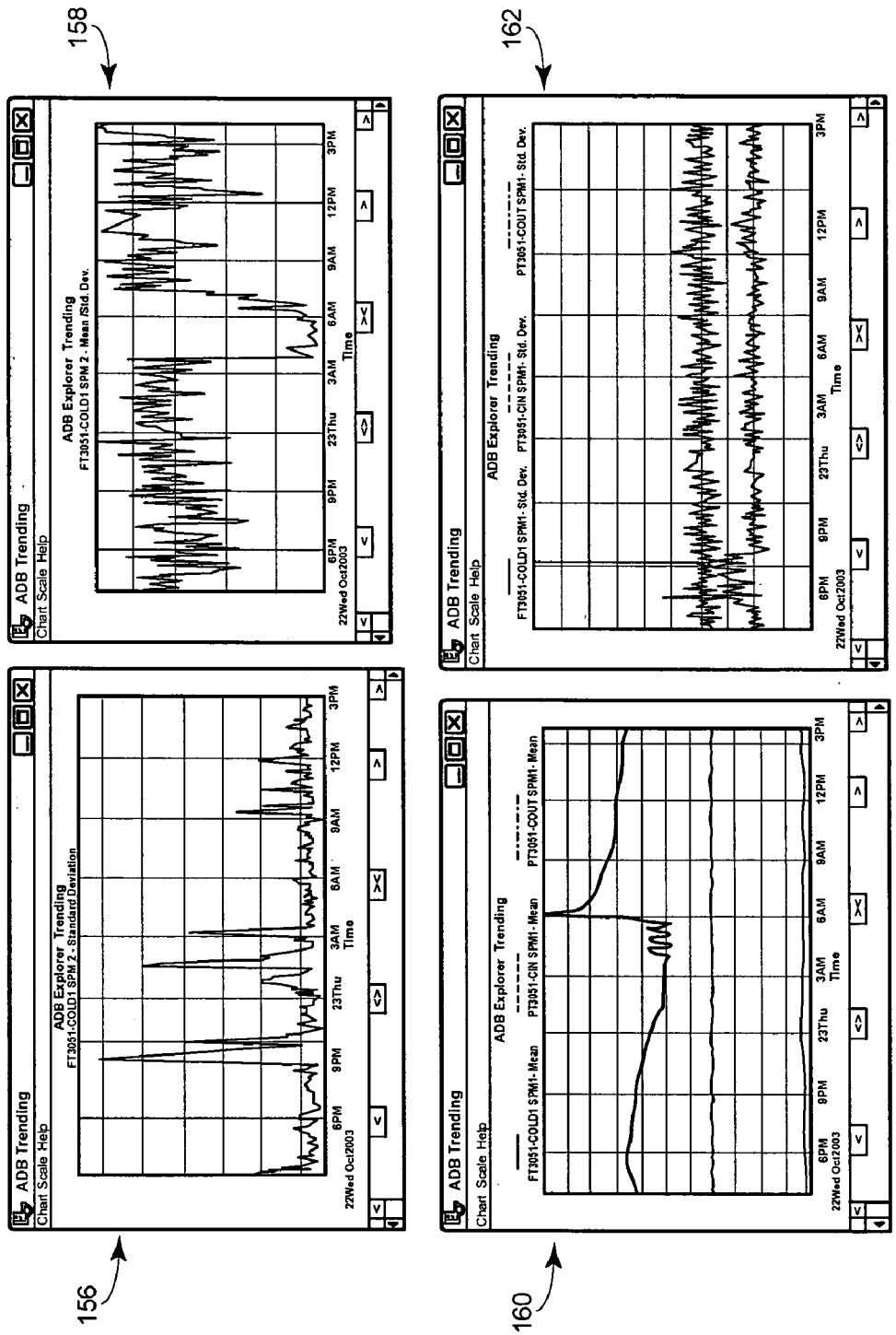
FIG. 14 is a depiction of a screen display illustrating a set of four plots of different statistical process monitoring parameters versus time, each having one or more parameters depicted on the same plot.

In a similar manner, the application 40 may plot any other of the SPM parameters (e.g., Standard Deviation, Mean Change, Standard Deviation Change, etc.) versus time as well as any mathematical combination of the SPM parameters (e.g., Standard Deviation divided by Mean, etc.) Also, the application 40 may place any combination of any of these plots on the same graph or page, to make comparisons between the different statistical data easier for the user. FIG. 14 illustrates a set of graphs of different statistical measures of process variables over the same time frame, all of which may be presented to a user at the same time on the same display screen or at different times on the same or different display screens. In FIG. 14, a graph 156 at the upper left plots the standard deviation versus time, a graph 158 at the upper right plots mean divided by standard deviation versus time, a graph 160 at the lower left plots three different means (from different SPM blocks) Versus time on the same scale and a graph 162 at the lower right plots three standard deviations (from different SPM blocks) versus time on the same scale. Of course, the viewing application 40 may present any of the monitored SPM parameters or any mathematical combination of these parameters over time on a graph, and may present any number of different SPM parameters (or mathematical combinations thereof) over time on the same graph to help aid a user to understand what is happening within the process plant.

Statistical process control is often used in the process control industry to determine whether or not a certain process variable is outside of the allowable limits. There are typically both upper and lower control limits (UCL, LCL) and upper and lower specification limits (USL, LSL), which can be calculated based on the SPM data collected by the application 38. The control limits may be, in one example, expressed as UCL=µ+3σ and LCL=µ−3σ where µ and σ are the baseline mean and baseline standard deviation, respectively. Additionally, the specification limits may be expressed as:

$$USL = \left(1 + \frac{\Delta_\mu}{100}\right) \cdot \mu \qquad \text{(Equ. 1)}$$

$$LSL = \left(1 - \frac{\Delta_\mu}{100}\right) \cdot \mu \qquad \text{(Equ. 2)}$$

wherein $\Delta_\mu$ is a user-specified mean limit, in percent. Of course, the viewing application 40 may calculate these values directly or may allow a user to input these values.

Figure 15:
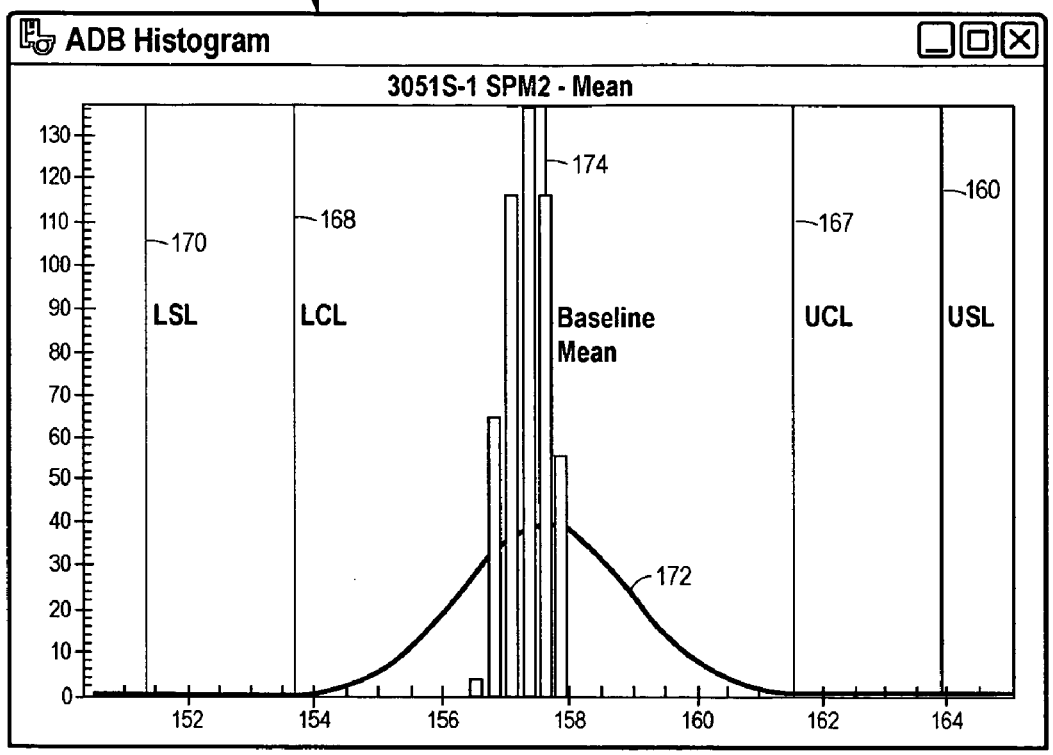
FIG. 15 is a depiction of a screen display illustrating a histogram plot of a statistical process monitoring parameter, including control and specification limits.

With these or similar points, the viewing application 40 may plot the distribution of a mean against the baseline mean and the control limits to thereby provide a visualization of when a mean limit is reached or exceeded during operation of the plant. The result is essentially a histogram graph that may look similar to the graph 166 of FIG. 15. As will be understood, the upper and lower control limits are illustrated by lines 167 and 168, respectively, and the upper and lower specification limits are illustrated by lines 169 and 170, respectively. Additionally, the mean points (i.e., the number of mean points at each value) are plotted in the line 172 and the baseline mean points are plotted using the histogram plot 174. If the process is under control, as shown in the graph 166, all of the data lies within the limits. If there is an abnormal situation, some of the data may exceed (fall outside of) either the control or specification limits 167–170. Again, the graph 166 is different than a standard histogram plot, because the graph 166 plots the means (and baseline means) of process measurements, and not the process measurements themselves.

Figure 16:
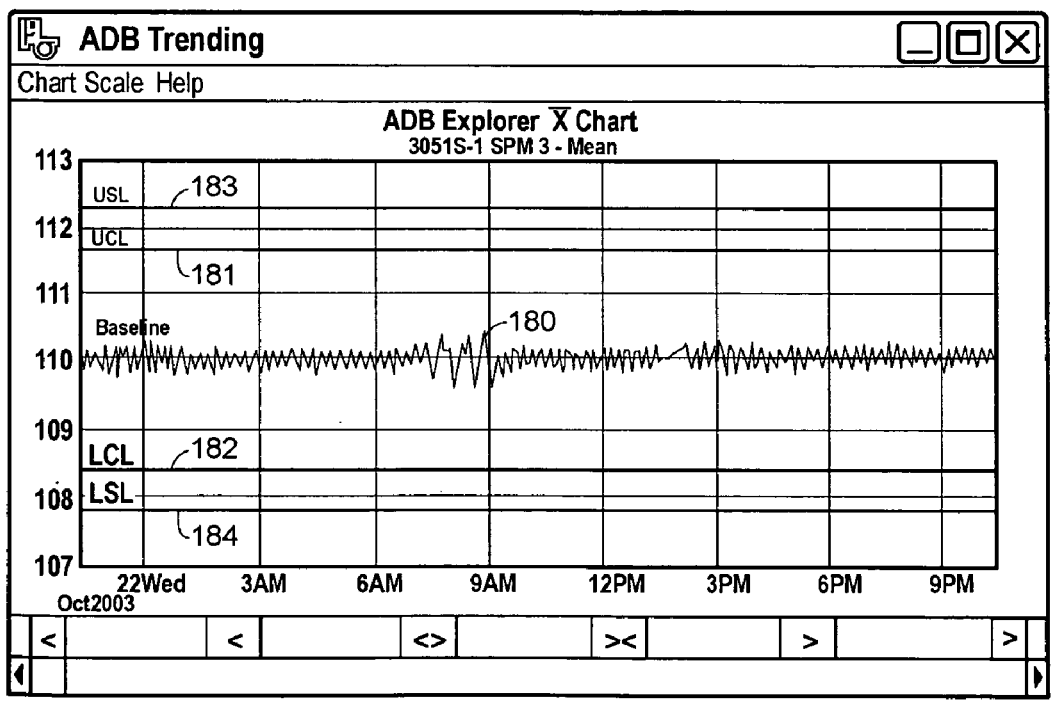
FIG. 16 is a depiction of a screen display illustrating an X-Chart of a statistical process monitoring parameter versus time.

If desired, the viewing application 40 may add the control and specification limits, such as those discussed above, to the plots of the mean, standard deviation or any other desired statistical measurement (such as a medium, etc.) versus time. When the limits are added to a mean versus time plot, the resulting plot is called an X-Chart. An example of an X-Chart 178 for a statistical mean is illustrated in FIG. 16 wherein the mean versus time, is represented by the line 180, the upper and lower control limits are indicated by the lines 181 and 182, respectively, and the upper and lower specification limits are indicated by the lines 183 and 184, respectively.

In this case, it may be desirable to make an adjustment to the calculation of the upper and lower control limits because the viewing application 40 is not plotting the actual process variable, but is plotting the mean, over a certain interval of time. Because the measurement noise is reduced, the same variation that one would see in a standard X-Chart that plots the values of the process variable does not exist. One possible adjustment that could be made to the upper and lower control limits is to divide the $3\sigma$ portion by the square root of the number of data points that are used to calculate each mean. According to this formula, the upper and lower control limits would be calculated as follows:

$$UCL = \mu + \frac{3\sigma}{\sqrt{N}} \quad \text{(Equ. 3)}$$

$$LCL = \mu - \frac{3\sigma}{\sqrt{N}} \quad \text{(Equ. 4)}$$

where N=(Monitoring Cycle)*(60)*(Samples per second)

Here, the monitoring cycle is the number of minutes over which the mean and the standard deviation are calculated. A default of 15 minutes may be used. Samples per second is based on the sampling rate of the device taking the measurements, which is, for example, 10 for a Rosemount 3051F transmitter and 22 for a Rosemount 3051S transmitter, although other sampling rates could be used.

Additionally, the application 40 may produce an S-Chart, in which the standard deviation versus time is plotted with the control and specification limits. In this case, the upper and lower control and specification limits may be defined as follows:

$$UCL = \left(1 + \frac{3}{\sqrt{2(N-1)}}\right) \cdot \sigma \quad \text{(Equ. 5)}$$

$$LCL = \left(1 - \frac{3}{\sqrt{2(N-1)}}\right) \cdot \sigma \quad \text{(Equ. 6)}$$

$$USL = \left(1 + \frac{\Delta_{HV}}{100}\right) \cdot \sigma \quad \text{(Equ. 7)}$$

$$LSL = \left(1 + \frac{\Delta_{LD}}{100}\right) \cdot \sigma \quad \text{(Equ. 8)}$$

where $\Delta_{HV}$ is a user-defined High Variation Limit, in percent, and $\Delta_{LD}$ is a user-defined Low Dynamics Limit, with $\Delta_{LD}<0$.

Figure 17:
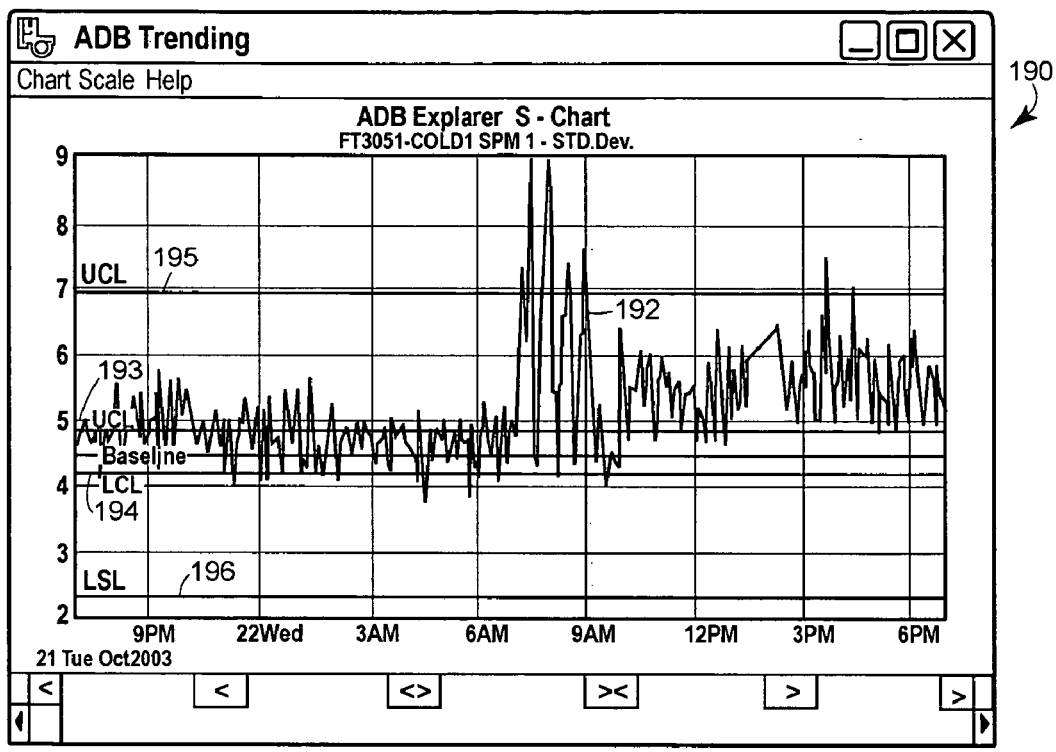
FIG. 17 is a depiction of a screen display illustrating an S-Chart of a statistical process monitoring parameter versus time.

An example of an S-Chart 190 is illustrated in FIG. 17. Here, the standard deviation versus time is plotted as the line 192, while the upper and lower control limits are plotted as line 193 and 194, respectively, and the upper and lower specification limits are plotted as the lines 195 and 196, respectively. In the example of FIG. 17, the standard deviation of the process variable crosses over the upper and lower control limits numerous times, and crosses over the upper specification limit a significant number of times, thereby potentially indicating the current or potential future presence of an abnormal situation.

Still further, the application 40 could determine other statistical measurements or values from the collected data. For example, the application 40 could calculate a distribution index or measurement for a variable x, which can include any statistical variable, as:

$$f(x) = \frac{1}{\sqrt{2\pi}\sigma} \exp\left(\frac{-(\chi-\mu)^2}{2\sigma^2}\right) \quad \text{(Equ. 9)}$$

The application 40 could calculate a capability index or measurement as:

$$C_p = \frac{USL - LSL}{6\sigma} \quad \text{(Equ. 10)}$$

and could calculate a correlation coefficient between two variables (which may include statistical variables), as:

$$R_{xy} = \frac{\sum_{i=1}^{N}(x_i-\bar{x})(y_i-\bar{y})}{\sum_{i=1}^{N}(x_i-\bar{x})^2 \sum_{i=1}^{N}(y_i-\bar{y})^2} \quad \text{(Equ. 11)}$$

In another example, a correlation coefficient between two variables can be calculated as:

$$R_{xy} = \frac{\sum_{i=1}^{N}(x_i-\bar{x})(y_i-\bar{y})}{\sqrt{\sum_{i=1}^{N}(x_i-\bar{x})^2 \sum_{i=1}^{N}(y_i-\bar{y})^2}} \quad \text{(Equ. 12)}$$

Of course, the viewing application 40 could perform other calculations for any variable or variables (including statistical variables as well as process variables) as desired or needed within the system to determine one or more abnormal situations within a process plant. Thus, for example, the application 40 or some routine therein may perform principle component analysis, regression analysis, neural network analysis, or any other single or multi-variable analysis on the collected data to perform abnormal situation detection and prevention.

Figure 18:
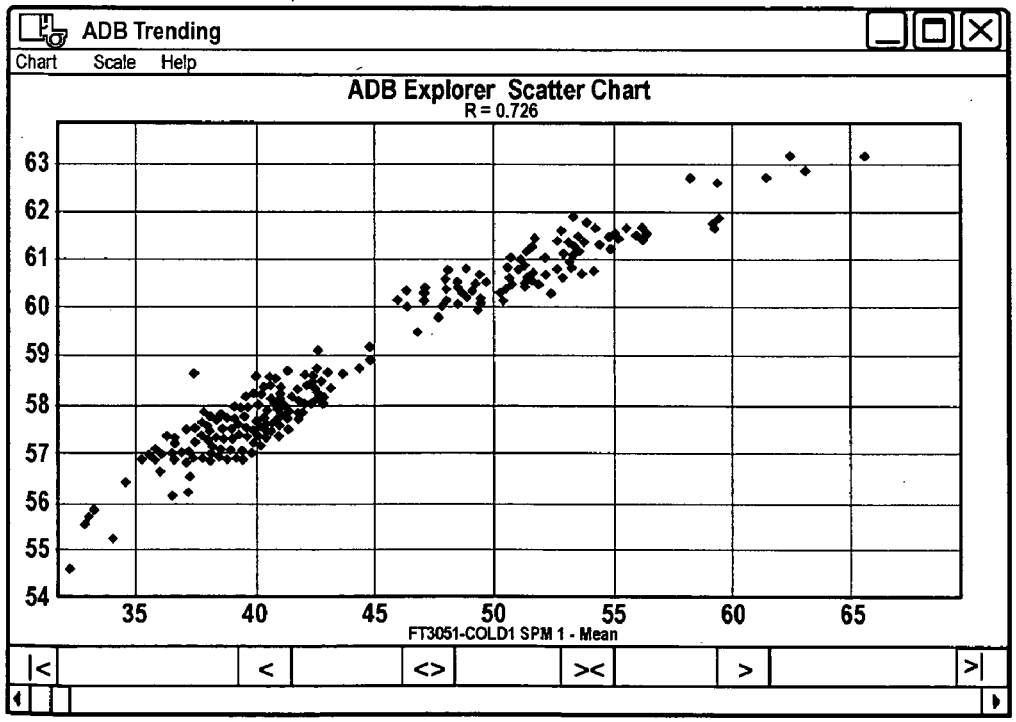
FIG. 18 is a depiction of a screen display illustrating a two-dimensional scatter chart for a set of statistical process monitoring parameters.

Generally speaking, the graphs of FIGS. 13, 14, 16 and 17 are based upon plotting one or more SPM parameters versus time. However, the viewing application 40 may provide graphs that indicate or illustrate correlations between one or more SPM variables without regard to time. In one example, the viewing application 40 may produce a scatter chart that plots one SPM parameter against another. The viewing application 40, or a user may determine a correlation coefficient, which provides an indication of how well two SPM parameters (or some combination of two SPM parameters) are correlated together. FIG. 18 illustrates a scatter chart 200 which plots two SPM mean parameters with respect to one another. Here, it can generally be seen that the two means are proportionally correlated due to the basic straight line nature of the scatter points (i.e., as one mean increases, the other mean tends to increase). Points which fall well outside of the general scatter regions may indicate a potential problem within the plant.

Of course, the viewing application 40 is not limited to providing two-dimensional scatter charts such as that of FIG. 18. In fact, the viewing application 40 may provide three or more dimensional scatter charts plotting three or more SPM parameters with respect to one another. FIG. 19, for example, illustrates a three-dimensional scatter chart 210 which plots the relationship of three SPM parameters with respect to one another and, in particular, the means of three process variables against each other.

FIG. 20 illustrates a four-dimensional scatter diagram matrix 220 which illustrates the correlation between four SPM parameters. Essentially, the scatter diagram matrix 220 includes 16 different two-dimensional scatter charts, with each of the 16 scatter-charts plotting one of the four SPM parameters versus another one of the four SPM parameters. Here, the user can still quickly view the correlation or relationship between different SPM parameters in an attempt to detect a current abnormal situation or to predict a future existence of an abnormal situation within the process plant.

Again, the scatter charts of FIGS. 18–20 are different than other known scatter plots in that these scatter charts plot means of one or more process variables, not the process variable data points themselves. Therefore, the noise typically present in the process variables is reduced, resulting in smoother and more understandable depictions of the data. Furthermore, the application 40 is not restricted to plotting just the mean, but could plot the relationships between other statistical variables, such as standard deviations, medians, etc. Still further, the application 40 may plot different types of statistical variables with respect to one another, such as a mean and a standard deviation, as well as combinations of statistical variables, such a standard deviation divided by a mean for one process variable versus a mean for another process variable. As examples only, the application 40 could plot the mean, standard deviation, mean change, standard deviation change, or any mathematical combination of these SPM variables for any SPM block monitoring a process variable.

Figures 21, 22:
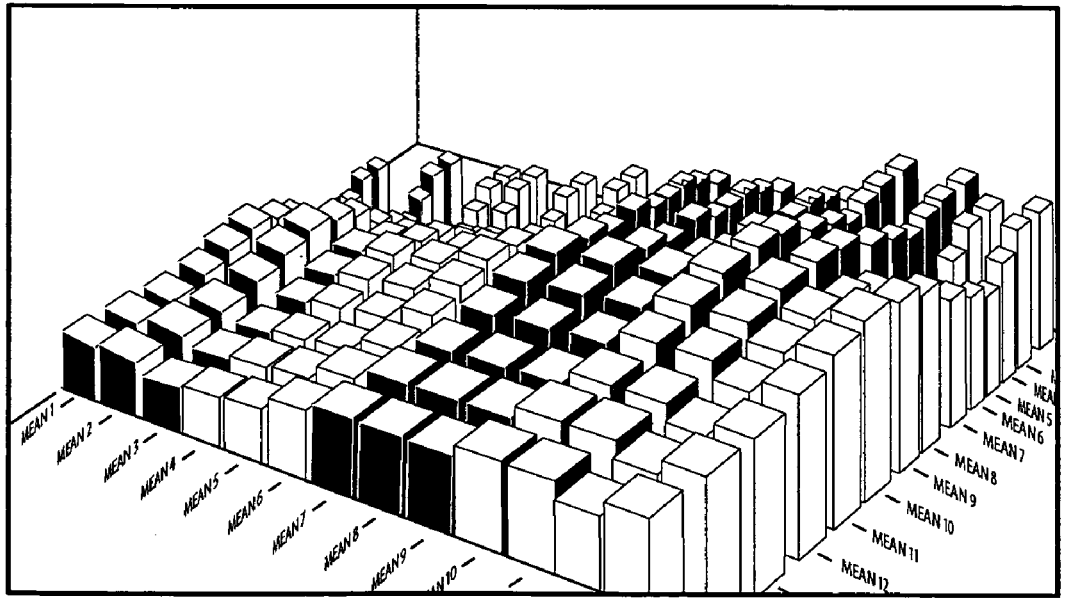
FIG. 21 is a depiction of a screen display illustrating a correlation matrix for a set of statistical process monitoring parameters.
FIG. 22 is a depiction of a screen display illustrating a three-dimension bar graph depicting a portion of the correlation matrix of FIG. 21.

If desired, and as generally noted above, the viewing application 40 may calculate or determine a correlation coefficient for any pair of SPM parameters using any standard or known correlation calculations. When the correlation coefficient is near 1 (or −1), there is a strong linear correlation (or negative linear correlation) between the two SPM parameters. For a set of more than two SPM variables, a correlation matrix can be determined, where each element in the correlation matrix defines the correlation coefficient between a different set of two of the SPM parameters. FIG. 21 illustrates part of an example correlation matrix 230 having correlation coefficients for the means of at least nine sensors measurements within a cascade loop of a process plant.

From the correlation matrix 230 of FIG. 21, it can be determined which SPM parameters have the strongest correlations with one another. Obviously, a matrix of numbers like that of FIG. 21 is not, easy to look at. However, the application 40 could display this matrix as a three-dimensional bar chart, such as the bar chart 240 illustrated in FIG. 22. In the three-dimensional bar chart 240, it is visually very clear where the strongest correlations lie. Of course, the application 40 may display the correlation matrix in other graphical manners as well, such as a wire-frame plot, a contour plot, etc., all of which would show where the strongest correlations lie.

Figure 23:
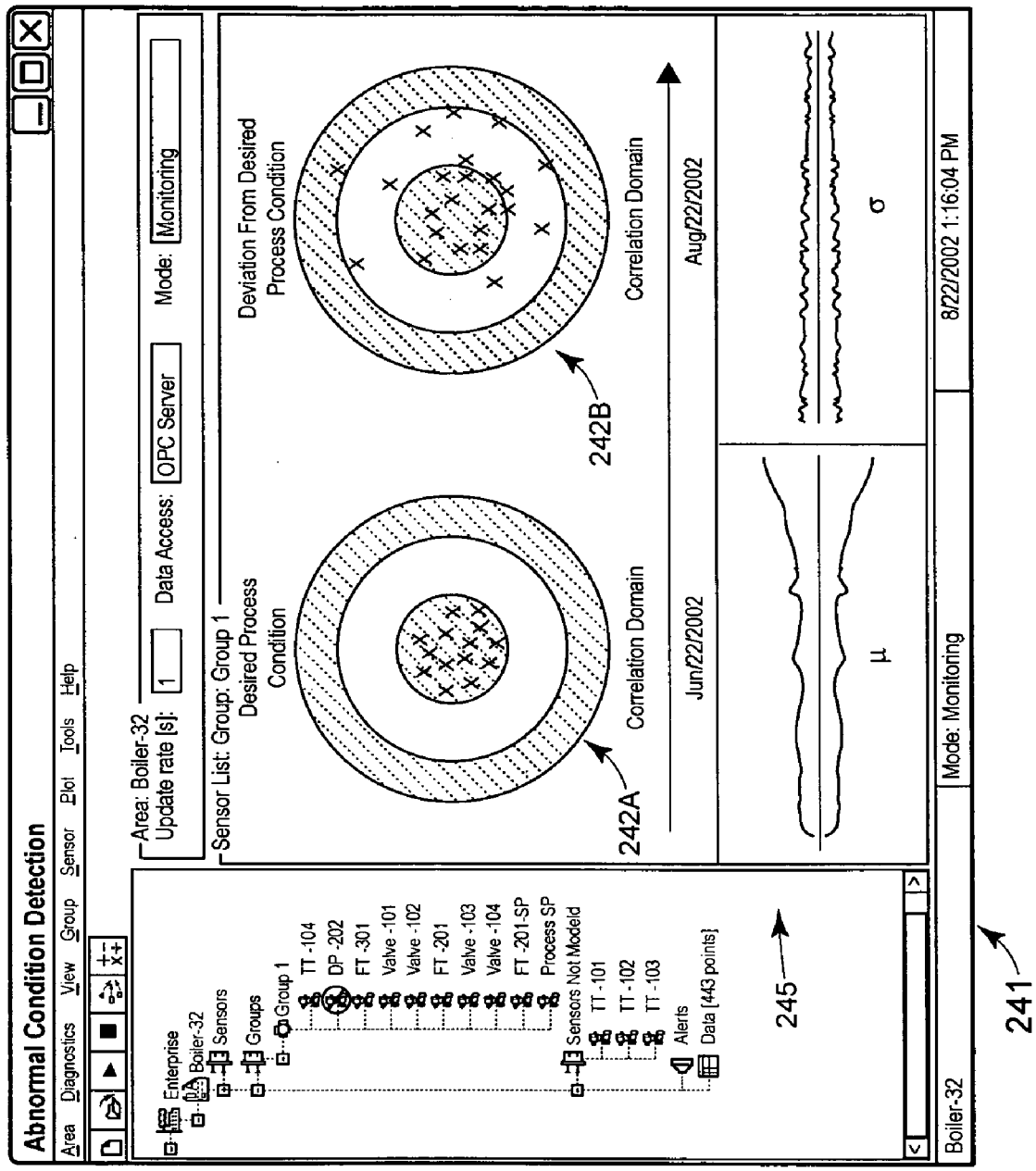
FIG. 23 is a depiction of a screen display illustrating a correlation domain plot showing the deviation from a desired correlation domain.

In one example, such as that shown in the screen display 241 of FIG. 23, the viewing application 40 may provide a correlation plot, illustrating the difference between a set of correlation points in a desired process condition and a set of correlation points in a current or undesired process condition. Thus, the screen 241 of FIG. 23 includes a first correlation plot 242A which illustrates a set of correlated points (marked by an X) for a desired process condition and second correlation plot 242B which illustrates the same set of correlated points for a current process condition, thereby showing the deviation between the correlation of parameters for the desired process condition and the current process condition, which may indicate the existence of an abnormal situation within the process. Here, each correlation point marked with an X is the correlation value of at least two different SPM parameters, either of the same SPM block or of different SPM blocks. Of course, as shown in FIG. 23, the baseline mean μ and the baseline standard deviation σ may be plotted for one or both process conditions.

Figure 24:
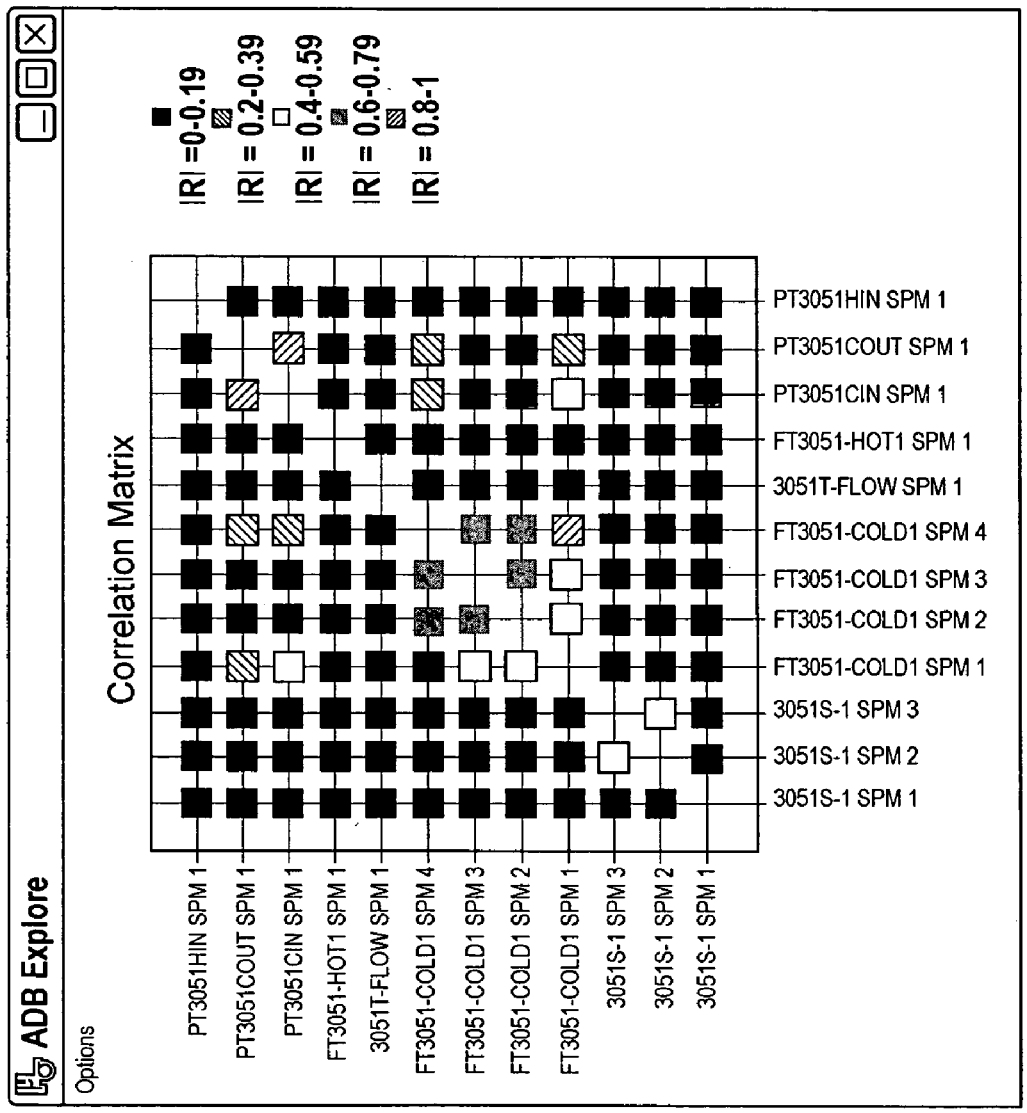
FIG. 24 is a depiction of a screen display illustrating a color-coded correlation matrix.

Likewise, as illustrated in the screen 243 of FIG. 24, the viewing application 40 may create a color-coded correlation matrix, wherein the value of a particular correlation point is illustrated in one of a set of different colors, depending on its magnitude. Such a correlation plot makes is easier for the user to view correlations between different SPM parameters and thereby detect the presence of or to predict the future occurrence of an abnormal situation within the process plant. Again, it is understood that correlation matrices can be determined and graphed for other types of SPM parameters (not just means), for mathematical combinations of SPM parameters as well as for different types of SPM parameters.

Still further, the application 40 can provide other views of the SPM data in addition or in the alternative to those discussed above. As an example, the application 40 may provide visualization graphs or charts in the form of three-dimensional trend plots with time along the X-Axis, and Mean and Standard Deviation of an SPM block along the Y and Z axes, three-dimensional histogram plots that plot the mean and standard deviation along the X and Y axes, and the quantity of each along the Z-axis, three-dimensional trend plots with time along the X-axis, and mean and standard deviation of an SPM block along the Y and Z axes and including upper and lower control and/or specification limits for one or both of the mean and standard deviations. Of course, there are almost limitless manners for visualizing the SPM data and this disclosure is not limited to the specific methods described above.

Figure 25:
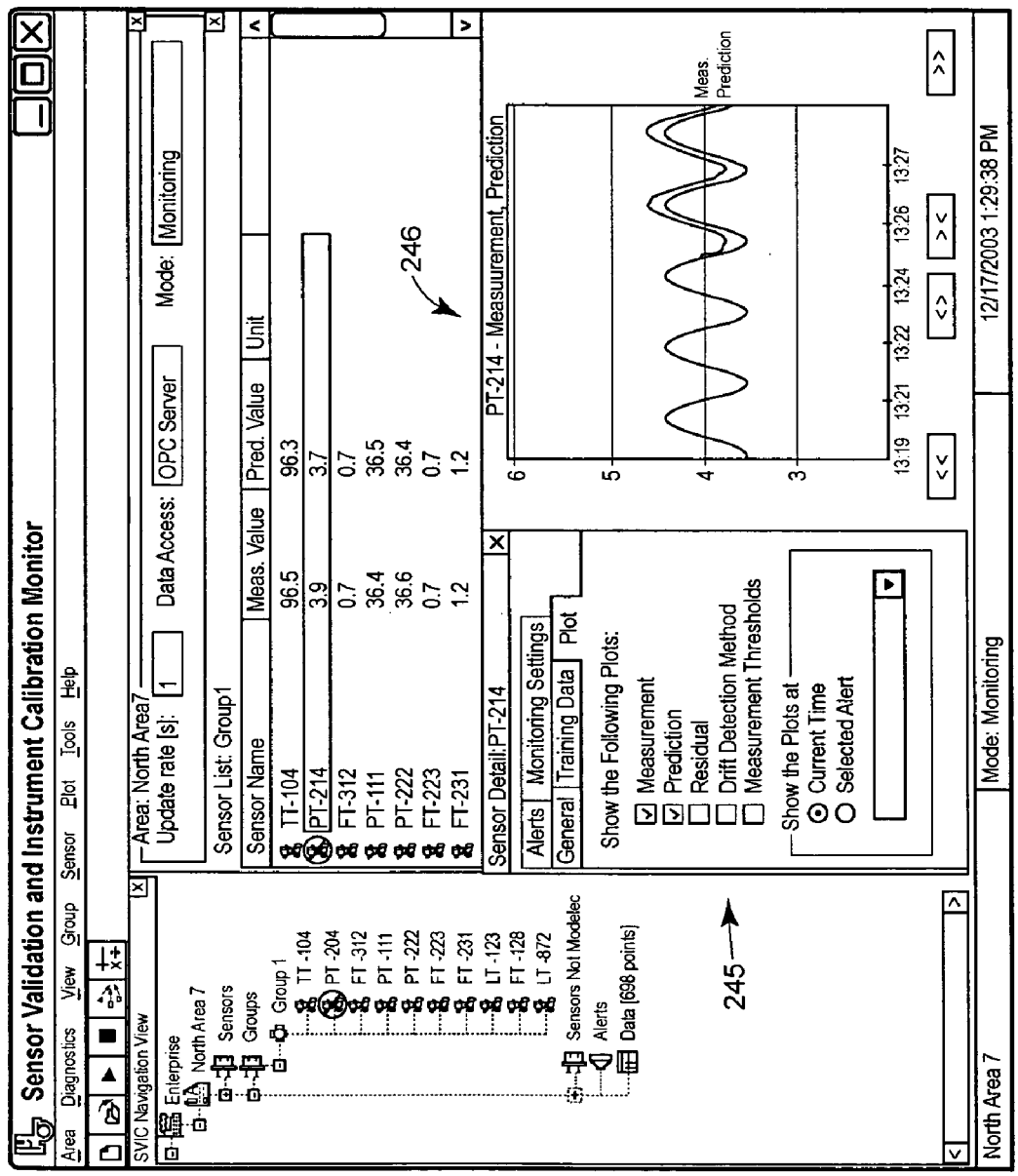
FIG. 25 is a depiction of a screen display illustrating a comparison chart providing a comparison between two-measurements of a process variable for a selected device and user interface elements which enable a user to view other comparisons.

FIG. 25 illustrates a plotting screen 244 that may be generated by the viewing application 40 to enable a user to compare plots of different variables, such as SPM parameters or of related variables or data, such as measured and predicted data. In this case, a section 245 of the plotting screen 244 may enable a user to select the particular plots of data to be displayed on a plotting section 246 of the screen. The user may, for example, select to view a plot of measured data (for a device selected in the hierarchy view on the same screen), of predicted data (such as data generated by a model), of residual data, etc. all on the same graph. The user may also select to perform a drift detection in the plot and/or to show measurement thresholds on the plotting section 246. In the example of FIG. 25, the user has selected to view a plot of measured data (which could be SPM data or raw process variable data) juxtaposed with predicted data to view a drift or misalignment between a measured process state and a predicted process state. Of course, the application 40 could enable a user to select other variables and data (both SPM data and process variable data) for plotting together to view other relationships.

Figure 26:
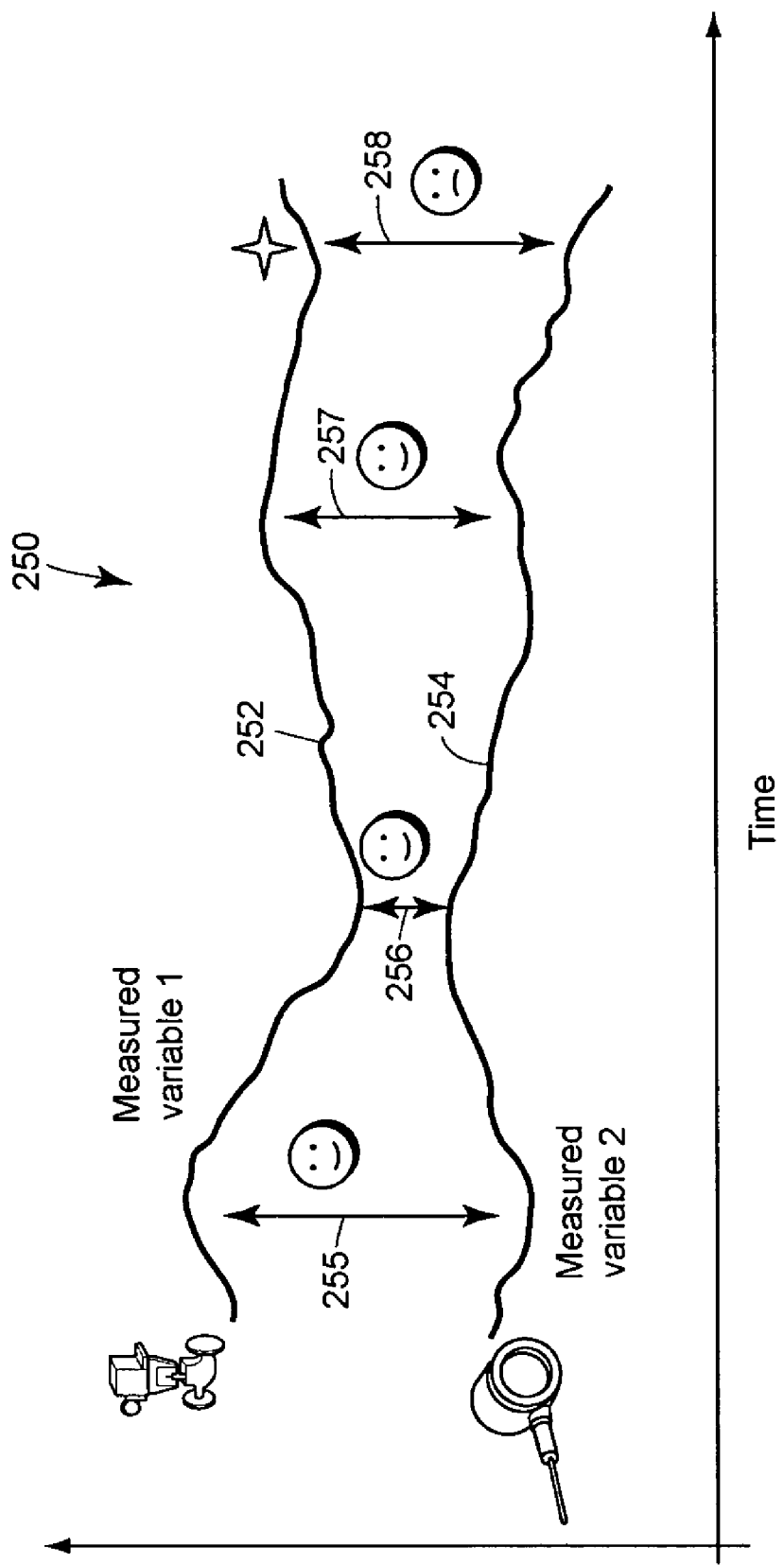
FIG. 26 is a depiction of a screen display illustrating a plot of two statistical monitoring process parameters versus time, illustrating a known correlation between these parameters.

As another example, the viewing application 40 may produce a trend plot of two (or more) different SPM parameters on the same graph to enable a user to view expected or non-expected behavior of one of the SPM parameters with respect to the other(s) of the parameters. FIG. 26 illustrates such a graph 250 wherein two SPM parameters are plotted by the lines 252 (associated with a valve) and 254 (associated with a transmitter). In this example, the user or engineer may expect regular divergence of the two SPM parameters and then convergence of the two SPM parameters to a specific limit such as illustrated by the vertical lines 255 and 256. However, when, after a divergence between the two variables occurs before a convergence to the limit, such as illustrated by the vertical lines 257 and 258, the user or engineer may know that, a problem exists or that an abnormal situation will occur in the future.

It is believed that correlation of SPM parameters can give some indication of the overall health of a plant, a portion of a plant, a piece of equipment, etc. When a plant (or a portion of the plant, or a piece of equipment, etc.) is in its normal operating state, there may be some variables that are highly correlated with other variables. Over time, it might be possible that some of the correlation values change. A change in some of the correlation values might indicate that a plant is no longer operating at the same performance as it was previously. Therefore, some examples described below provide methods for visualizing how one or more correlation values change over time.

In order to view a change in a correlation value over time, the correlation value may be calculated at different times. An equation such as Equation 11 or Equation 12 could be used to generate a correlation value of data from an entire available range. Additionally, the data could be divided into segments of a specific length (for example, 30 minutes, 1 hour, 6 hours, 1 day, 7 days, a particular number of samples, etc.), then one or more correlation values can be calculated for each segment. Thus, if a correlation value changes from one segment to the next, this can be considered a change in the correlation value over time. As another example, correlation values could be generated based on a sliding window of data, the sliding window having a particular length (for example, 30 minutes, 1 hour, 6 hours, 1 day, 7 days, a particular number of samples, etc.).

Figure 27:
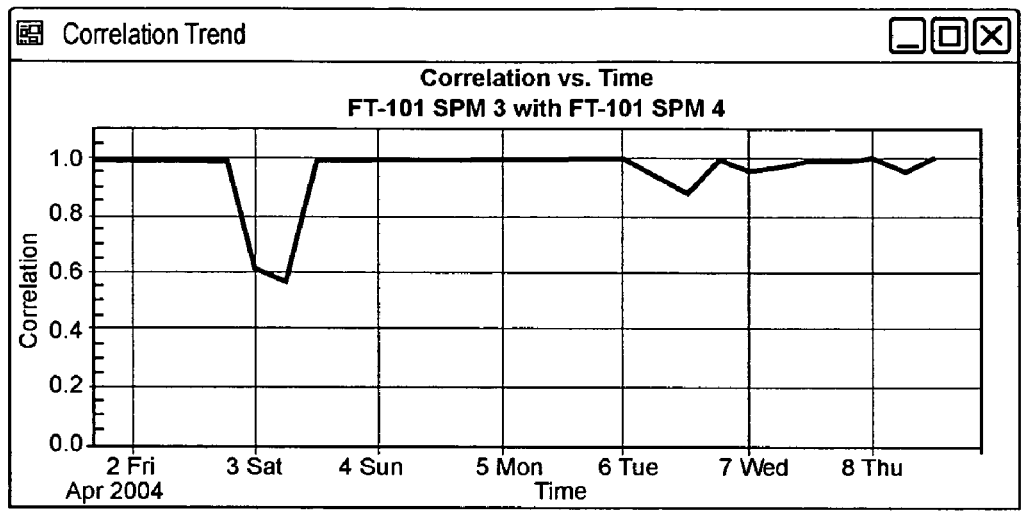
FIG. 27 is a depiction of a screen display illustrating a plot of a correlation value versus time.
Figure 28:
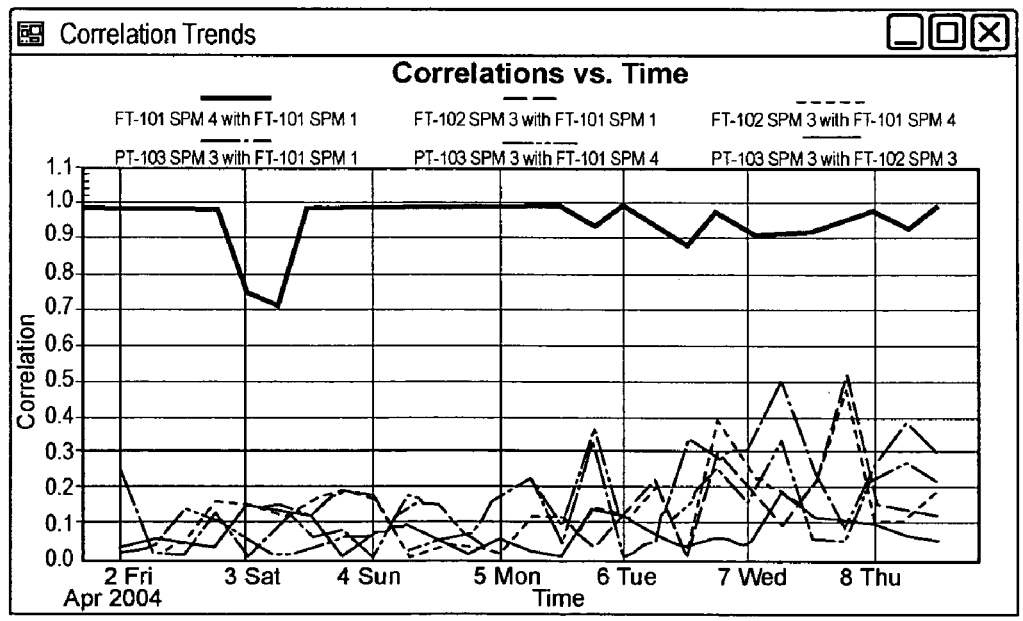
FIG. 28 is a depiction of a screen display illustrating a plot of multiple correlation values versus time.

FIG. 27 is an example plot 260 of a single correlation value over time. FIG. 28 is an example plot 262 of a plurality of correlation values over time. As can be seen in FIG. 28, a plot becomes more cluttered as more correlation values are plotted on the same graph. Thus, additional example methods for visualizing data associated with multiple correlation values are described below.

In one example, a change in a correlation value is plotted. For instance, a change in the correlation value from an initial value, a previous value, a baseline value, a "normal" value, an expected value, etc., may be plotted. In this example the change could be expressed either as a relative change (e.g., a percentage) or as an absolute change.

A baseline value for a given correlation value typically should be calculated on an amount of underlying data that is based on the amount of process variable data needed to generate the data underlying the correlation value. For example, a mean value may be generated based on a segment of data that could be as short as 5 minutes or as long as 1 day. It is currently believed that a correlation value from the mean data using at least 30 mean data points will provide a statistically reliable sample. (It should be understood that in some implementations, less than 30 mean data points may provide a statistically reliable correlation value, or more than 30 mean data points may be required.) In this case, if mean data points are evaluated at 5 minute intervals, a correlation window is should be approximately 3 hours or more.

In some implementations, generating mean data includes a training period before a first mean value is saved. In these implementations, an algorithm for generating the mean value includes trying to determine a baseline mean for the process. The existence of a baseline mean may be determined by verifying that the mean and standard deviation of two consecutive blocks of data are within a certain tolerance of each other. This may help to ensure that the baseline mean value will be from a time period when the process is in a steady state, and not when the process is in a transient. After the baseline mean value has been determined, the algorithm begins calculating and providing mean values that can be used by other algorithms, processes, etc. These mean values can be used to calculate correlation values. Thus, the process may be in a steady state and at its normal operating condition when the first mean values are calculated by the algorithm.

In one example, the first correlation value calculated after the baseline mean has been determined is chosen as the baseline correlation. As discussed above, the process may be, in many cases, in a steady state and at its normal operating condition when the first correlation value calculated.

In some cases, however, problems can arise if one tries always to use the first correlation value as the "normal" value. For example, the process might be such that even in the normal operating condition, the correlation coefficient is irregular from one correlation block to the next. This is especially true if two variables naturally have a very low correlation. Also, if the monitoring cycle of an SPM block that generates the mean value is configured too high or too low, or if the process was not in the normal state when the algorithm for generating the mean was trained, the first correlation value may not be a good estimate of the normal value.

Therefore, in some situations, it may be useful to use a correlation value different than the first correlation value as the baseline correlation value. Additionally, it may be determined that no baseline correlation value will be selected, or the baseline correlation value is to be selected as some absolute value (e.g., 0), when, for example, correlation values are relatively small and/or irregular.

Some example methods are described below for determining whether to use the first correlation value as the baseline value. In one example, differences between the first correlation value and one or more subsequent correlation values may be generated to see if the first correlation value is consistent with the subsequent correlation values. If the first correlation value differs from subsequent correlation values by a certain degree, it may be that the first correlation value should not be used as a baseline value. In one particular example, the first correlation value is compared to a second correlation value. If the first correlation value differs from the second correlation value by less than a certain degree (e.g., 1%, 2%, 3%, 4%, 5%, 6%, 7%, etc.), then the first correlation value may be selected as the baseline correlation value. If the difference is greater than the specified degree then the first correlation value is not selected as the baseline correlation value. Many other methods could be used to determine whether the first correlation value should be used as the baseline value.

In one example, the baseline value could be generated based on a plurality of generated correlation values (e.g., averaging the correlation values, taking the median correlation value, etc.). In other examples, the baseline value could be generated based on one or more generated correlation values from another similar process, based on a simulation, based on a model, etc.

Once the initial value, a previous value, the baseline value, the "normal" value, the expected value, etc., has been determined for each correlation value, a correlation change array can be calculated. The correlation change array could include the difference between each correlation value and the corresponding initial value, baseline value, "normal" value, expected value, etc.

The difference could be expressed as either a relative change (e.g., a percentage) or an absolute change. Because typical methods for calculating correlation values generate correlation values between 0 and 1, the absolute change would also be between 0 and 1. If a percent change is used, however, the percent change could potentially become very large, especially if the baseline correlation is near 0. There may be situations, however, when using the percent change is useful and/or preferable as compared to using the absolute change.

Figures 29, 30:
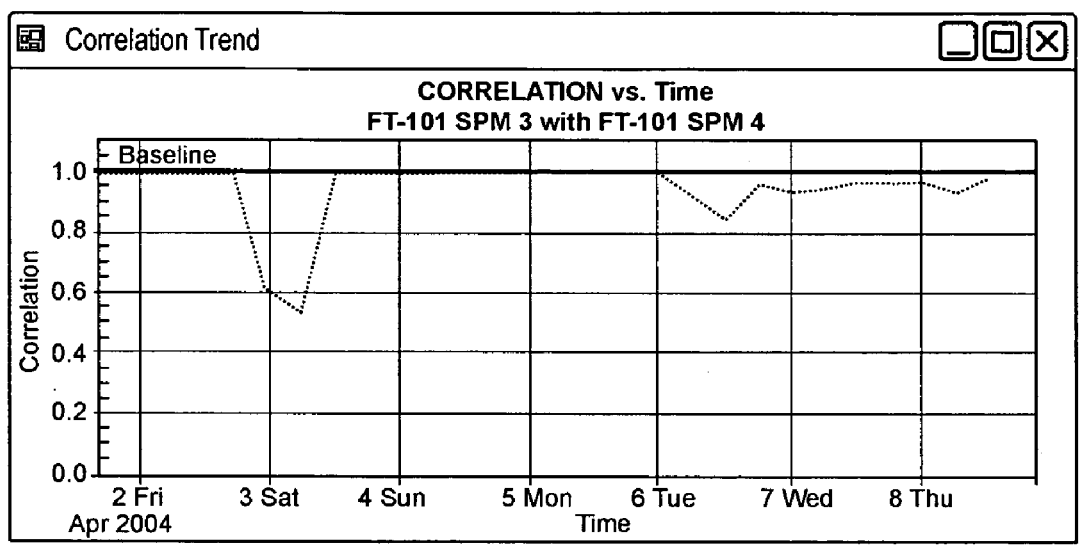
FIG. 29 is a depiction of a screen display illustrating a plot of a correlation value and a baseline value versus time.
FIG. 30 is a depiction of a screen display illustrating a correlation change matrix for a set of statistical process monitoring parameters.

FIG. 29 is an example plot 264 of a correlation value and a baseline value versus time. The plot 264 enables a user to see the difference between the correlation value and the baseline value over time. If more correlation values and baseline values were added to the plot 264, however, the plot could become cluttered.

FIG. 30 is an example display 266 of a matrix of differences of correlation values from corresponding baseline values. In this example, for correlation values that were determined not to have a baseline, the matrix cells were left blank. Alternatively, these matrix cells could be filled with some indication that it was determined that the corresponding correlation values did not have baselines.

Figure 31:
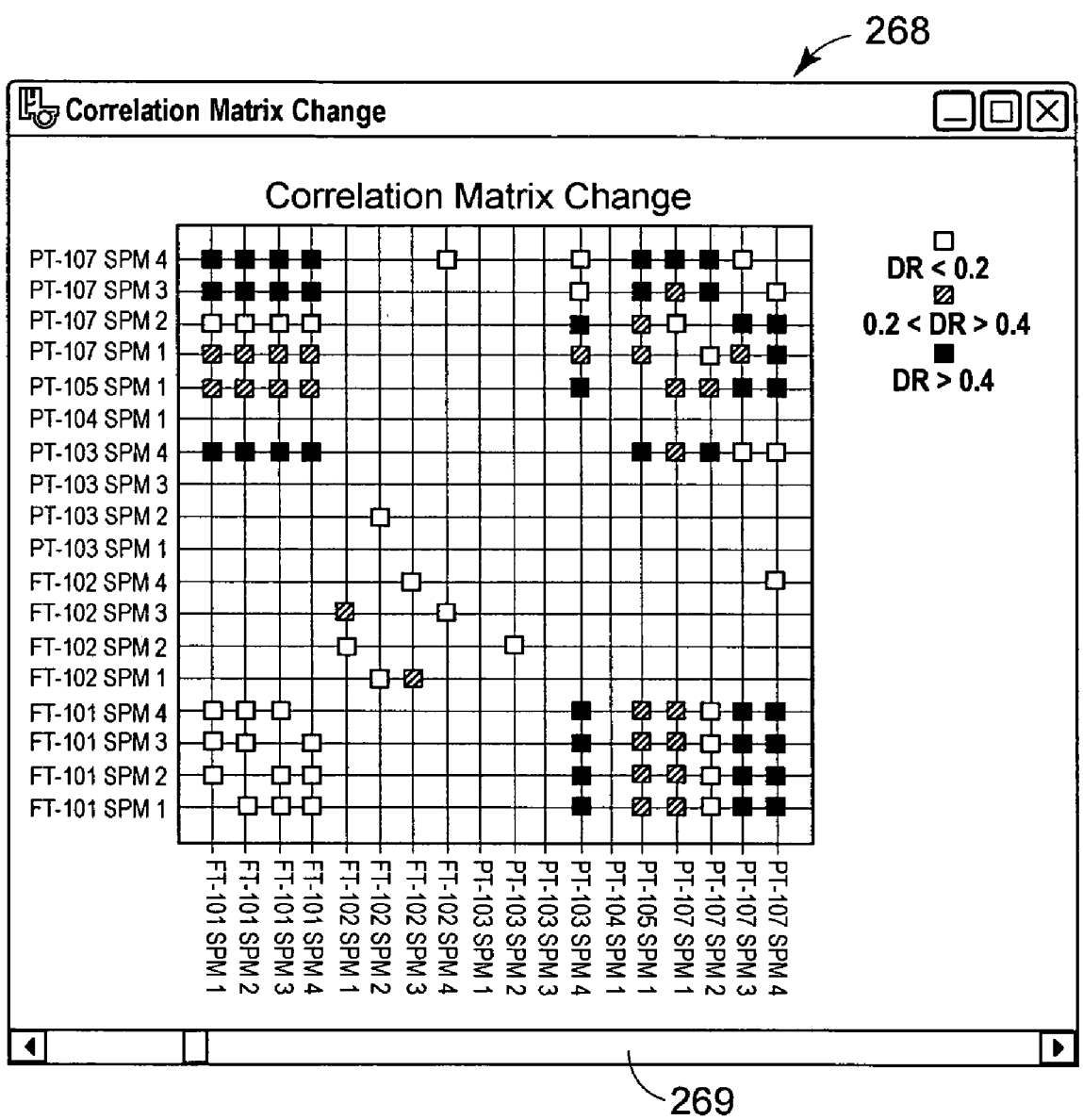
FIG. 31 is a depiction of a screen display illustrating a color-coded correlation change matrix.

FIG. 31 is an example display 268 of a matrix of differences of correlation values from corresponding baseline values. In the display 268, the difference of correlation value is depicted as a colored square, where the color of the square indicates the degree of difference. For example, if the absolute difference is less than 0.2, a square is given a first color. If the absolute difference is greater than 0.4, the square is given a second color. If the absolute difference is between 0.2 and 0.4, the square is given a third color.

The displays 266 and 268 of FIGS. 30 and 31, display correlation differences for one instant of time or one segment of time. In other examples, the displays could be modified to allow a user to display correlation differences for multiple time instances or periods. For example, a user interface mechanism (e.g., a scroll bar, arrow buttons, etc.) could be provided to allow a user to view differences at various time periods or segments. For example, the display 268 of FIG. 31 includes a navigation bar 269 for displaying correlation differences for different time instances or periods. Additionally, displays 266 and 268 could be include a user-interface mechanism for "animating" the display to show how the differences change over several time instances or segments. Similarly, the display 264 could be provided with a similar user interface mechanism to allow a user to view different time periods.

Additionally, multiple correlation difference values could be combined to generate a value indicative of the differences of the multiple correlation values. This value could be plotted versus time. The multiple correlation difference values could be combined in a variety of ways. For example, a set of correlation difference values could be considered as a vector, and the norm of the vector could be indicative of the differences in the correlation values. Three equations are provided below for calculating the norm of a Vector. The norm could be calculated according to any of these equations, or a different equation.

$$\text{1-Norm: } \|\Delta C\|_1 = \frac{1}{N}\sum_{i=1}^{N} |\Delta C_i| \qquad \text{(Equ. 13)}$$

$$\text{2-Norm: } \|\Delta C\|_2 = \sqrt{\frac{\sum_{i=1}^{N} \Delta C_i^2}{N}} \qquad \text{(Equ. 14)}$$

$$\text{Infinity-Norm: } \|\Delta C\|_\infty = \max_{i=1}^{N} |\Delta C_i| \qquad \text{(Equ. 15)}$$

where $\Delta C_i$ is the $i^{th}$ correlation difference value, and N is the number of correlation difference values. The $$\frac{1}{N}$$

factor in equation 13 and the $$\frac{1}{\sqrt{N}}$$

factor in equation 14 can be omitted if desired. Additionally, other equations could be used as well.

Figure 32:
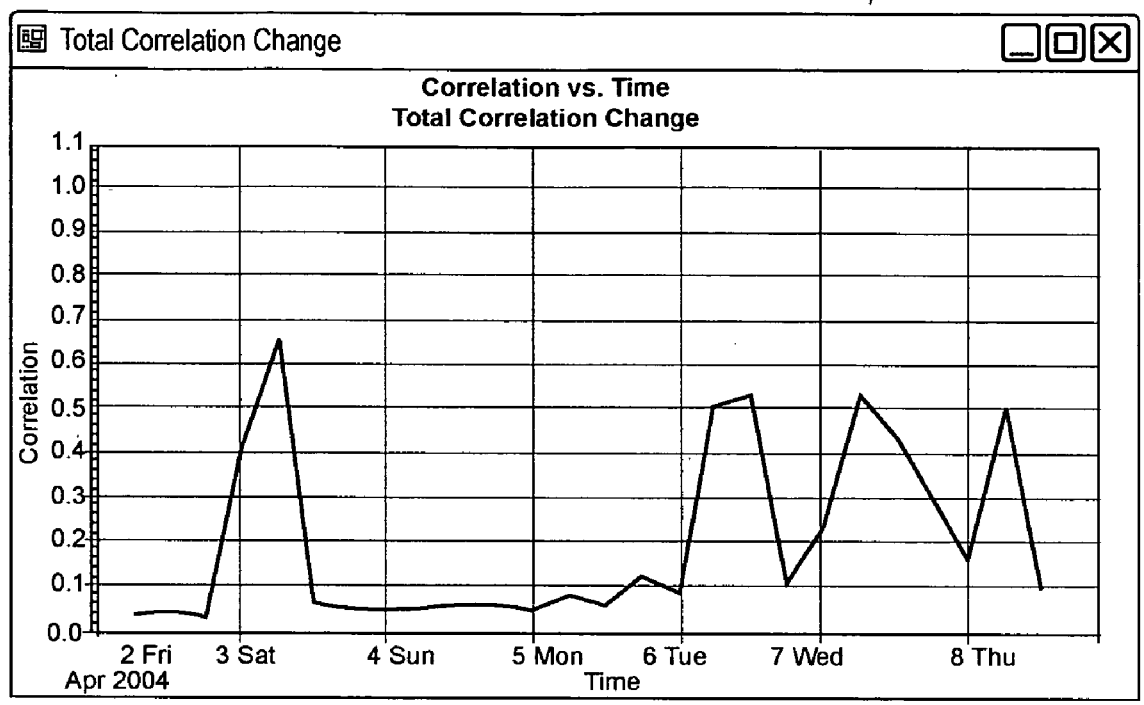
FIG. 32 is a depiction of a screen display illustrating a plot of a total correlation value versus time.
Figure 33:
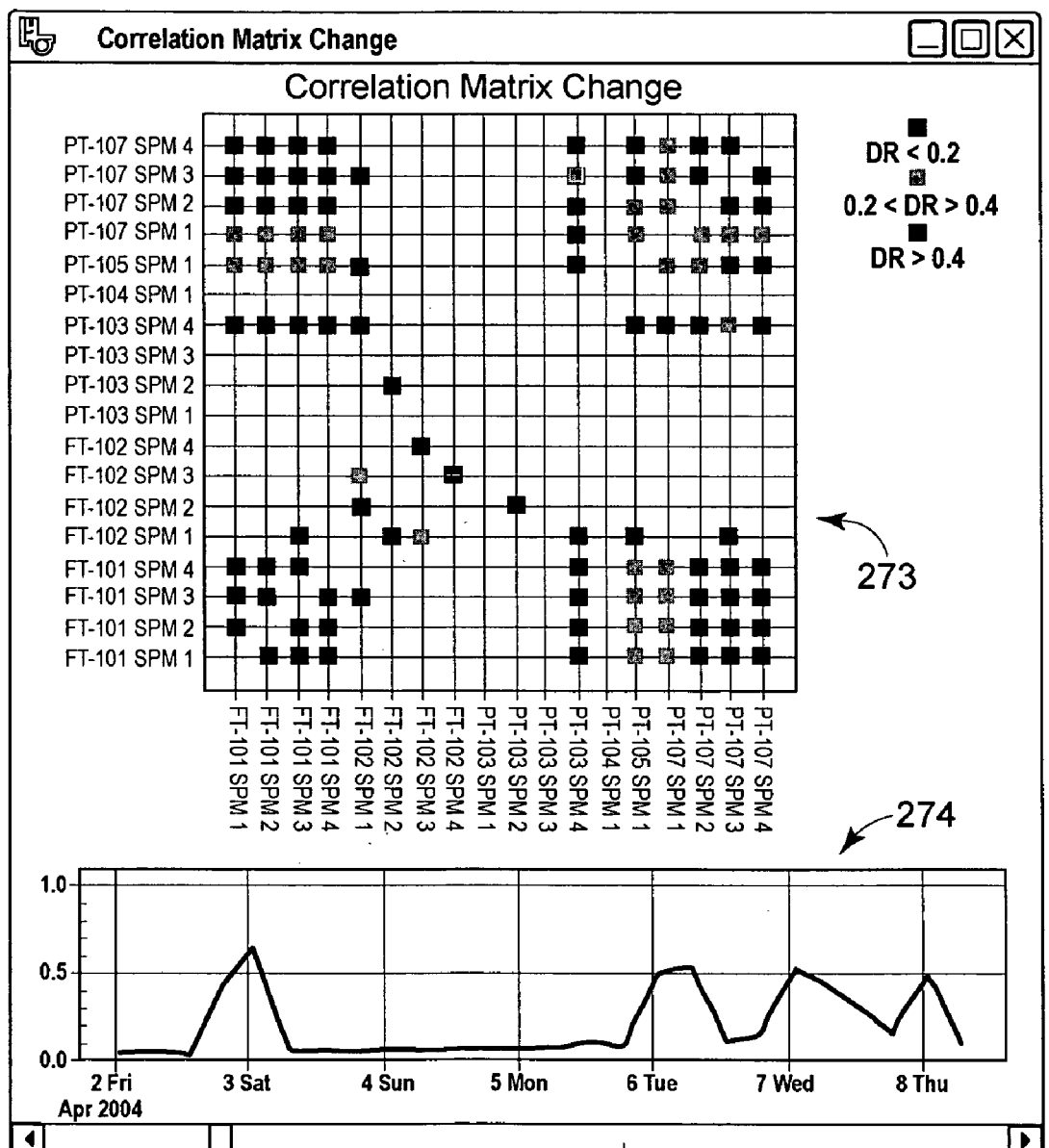
FIG. 33 is a depiction of a screen display illustrating a color-coded correlation change matrix and a plot of a total correlation value versus time.

FIG. 32 is an example plot 270 of a 2-Norm (equation 14) value versus time, the 2-Norm value corresponding to a plurality of correlation difference values. FIG. 33 is an example display 272 including a correlation differences matrix 273 for a plurality of correlation differences for a particular time or time segment, and a plot 274 of a 2-Norm value of the plurality of correlation differences versus time. The display 272 could also include a user-interface mechanism (e.g., a scroll bar, buttons, etc.) to allow a user to see the correlation differences matrix 273 and/or the plot 274 for different time instances or segments. For example, the display 272 includes a navigation bar 275. Additionally, the plot 274 could include an indicator that indicates the time instance or segment on the plot 274 that corresponds to the correlation differences matrix 273. Further, the display 272 could include a user-interface mechanism to allow "animating" the matrix 273 to show how the correlation differences in the matrix 273 changer over several time instances or segments.

As mentioned previously, a correlation value may indicate a measure of the degree of linear correlation between two variables. A correlation value may be determined when linear regression is done on a set of data. Generally, linear regression determines a line that "best" fits the set of data. The results of a linear regression fit often are the slope of the line and the Y-intercept of the line. The slope of this line and/or the change in the slope of this line over time may be useful in monitoring the health of a process plant, a portion of the process plant, a process, a piece of equipment, and/or detecting an abnormal situation. Given two sets of data X and Y, the slope of the best-fit line may be calculated by the following equation:

$$m_{xy} = \frac{\sum_{i=1}^{N}(x_i - \bar{x})(y_i - \bar{y})}{\sum_{i=1}^{N}(x_i - \bar{x})^2} \quad \text{(Equ. 16)}$$

where $x_i$ is an $i^{th}$ sample of the X data set, $y_i$ is an $i^{th}$ sample of the Y data set, $\bar{x}$ is the mean of the samples in the X data set, $\bar{y}$ is the mean of the samples in the Y data set, and N is the number of samples in each of the data sets X and Y.

A correlation value and a corresponding slope can be visualized by plotting them on a polar coordinate plot. In particular, the absolute value of the correlation value would correspond to a radius, and an angle could be determined as $$\theta = \tan^{-1} m \quad \text{(Equ. 17)}$$

where m is the slope determined by the equation 16, or some other equation. The range of the arctangent function is $$\left(-\frac{\pi}{2}, \frac{\pi}{2}\right).$$

Thus, using this method only one half of the polar coordinate plane would contain correlation points. Optionally, in order to utilize the entire polar coordinate plane, one could use the equation:

$$\theta = 2 \cdot \tan^{-1} m \quad \text{(Equ. 18)}$$

Figure 34:
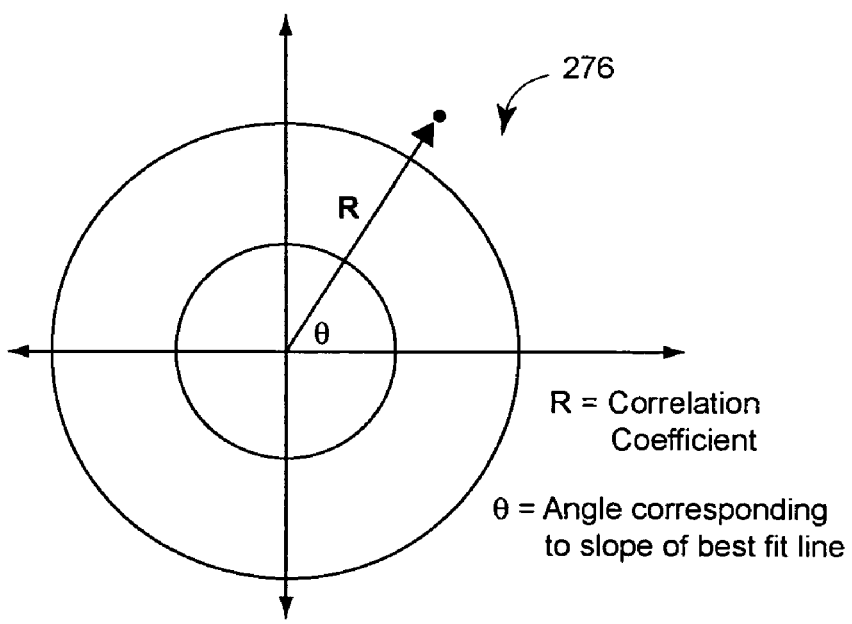
FIG. 34 is a depiction of a polar plot of a correlation value and an angle corresponding to a slope of a best fit line.

In this case, the angle shown on the plot would not show the exact slope of the line. However, this might be a desirable trade-off if a user finds it more visually appealing. FIG. 34 is a figure showing an example of how a correlation value and an angle corresponding to a slope of a best fit line could be plotted on a polar coordinates graph 276.

Figure 35:
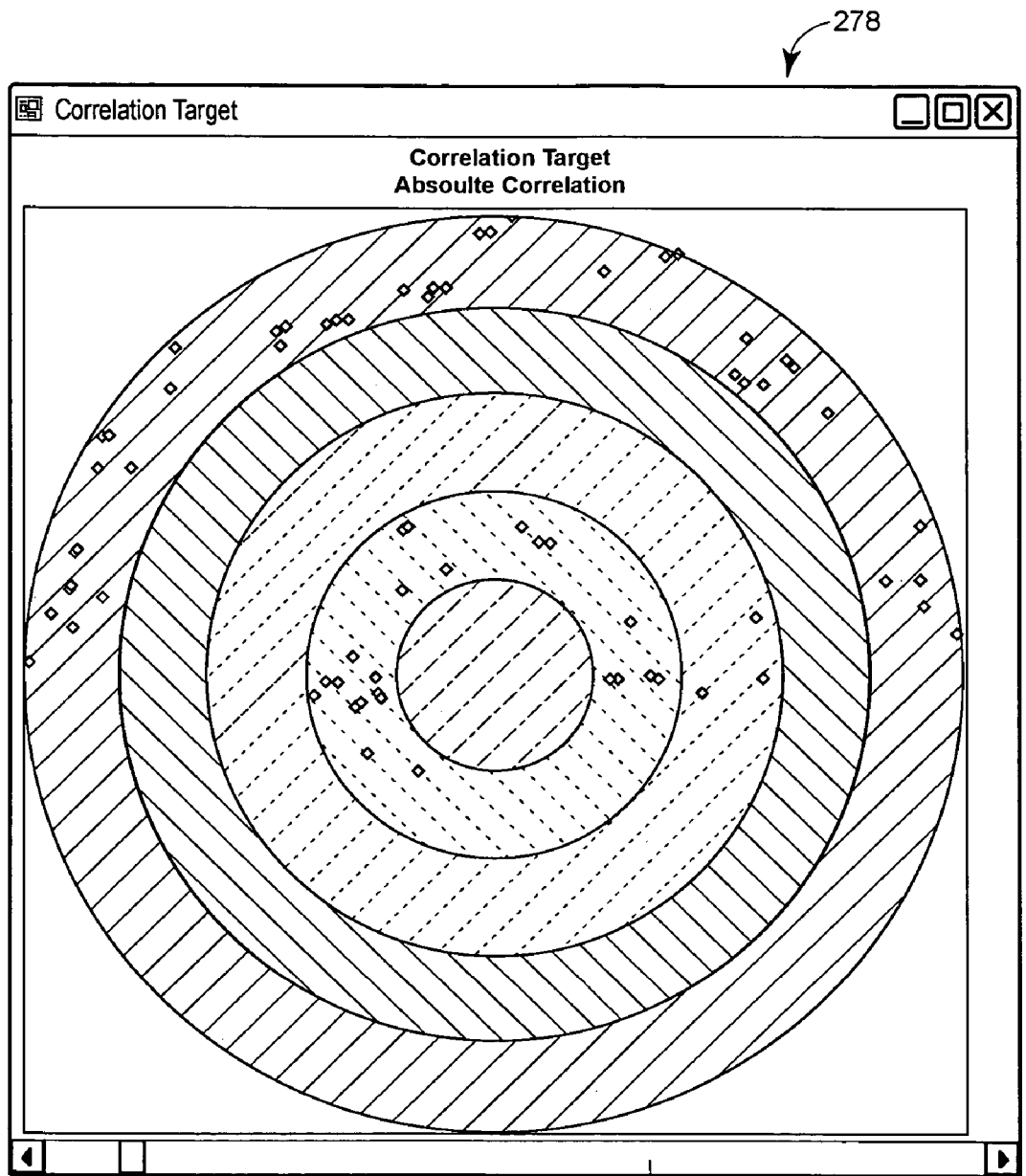
FIG. 35 is a depiction of a screen display illustrating a polar plot of multiple correlation values with angles corresponding to slopes of best fit lines.

FIG. 35 is an example display 278 of correlation values and angles plotted using polar coordinates. In the display 278, the center represents a correlation near zero, while the outside represents a correlation near 1. Thus the points shown in the outer ring are the points with the highest correlation, while the points shown in the center circle are the points with the lowest correlation. The rings may be colored to help indicate the different levels of correlation. The display 278 could also include a user-interface mechanism (e.g., a scroll bar, buttons, etc.) to allow a user to see the plot for different time instances or segments. For example, the display 278 includes a navigation bar 279.

Figure 36:
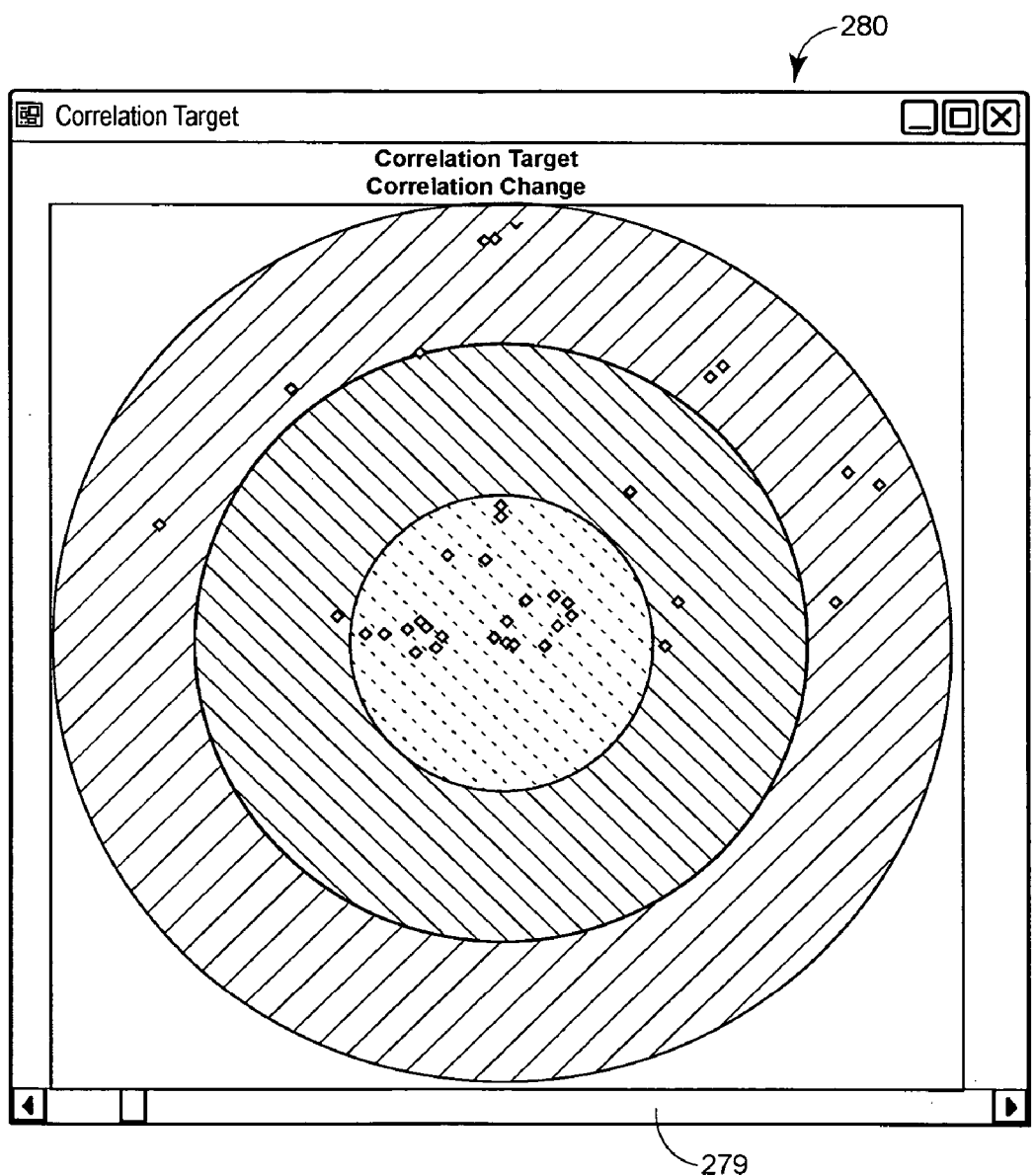
FIG. 36 is a depiction of a screen display illustrating a polar plot of multiple correlation change values with angles corresponding to slopes of best fit lines.

In another example, a difference between the correlation value and the baseline may be plotted on a polar plot. In this example, the magnitude of a correlation change is computed as the absolute value of the difference between the correlation value and its baseline, and the angle is simply the angle of the correlation value computed using, for example, Equation 18. Thus, correlation values that are near their baseline value will tend to result in correlation change values located in the center of the plot. If a correlation value significantly changes from its baseline, it will tend to result in a correlation change value located away from the center of the plot. FIG. 36 is an example display 280 of correlation change values plotted using polar coordinates. The rings of the display 280 represent different levels of magnitude difference between a correlation value and its baseline value and can be color coded. In the example display 280, the center ring represents a correlation difference of less than 0.2. The middle ring represents a correlation difference less than 0.4 and greater than or equal to 0.2. The outer ring represents a correlation difference less than 0.6 and greater than or equal to 0.4. In different implementations different numbers of rings and different radiuses could be used. The display 280 could also include a user-interface mechanism (e.g., a scroll bar, buttons, etc.) to allow a user to see the plot for different time instances or segments. For example, the display 280 includes a navigation bar 281.

In some instances, a polar plot such, as in FIGS. 35 and 36 could plot a correlation value or a correlation difference value at multiple time instances or segments in one plot. For example, correlation values or correlation differences for different time instances or segments could be connected together with lines (optionally having arrows) to help a user see how the correlation values or correlation difference values changed over time.

Displays such as the displays of FIGS. 35 and 36 could be combined with other displays to help a user monitor the health of a process. For example, FIG. 23 illustrates the display 241 which incorporates polar plots.

The statistical data described above with respect to FIGS. 11–36 (e.g., mean, standard deviation, mean change, standard deviation change, correlation, correlation change, baselines, etc.) can be generated by various devices in the process plant such as field devices, I/O devices, process controllers, workstations, servers, data historians, etc. For example, means could be, generated in field devices, and correlations of those means could be generated in a workstation. As another example, means and correlations of the means could be generated in field devices.

Figure 37:
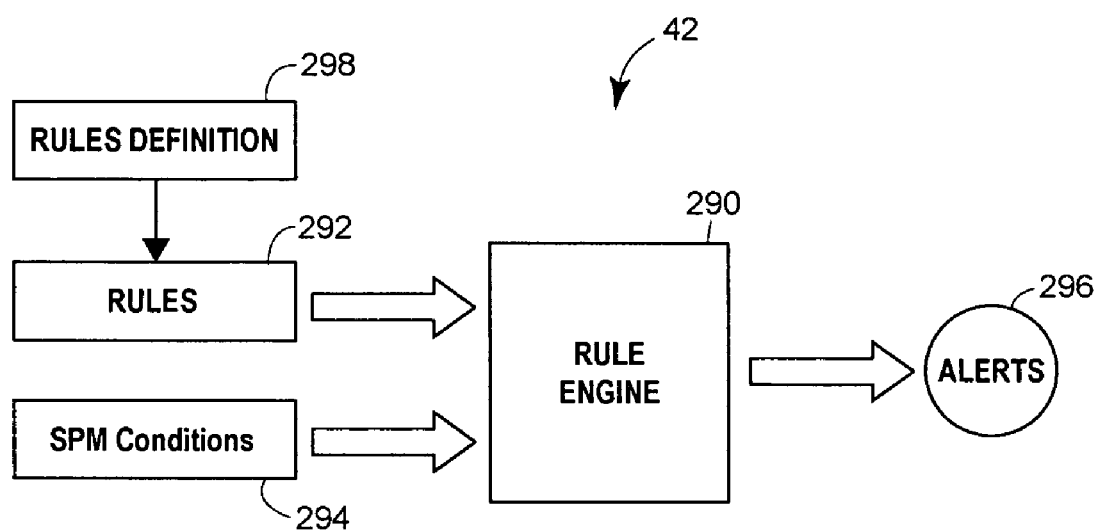
FIG. 37 is a block diagram of rules engine development and execution system that enables a user to create and apply rules to statistical process monitoring data collected from a process plant.

While the viewing application 40 may provide a user or an engineer with some or all of the views discussed above to enable the user or engineer to manually detect the presence of or the suspected future existence of an abnormal situation within the process plant, the rules engine development and execution application 42 may also be used to automatically detect abnormal situations based on the SPM data. One possible embodiment of the rules engine development and execution application 42 of FIGS. 1 and 2 is illustrated in more detail in FIG. 37. As illustrated in FIG. 37, the rules engine development and execution application 42 includes a rules engine 290, which may be any type of rules based expert engine and a set of rules 292 which may be stored in a database (such as within the memory 74B of FIG. 2) accessible by the rules engine 290. The rules engine 290 collects or monitors the statistical process monitoring data (indicated at the block 294) from, for example, the database 43 of FIGS. 1 and 2, field devices, the communication server 89 of FIG. 2, a data historian, etc. Of course, this SPM data may include any of the data discussed above and obtained by, for example, the application 38 as well as any other data generated within the process plant, including both SPM data and process variable data. In other words, the rules engine 290 may receive SPM data and a variety of other types of data including, for example, process configuration data, control strategy data, control output data, process variable data, historical data, simulation data, optimization data, alerts, alarms, alert/alarm management data, document management data, help/guidance data, rotating equipment data, lab analysis data, industry specific data, environmental regulation data, etc.

The rules engine 290 applies the rules 292 to the SPM and other data to determine if a condition exists that indicates, according to at least one of the rules 292, that an alert or alarm should be sent to a user, as indicated by a block 296. Of course, if desired, the rules engine 290 may take other actions, besides providing or setting an alarm, if a rule indicates that a problem exists. Such actions may include, for example, shutting down or more components of the process, switching control parameters to alter the control of the process, etc.

Additionally, a rules development application or routine 298 enables a user to develop one or more expert system rules (e.g., to be used as one of the rules 292) based on statistical data patterns and their correlations, to thereby detect known plant, unit, device, control loop, etc. abnormalities. Thus, while at least some of the rules 292 used by the expert engine 290 may be preset or preconfigured, the rules development application 298 enables a user to create other rules based on experiences within the process plant being monitored. For example, if a user knows that a certain combination of SPM abnormal conditions or events indicates a certain problem in the process, the user can use the rules development application 298 to create an appropriate rule to detect this condition and, if desired, to generate an alarm or alert or to take some other action based on the detected existence of this condition.

Of course, during operation of the process plant, the rules engine 290, which is configured to receive the SPM data (and any other needed data), applies the rules 292 to determine if any of the rules are matched. If a problem in the process is detected based on one or more of the rules 292, an alert can be displayed to a plant operator, or sent to another appropriate person. Of course, if desired, various rules for detecting various abnormal conditions within a plant and process operation could be part of the expert system runtime engine 290, which may look for patterns, correlations of data and SPM parameters to detect developing abnormal conditions.

Additionally, some of the data that may be used by the rules engine 290 are SPM conditions that may be detected within the devices in which the SPM data is generated. In this case, the rules engine 290 may be a client system or may be part of a client system that reads the SPM parameters and conditions from the devices via, for example, an OPC server. As discussed above, these SPM parameters may be stored to a database for future use, such as plotting the values of mean and standard deviation versus time. In any case, if the mean or standard deviation of a process variable changes by more than a user specified amount, the SPM block itself may detect an abnormal condition, such as Mean Change, High Variation, or Low Dynamics. These abnormal conditions can then be communicated to the client system, e.g., the rules engine 290, along with all the statistical monitoring data collected by these field devices.

Figure 38:
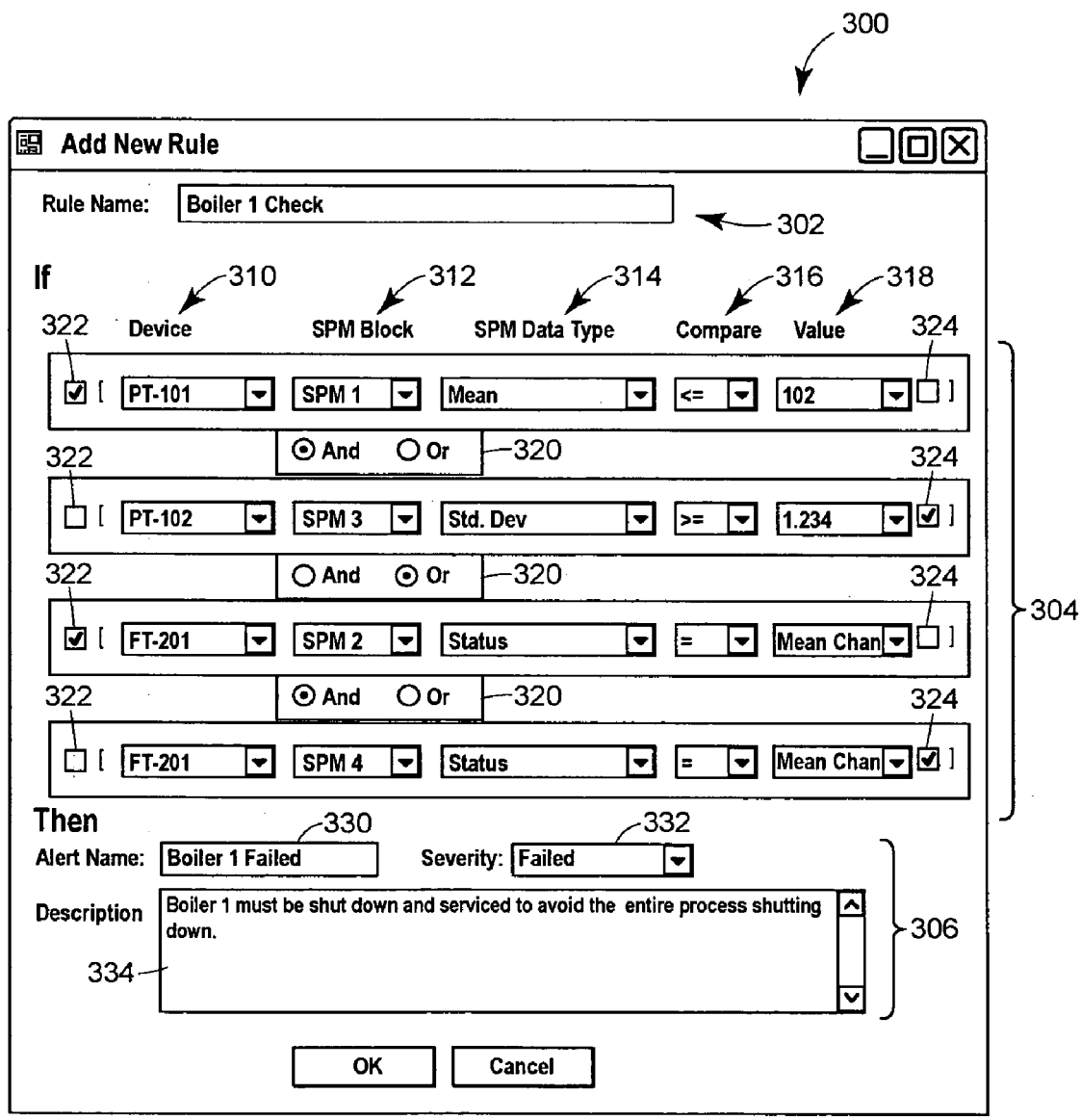
FIG. 38 is a depiction of a screen display illustrating a configuration screen that enables a user to create a rule for the rules engine development and execution system of FIG. 37.

Now, if a plant engineer or other user knows that, when a certain combination of process variables change in a certain manner, ascertain alarm should be triggered, or a certain action needs to be taken, the engineer can use the rules definition routine 298 to define a rule to detect this situation knowing that the application of the rule will trigger the alarm if that set of conditions occurs. In one example, the rules definition application 298 may create a configuration screen that enables the user to create one or more IF-THEN or Boolean type rules to be stored in the rules database 292. An example of one possible such configuration screen 300 is illustrated in FIG. 38. In particular, the configuration screen 300 includes a name section 302 that enables a user to define a name for the rule being created, a condition section 304 that enables a user to define the "IF" condition for an IF-THEN type rule and an action section 306 that enables the user to define the "THEN" action to be taken when the "IF" condition is found to be true.

In the particular example of FIG. 38, the rule being created is named "Boiler 1 Check." Additionally, as illustrated in FIG. 38, the condition section 304 includes a set of separate conditional statements, each of which includes an indication of a device 310 (in which a SPM block providing the SPM data used in the condition statement is located), an SPM block name 312 (defining the particular SPM block within the device that is to provide the SPM data), an SPM data type 314 (defining the type of data being provided by the SPM block), a compare statement 316 (defining a mathematical comparison operation for the SPM data) and a value section 318 (defining a threshold or value to which the received SPM data is to be compared using the comparison statement 316). Still further, a box 320 allows a user to select or define a Boolean logic operator, such as an AND operator or an OR operator, to be applied between each set of condition statements to define the manner in which these condition statements are to be logically combined to define the overall "IF" condition. While only the AND and the OR Boolean operators are illustrated as being possible of being selected in FIG. 38, any other Boolean operator (or other desired type of operator) could be provided as well to enable a user to create more complex rules. Still further, a set of check boxes 322 and 324 may be used to define groupings of condition statements. For example, selecting the check box 322 (in front of a leading parenthesis) indicates the beginning of a new set of condition statement defined within a set of parentheses, while selecting the check box 324 (in front of a trailing parenthesis) indicates the end of a set of condition statement within a set of parenthesis. As will be understood, condition statements within a set of parenthesis will be combined using the Boolean operator between them before condition statements (or groups of condition statements) within different sets of parenthesis are combined.

Thus, in the example of FIG. 38, a rule is being defined such that (1) if the mean (measured by SPM block 1 of the PT-101 device) is less than or equal to 102 AND the standard deviation (measured by the SPM block 3 of the PT-102 device) is greater than or equal to 1.234, OR (2) if the status parameter of the SPM block 2 of the FT-201 device is equal to the Mean Change AND the status parameter of the SPM block 4 of the FT-201 device is equal to the Mean Change, then the action defined in the action section 306 should be applied.

As illustrated in FIG. 38, the action section 306 includes a user specified alert name section 330, a severity definition section 332 and a description section 334. The alert name section 330 defines the name associated with or given to an alert that is generated if the condition section 304 is found to be true, the severity definition section 332 defines the severity of the alert (such as failed, maintenance, communication or other type of alert), and the description section 334 provides a description associated with the alert that maybe provided to the user or viewer of the alert. Of course, while the action section 306 of FIG. 38 defines an alert to be generated, the action section 306 could also or instead define other actions to be taken, such as shutting down a device, a unit, etc. within the plant, switching or changing a control setting within the plant, providing a new setpoint or control condition to a controller within the plant, etc.

It will be understood that, after a set of rules has been created and stored in the rules database 292 of FIG. 37, the expert engine development and execution system 42 may be used to automatically detect process abnormalities based on data or abnormal conditions returned by the SPM blocks within the process plant during operation of the process plant. Of course, it will be understood that the system 42 may operate or run continuously or periodically during operation of the process plant to detect abnormal conditions within the process plant based on the rules within the rules database 292.

Figure 39:
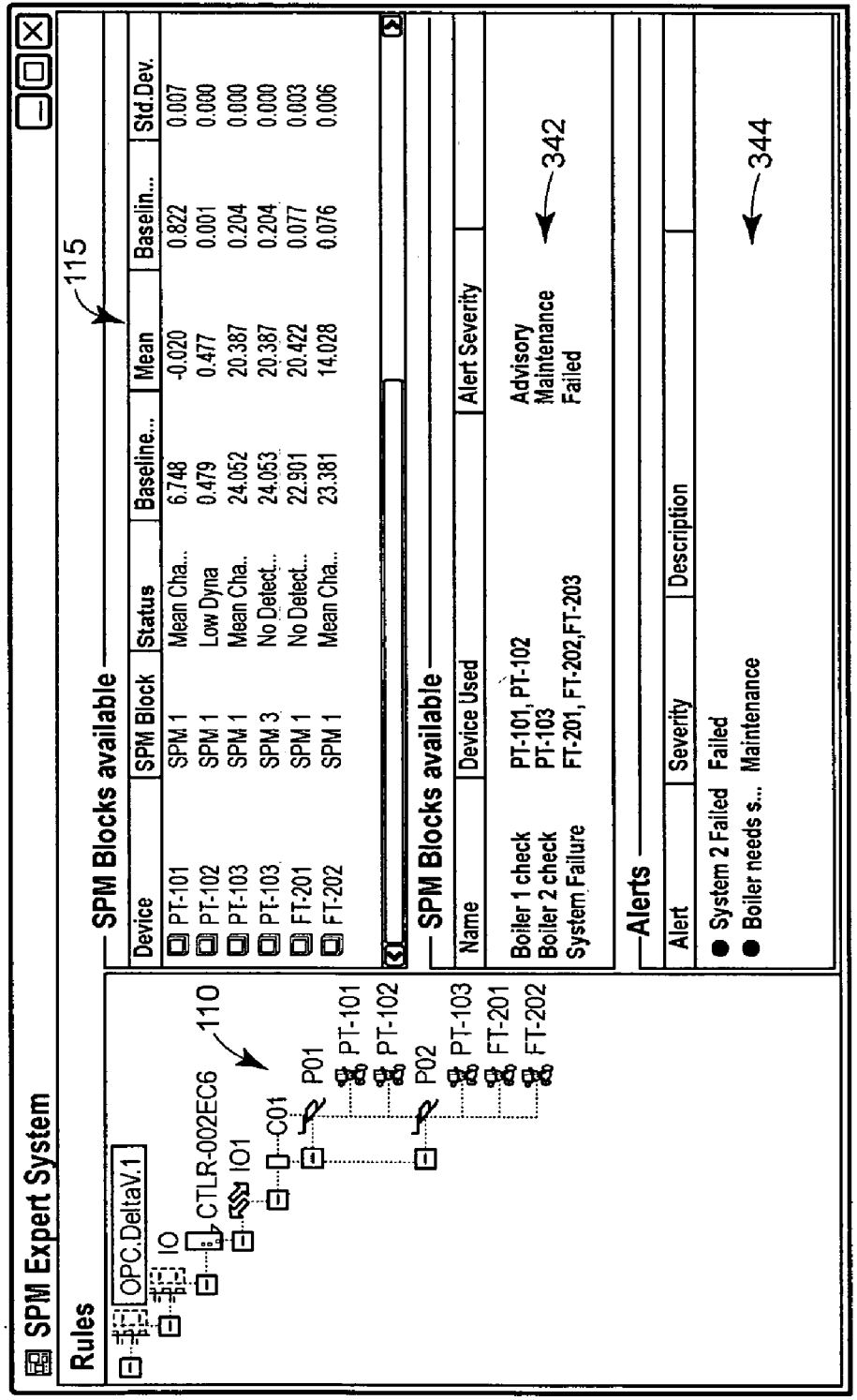
FIG. 39 is a depiction of a screen display illustrating a rules execution engine operational summary, summarizing rules used by and alerts generated by the rules engine of FIG. 37.

If desired, the system 42 may provide a viewing screen which provides a user with information about the current configuration and status of the rules engine 290 of FIG. 37. An example of such a display is illustrated in FIG. 39. In particular, a display 340 of FIG. 39 includes the detected ADB hierarchy 110 (as originally described with respect to FIGS. 6 and 8) as well as a summary of the SPM data 115 as described with respect to FIG. 8. Additionally, the screen 340 of FIG. 39 includes a rule summary section 342 which lists and summarizes some information about the rules that have been defined for and that are being implemented by the rules engine 290. In the example of FIG. 39, at least three rules have been defined, and the rules summary section 342 provides information on the devices used by each of these three rules as well as the type or severity of the alerts generated by each of these three rules. As also illustrated in FIG. 39, an alert summary section 344 provides an indication of any alert that has been set or sent by the rules engine 290 based on the rules defined therefore. In the example of FIG. 39, two alerts are currently set, including a System 2 Failed alert and a Boiler Needs Service alert. These alerts were generated by the rules engine 290 of FIG. 37 based on rules not specifically illustrated in the summary section 342, but which could be accessed by scrolling down in the summary section 342 if so desired.

As will be understood, the main tree browser 110 and the summary 115 of SPM blocks available may be provided by the methods described with respect to FIG. 4. Likewise, each rule in the rules summary section 342 may be created by the user using a configuration screen similar to that of FIG. 38. Also, the alerts are displayed if any of the conditions in the Status of the SPM Blocks match any of the rules that were defined. Of course, it will be understood that a user one could use pre-defined rules for known abnormalities, or modify existing rules for new conditions or create completely new rules, if necessary.

Figure 40:
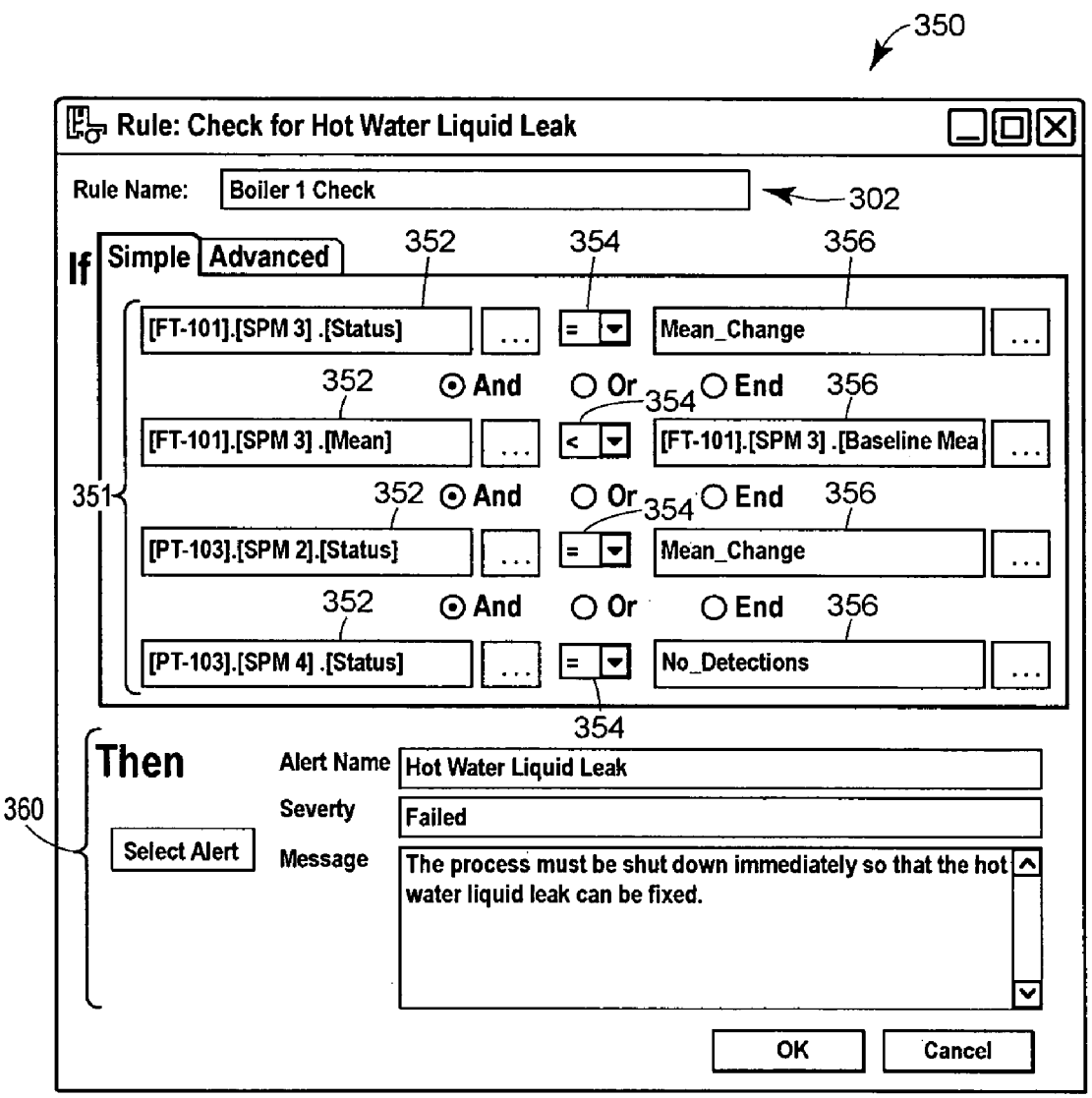
FIG. 40 is a depiction of a screen display illustrating a second configuration screen that enables a user to create a rule for the rules engine development and execution system of FIG. 37.
Figure 41:
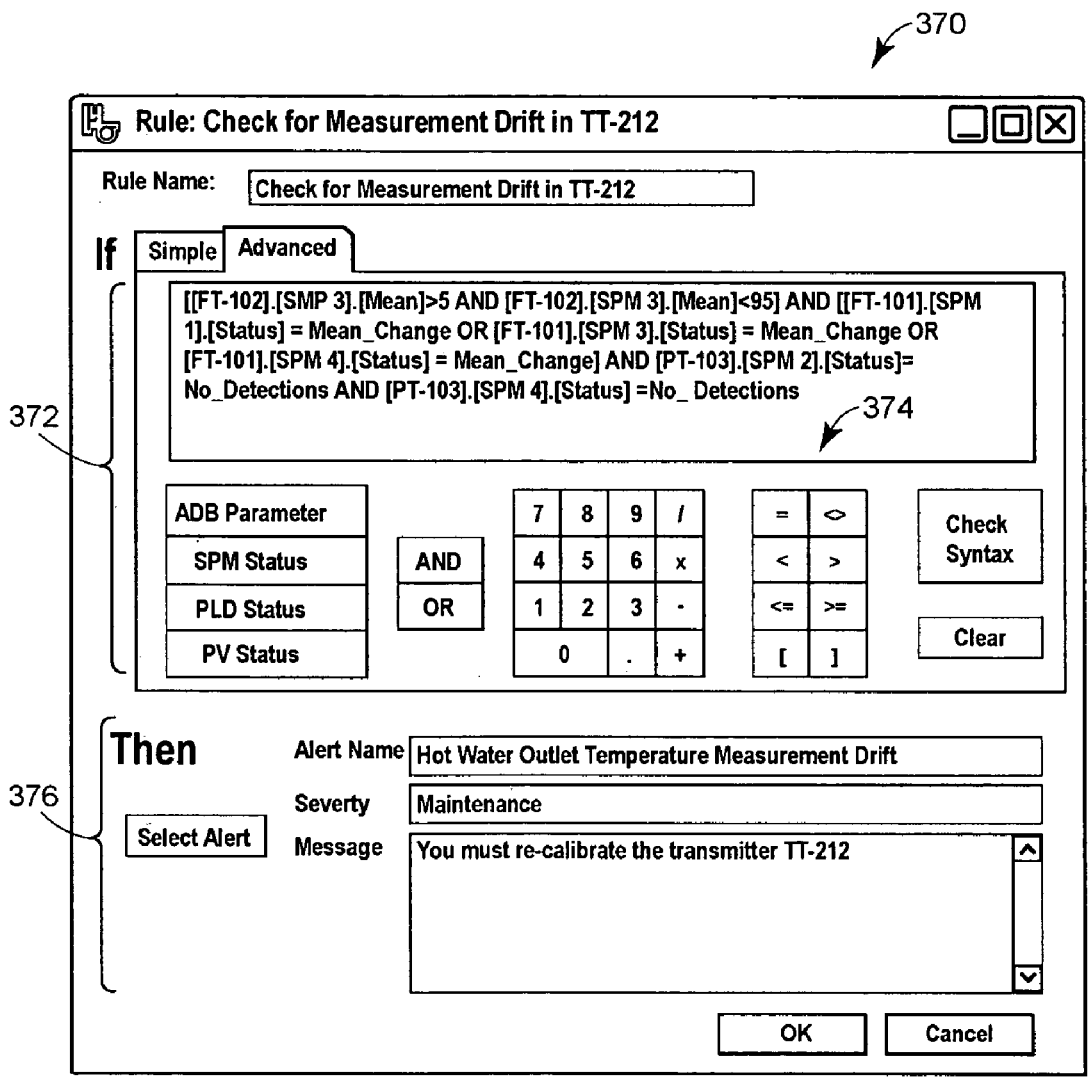
FIG. 41 is a depiction of a screen display illustrating a third configuration screen that enables a user to create a rule for the rules engine development and execution system of FIG. 37.

FIGS. 40 and 41 illustrate other examples of rule creation or definition screens. For example, a rule definition screen 350 includes a "Simple" type of Boolean rule definer which provides for a set of condition statements 351 each having a first element 352 that specifies a variable or SPM parameter to be tested, a testing or comparison condition 354 (which can be any mathematical operation or test) and a further element 356 which can be any process variable or SPM parameter. Each of these elements may be filled in manually or may be selected from a pull down menu if desired. Likewise, similar to the screen of FIG. 38, a Boolean operator may be specified to combine each condition statement 351 and a results section 360 may be used to specify an alert name, a severity and a message to be provided to a user as part of an alert if the defined IF statement is true.

FIG. 41 illustrates a more "Advanced" type of rule definer 370 which includes an IF section 372 that may be built by the selection of different buttons 374. The buttons 374 may include or allow a user to specify a type or a particular parameter (such as an ADB parameter, an SPM parameter, a process variable (PV) status or parameter, etc.), the Boolean operator, numbers and mathematical equivalent statements to used in creating a more complex IF statement in the section 372. A section 376, including an alert name definition section, a severity definition section and a message section, may be used to define an alert or an alarm to be generated by the rule. Of course, the application 40 could provide any other manner of defining a rule to be implemented by the rules engine 290 to detect current or predicted abnormal situations.

Still further, while the screens of FIGS. 38, 40, and 41 may be used to enable a user to define IF-THEN type Boolean rules, other types of rules may additionally or alternatively be defined. For example, the screens of FIGS. 38, 40, and 41 could be modified, or additional screens could be provided to allow the definition of spreadsheet-type rules (egg., rules similar to those provided by Excel® spreadsheet software from Microsoft), fuzzy logic rules, mathematical relationships between parameters, the generation of correlations, the filtering of parameters (e.g., low-pass filters, high-pass filters, band-pass filters, finite impulse response (FIR) filters, infinite impulse response (IIR) filters, etc.), etc.

During operation, the rules engine 290 of FIG. 37 could use a number of different methods to match the conditions of the SPM blocks with the defined rules in the rules database 292. If the rules in the rules database 292 are not too complex, the engine 290 could simply be programmed with the appropriate logic handlers. However, if some of the rules become very complex, it may be advantageous to utilize an expert system tool already developed.

As will be understood, once the monitoring process starts, all of the rules are fed into the rules engine 292 via any appropriate interface. Thereafter, each time the SPM conditions change, such as would be detected by the blocks 132 or 134 of FIG. 4, these conditions are fed into the rules engine 292. At each interval, the rules engine 292 then determines if the conditions of any of the rules are matched. If any of the rules are satisfied, then the rules engine 290 sends a notice back to the main application, so that an alert can be displayed to the user, or takes some other action based on the action statement of the particular rule that is met.

Figure 42:
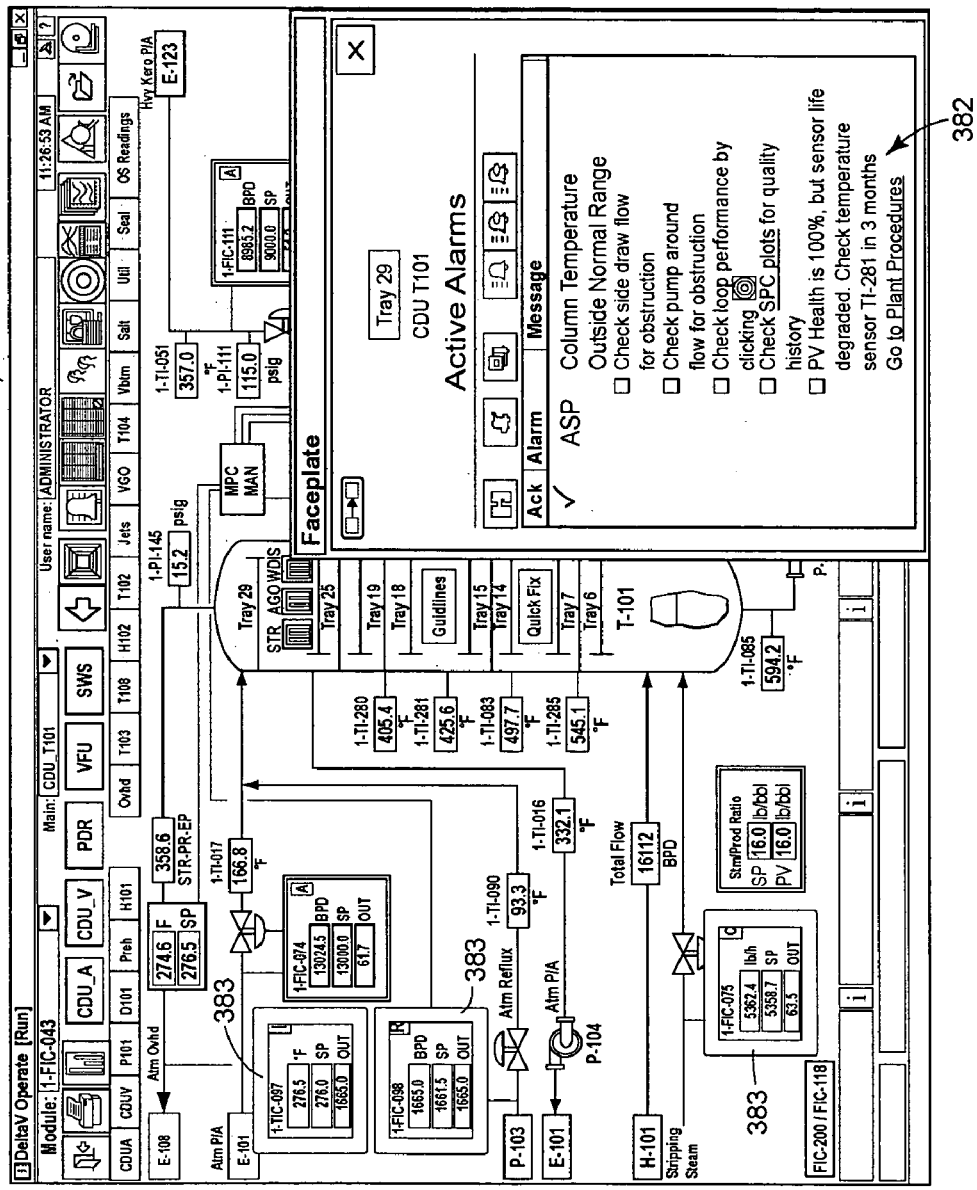
FIG. 42 is a depiction of a screen display illustrating a portion of a process plant, the display including alert/alarm information.

FIG. 42 illustrates an example screen display 380 of a portion of a process plant and an alarm display 382. The rules engine 290 may cause the alarm display 382 to be displayed if one or more appropriate rules are satisfied. The alarm display 382 may include suggested corrective actions, links to plant procedures, links to view performance/quality data, etc. The screen display 380 may also include highlights 383 around portions of the display to indicate devices, loops, measurements, etc., that are associated with the alarm. The rules engine 290 may, for example, send data to the viewing application 40 that causes it to display the alarm display 382 and the highlights 383.

Figure 43:
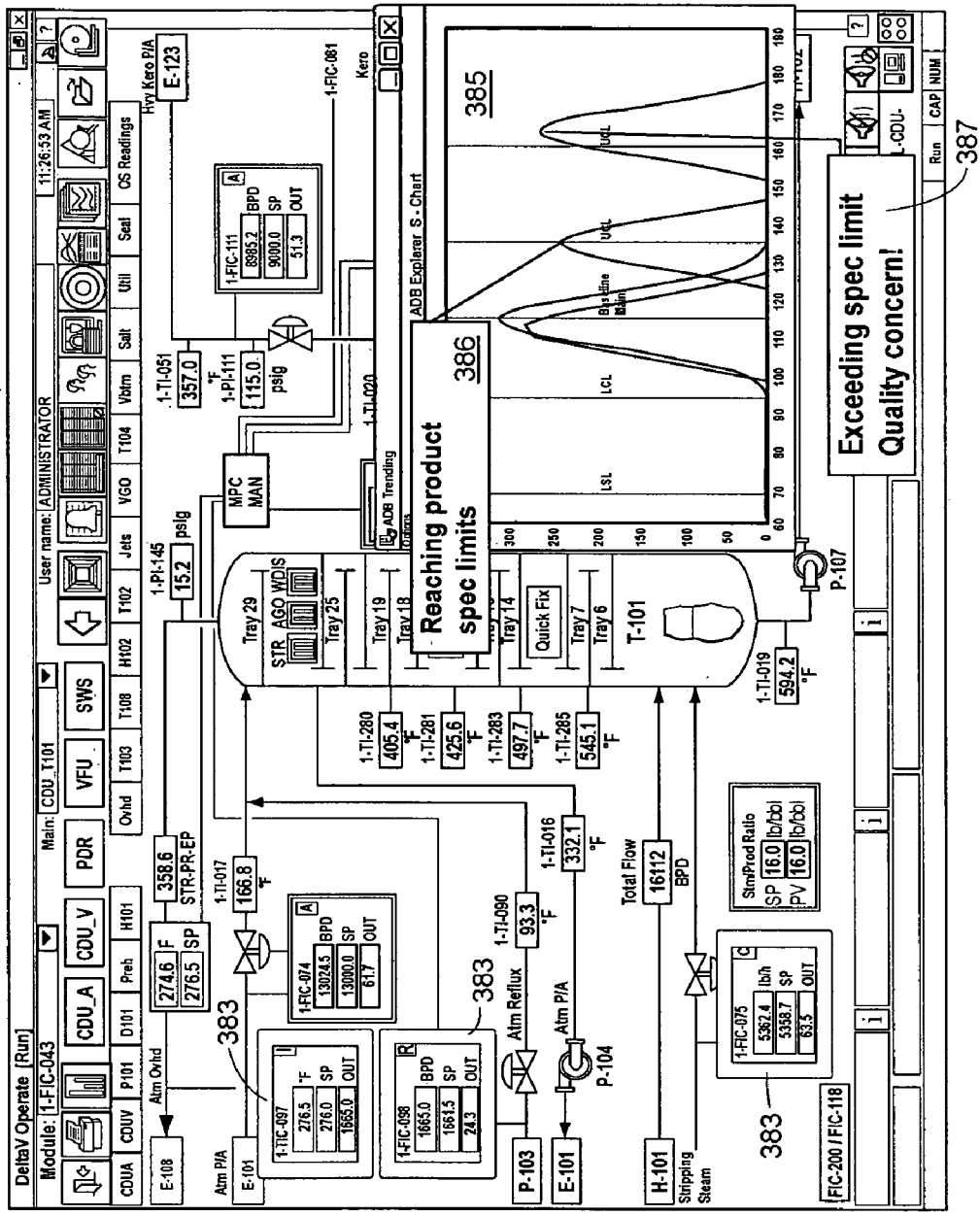
FIG. 43 is another depiction of a screen display illustrating a portion of a process plant, the display including alert/alarm information.

FIG. 43 illustrates another example screen display 384 of a portion of a process plant, the display 384 including alert/alarm information. In particular, a plot 385 displays various statistical parameter associated with the alert/alarm. The screen display 384 may also include information windows 386 and 387 that display information associated with the alarm. The information windows 386 and 387 may indicate different levels of importance via color coding, for example. The rules engine 290 may cause the windows 385, 386, and 387 to be displayed if one or more appropriate rules are satisfied. The rules engine 290 may, for example, send data to the viewing application 40 that causes it to display the windows 385, 386, and 387.

Figure 44:
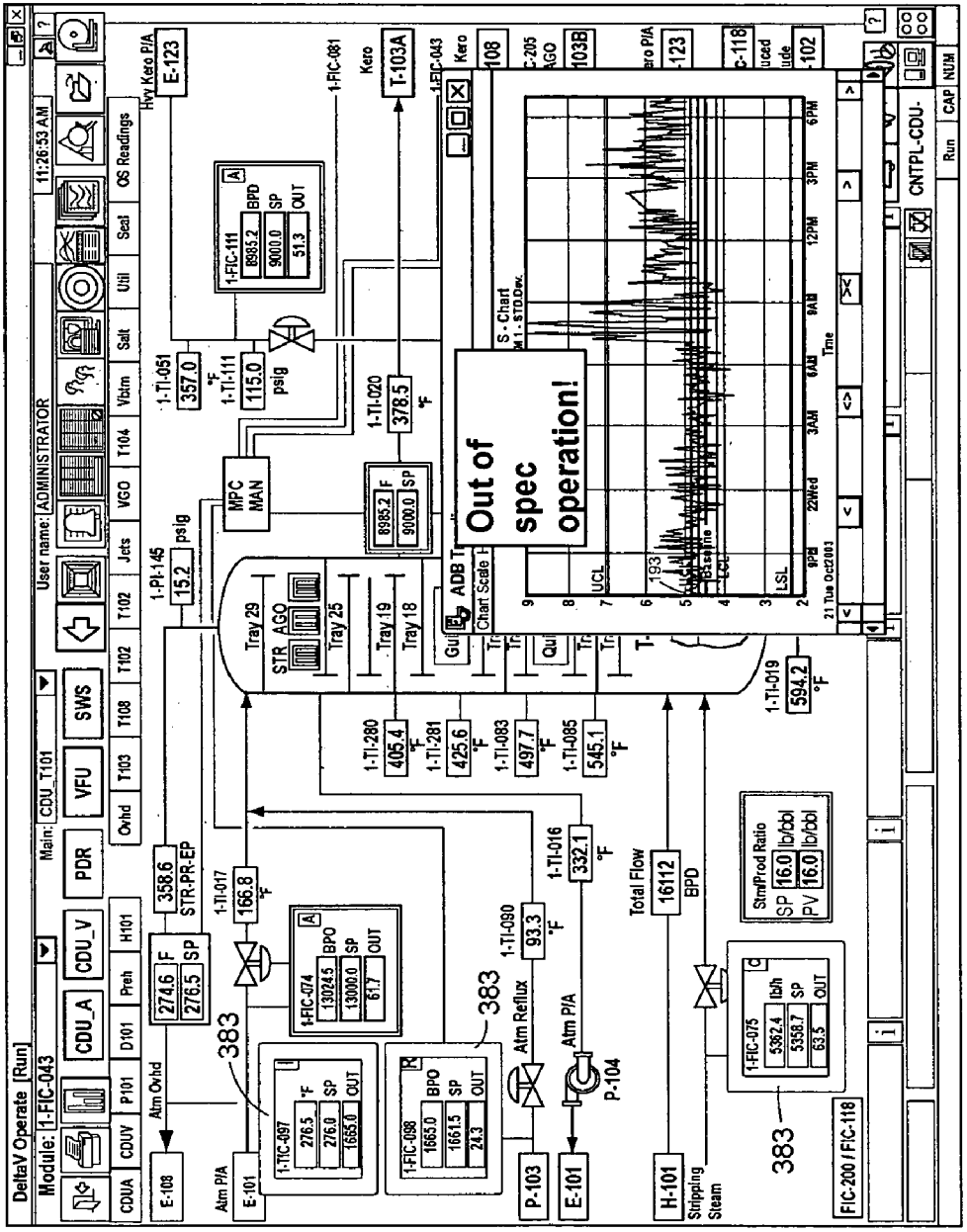
FIG. 44 is yet another depiction of a screen display illustrating a portion of a process plant, the display including alert/alarm information.
Figure 45:
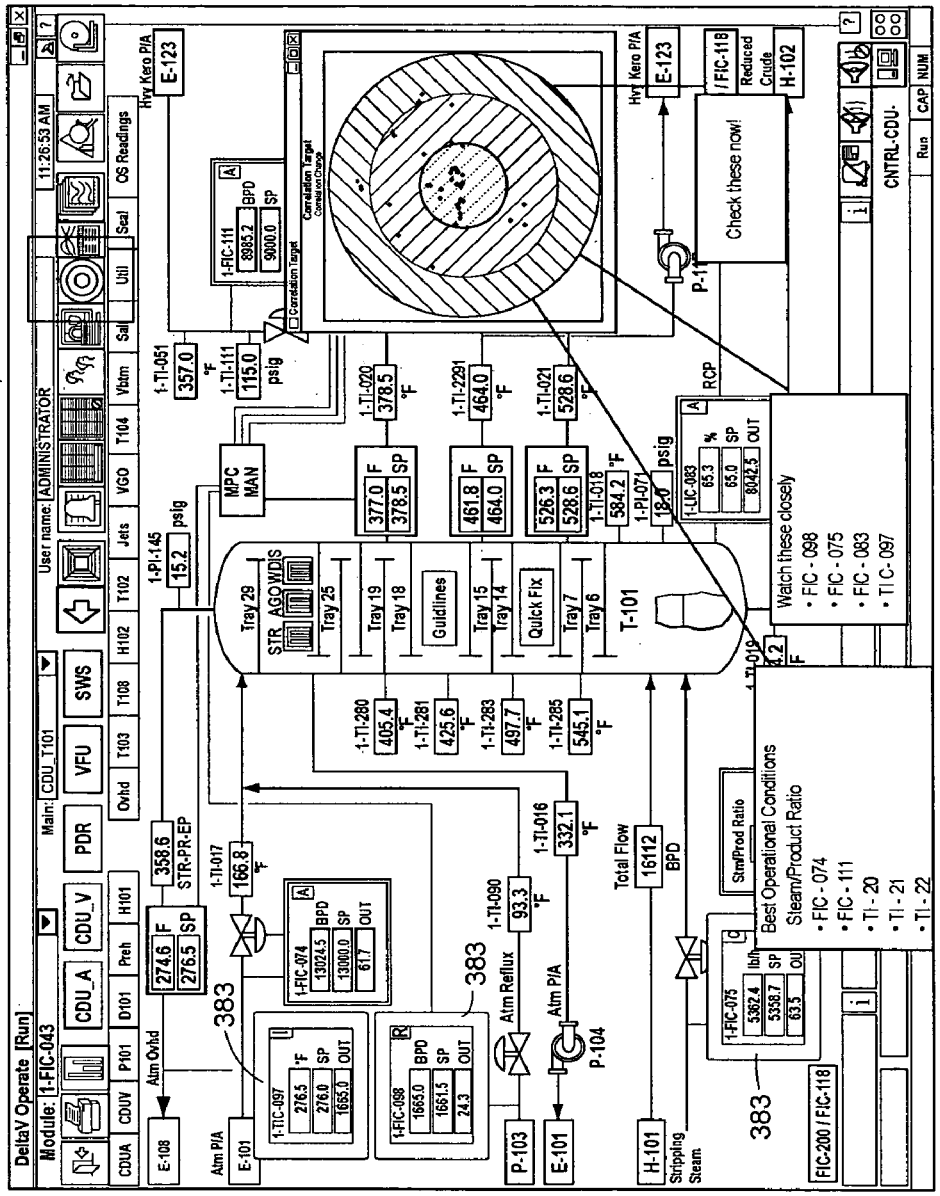
FIG. 45 is still another depiction of a screen display illustrating a portion of a process plant, the display including alert/alarm information.

FIG. 44 illustrates yet another example screen display 390 of a portion of a process plant, the display 390 including alert/alarm information. FIG. 45 illustrates still another example screen display 395 of a portion of a process plant, the display 395 including alert/alarm information.

Although a rules engine 292 was described above, other types of analysis engines could be used additionally, or alternatively. Other examples of types of analysis engines that could be used include a mathematical computing engine (e.g., Mathematical computing system from Wolfram Research, MATLAB® system from The MathWorks, etc.), a fuzzy logic analysis engine, a pattern matching engine, a neural network, a regression analysis engine, etc.

While the above described data collection technique, visualization technique and rules engine techniques may be used to collect, view and process SPM data in the plant configuration of FIG. 1, it may be used in other configurations as well. For example, it may be used in a PC based environment (e.g., DeltaV, AMS, and Ovation) where software has access to various servers (e.g., OPC servers, web servers, etc.) to obtain the plant hierarchy and to find the devices in a given plant and to determine the devices with ADB and SPM capabilities. Another use is directly in field hardened devices, like the Rosemount 3420 device, which has a built in OPC server and has access to the field devices directly. In this case, the device, itself may store the data collection and rules engine applications and run these applications without the need of a separate platform, such as a user workstation. Additionally, in this or other cases, the visualization applications or components described herein may be run or implemented in other devices, such as in handheld devices, personal data assistants, etc. which may connect to the stand alone device to obtain the collected SPM data, the alerts, etc. for viewing by a user.

In a similar manner, the data collection and viewing applications may access the field devices or other devices via a remote viewing device. Thus, this software may reside in or be accessible through web servers like, for example, the Asset Portal and AMSweb provided by Emerson Process Management. Also, while the OPC server has been illustrated in FIG. 2 as being separate from a field device including the SPM blocks, the OPC server or other server could be located in one or more of the field devices themselves. Likewise, the data collection application 38 and rules engine 42 of the abnormal situation prevention system may be located within the same device as the ADBs and/or the SPM blocks which are generating the SPM data, e.g., within a field device having ADBs or SPM blocks therein. In this case, the abnormal situation prevention system 35 may operate or be executed in the same device as the statistical data collection blocks without the need of an OPC interface (although an OPC interface may still be used). If desired, the SPM data or the alerts, alarms, etc. generated by the applications 38 and 42 may be accessed in any manner data is typically accessed from the field device, such as through a controller connection, through a handheld device, wirelessly, etc.

Figure 46:
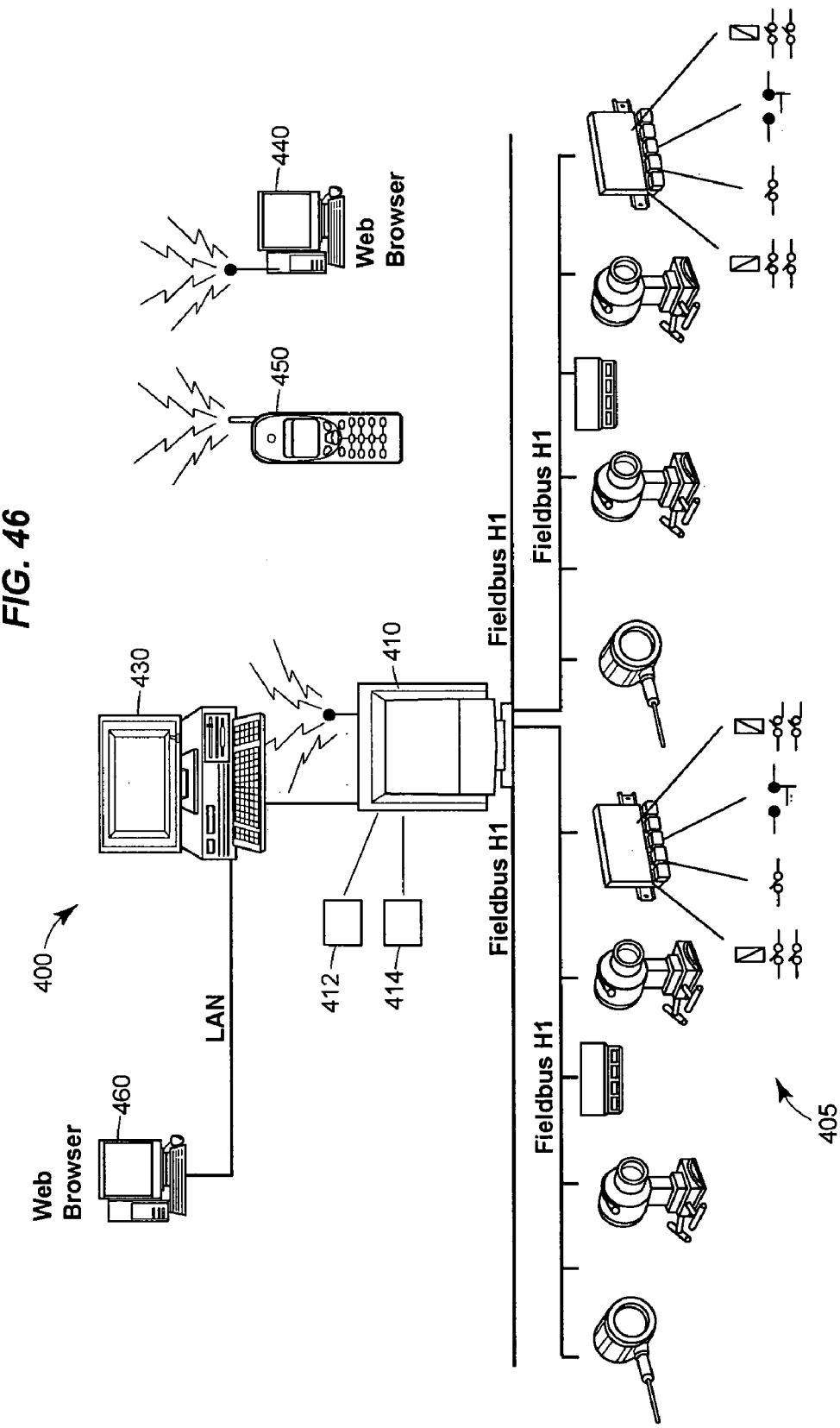
FIG. 46 is a depiction of an interface device connected within a further process plant to perform abnormal situation detection and prevention.

FIG. 46 illustrates another manner of implementing abnormal situation prevention in a process plant that does not require the use of distributed controllers, hosts or other more traditional user interfaces to support SPM blocks and the abnormal situation prevention in functionality. In the system 400 of FIG. 46, some or all of the abnormal situation prevention application 35 and/or the applications 38–42 may be stored in a device other than a host workstation or personal computer. The example system 400 of FIG. 46 includes a set of field devices 405 (illustrated as Fieldbus field devices, but they could be other types of devices as well) connected to an interface device 410, which may be, for example, the Rosemount 3420 device. In this case, the interface device 410, which is not a personal computer, may include some or all of the functionality of the abnormal situation prevention system 35 described above. In particular, the interface device 410 may include a browser 412 to receive and organize data delivered from the field devices 405 (which may be various different types of field devices). If desired, this browser or communication device 412 may include an OPC browser. The data collection application 38 (or a portion of it) may also be stored in and executed on a processor in the interface device 410 to collect data from the field devices 405, including SPM data, as described above, for any field devices having SPM blocks therein. Additionally, the interface device 410 may include one or more SPM blocks 414 there into collect process variable data directly from one or more of the field devices (such as field devices which do not include SPM blocks or functionality) and to generate SPM parameters, as discussed above. In this manner, the SPM blocks 414 stored in and executed in the interface device 410 are able to compensate for the lack of SPM blocks within certain ones of the field devices 405 and may be used to provide SPM data for field devices which do not themselves support SPM blocks or SPM functionality.

Additionally, the rules engine application 42 (or portions thereof such as the rules engine 290 of FIG. 37) may be stored in and executed by the interface device 410 and the database 43 may, likewise, be located in the interface device 410. The interface device 410 may communicate with other devices such as a host workstation 430 via a hardwired connection, such as a 2-wire, a 3-wire, a 4-wire, etc. connection, to provide SPM data, or data developed therefrom, such as alerts, data plots, etc. to those devices for viewing by a user. Additionally, as illustrated in FIG. 46, the interface device 410 may be connected via one or more wireless communication connections to a web browser 440 and to a handheld computing device 450, such as a telephone, a personal data assistant (PDA), a laptop computer, etc. In this example, one or more of the viewing applications 40 may be stored in and executed in other devices, such as the host workstation 430, in the web browser 440 or in the handheld computing device 450 and these applications may communicate with the interface device 410 to obtain the desired data for processing and viewing in any manner, such as any of those described above. If desired, the devices 430, 440 and 450 may include the rules definition application 298 of FIG. 37 to enable a user to generate rules to be implemented by the rules engine in the interface device 410. Likewise, as illustrated in FIG. 46, the data from the interface device 410 may be accessed indirectly from the host 430 by a web browser 460 and provided to other users via any desired web connection. Of course, the interface device 410 may include a web server therein and may communicate with any other device, such as the devices 430, 440, 450, and 460 using any desired protocol, such as OPC, Modbus, Ethernet, HTML, XML, etc.

Figure 47:
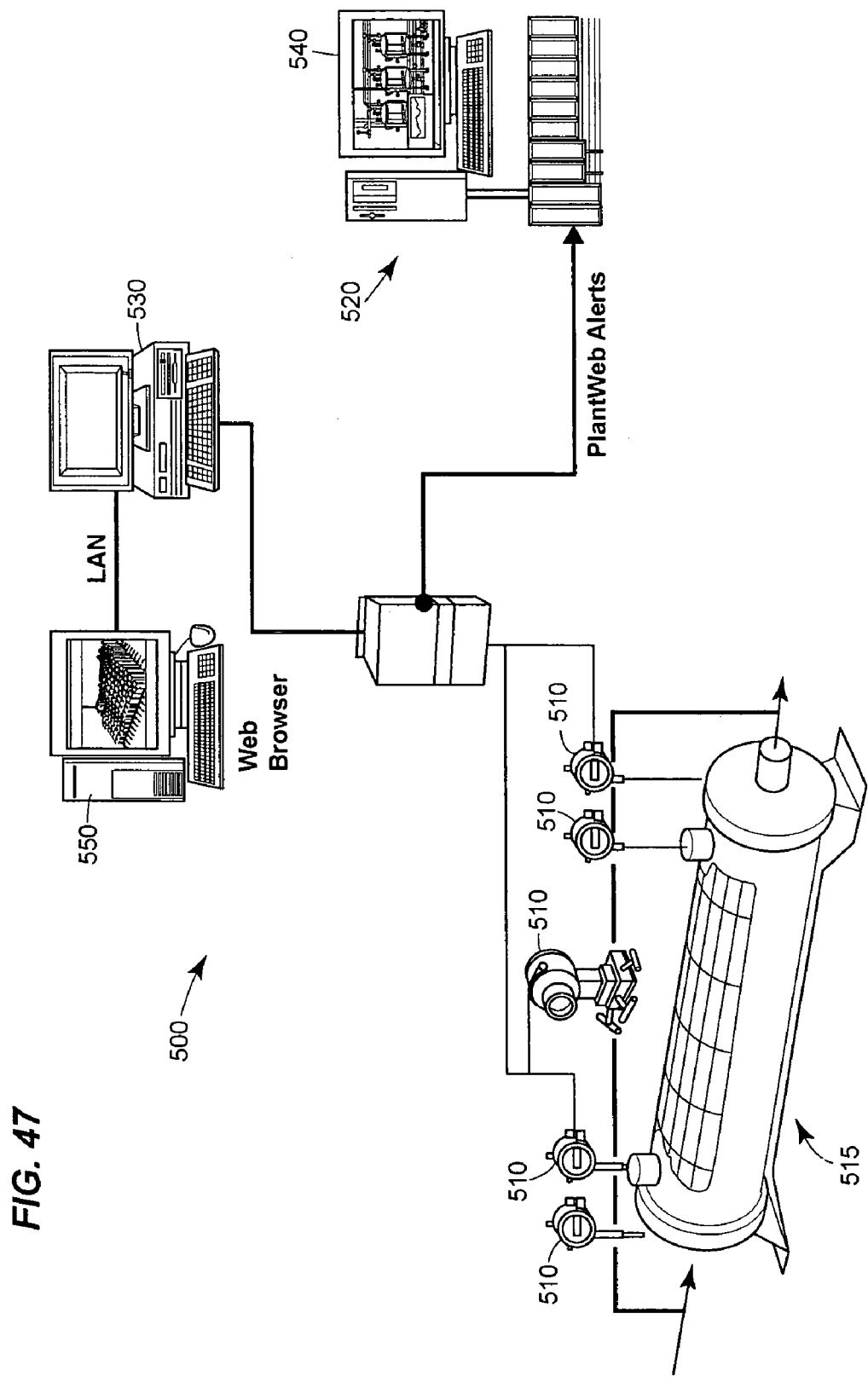
FIG. 47 is a depiction of an interface device connected within still another process plant to perform abnormal situation detection and prevention.
Figure 17:
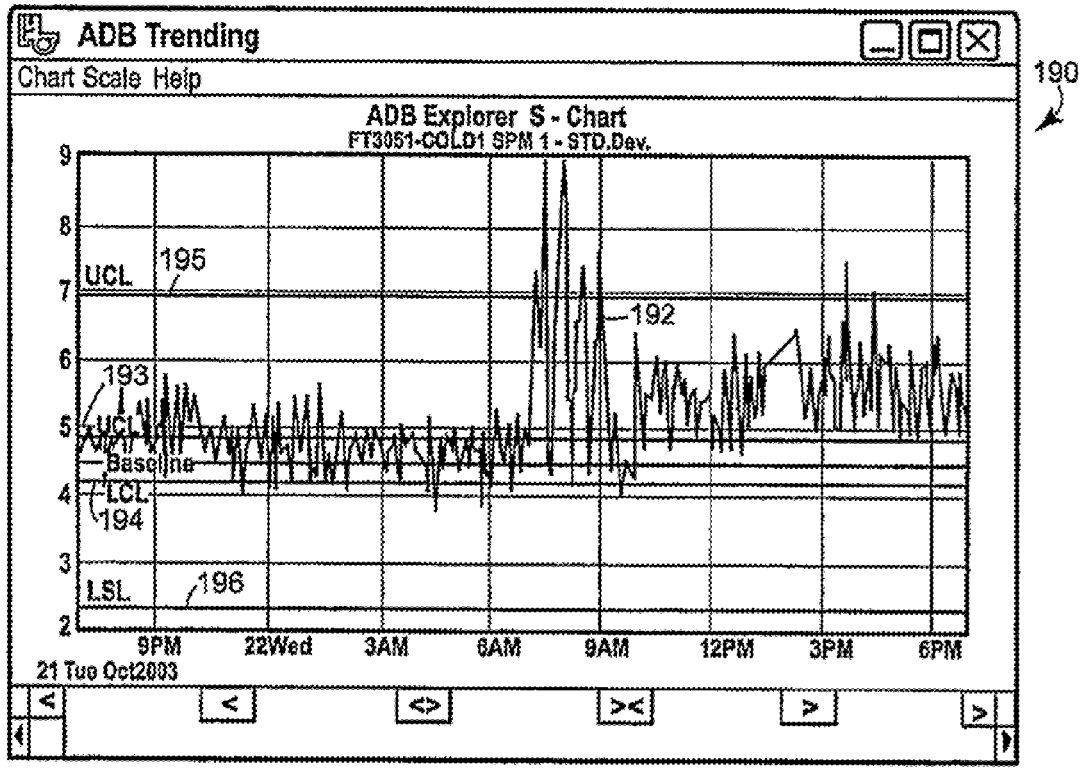
Figure 18:
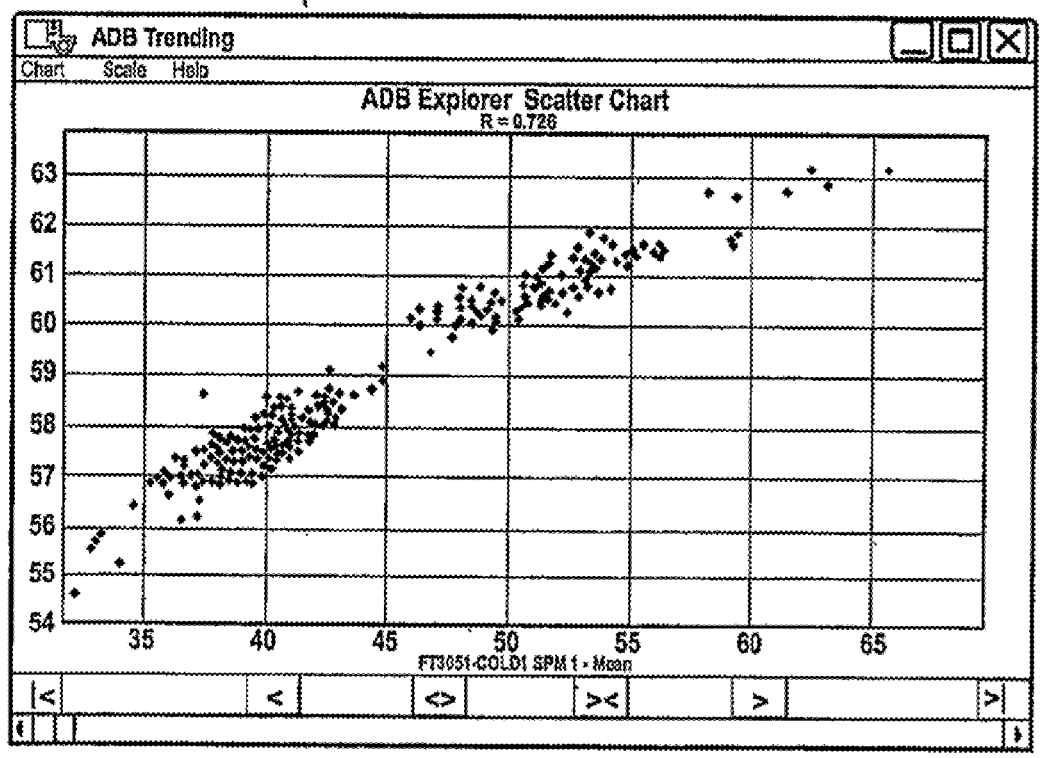
Figure 25:
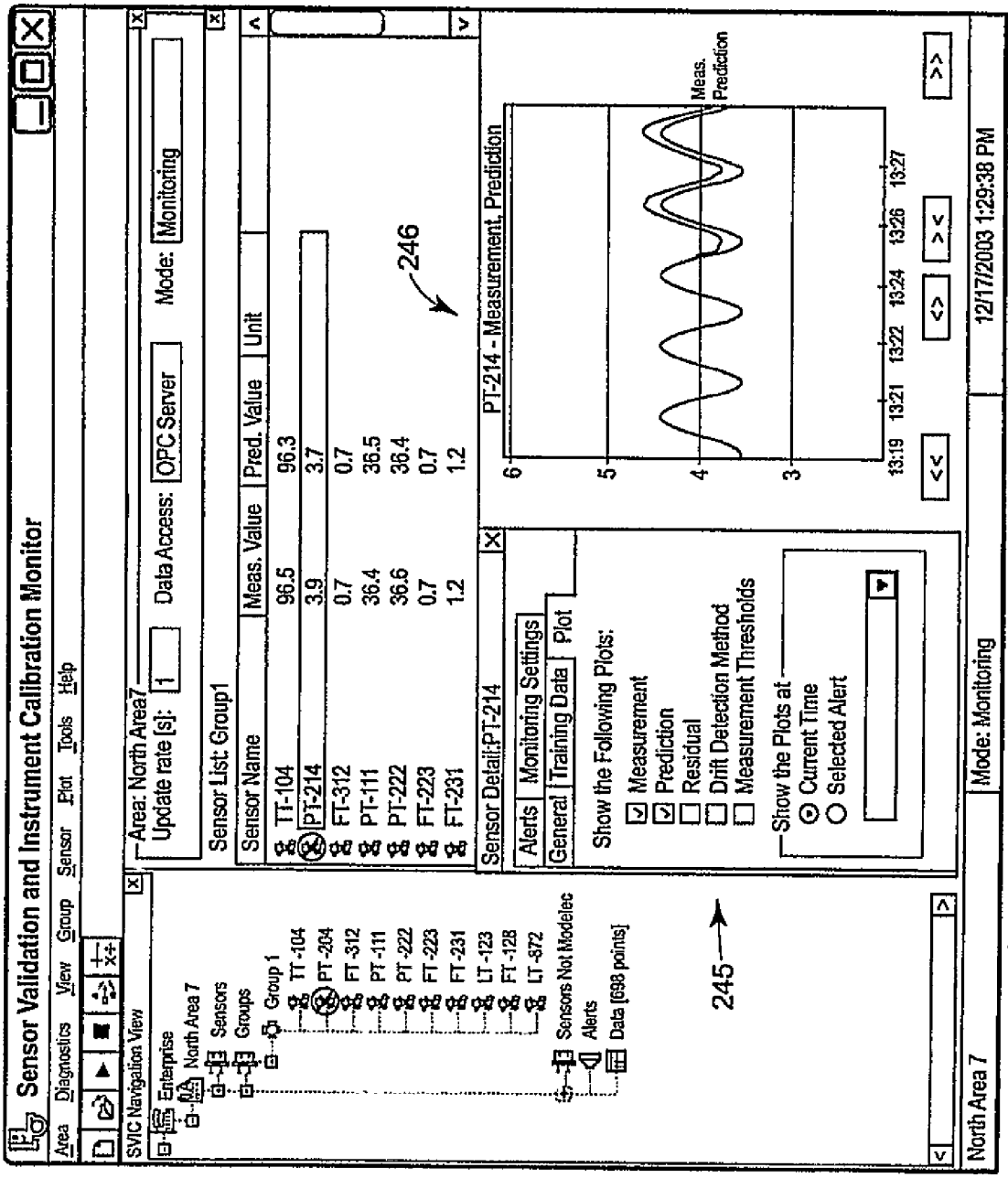
Figure 35:
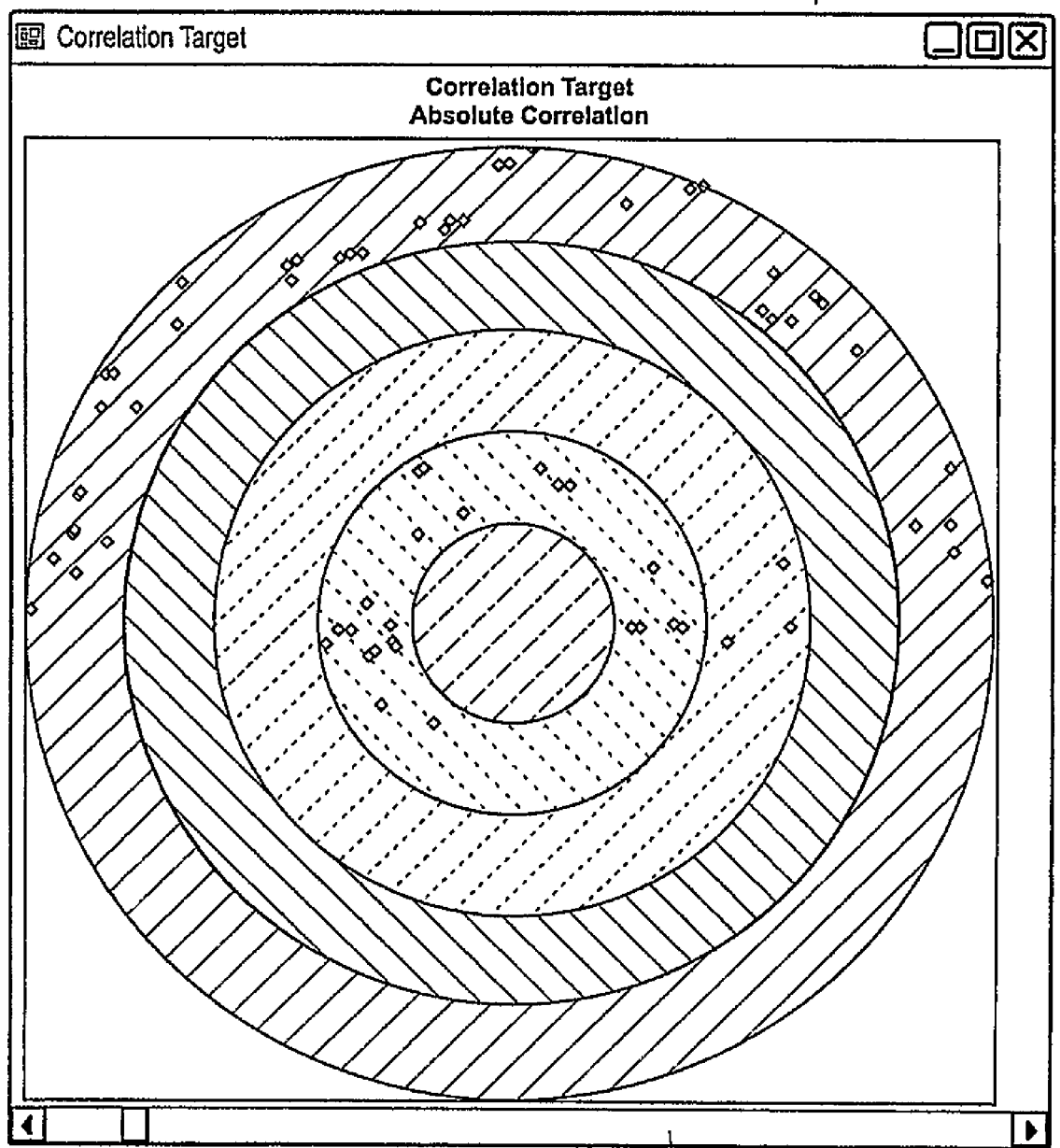
Figure 40:
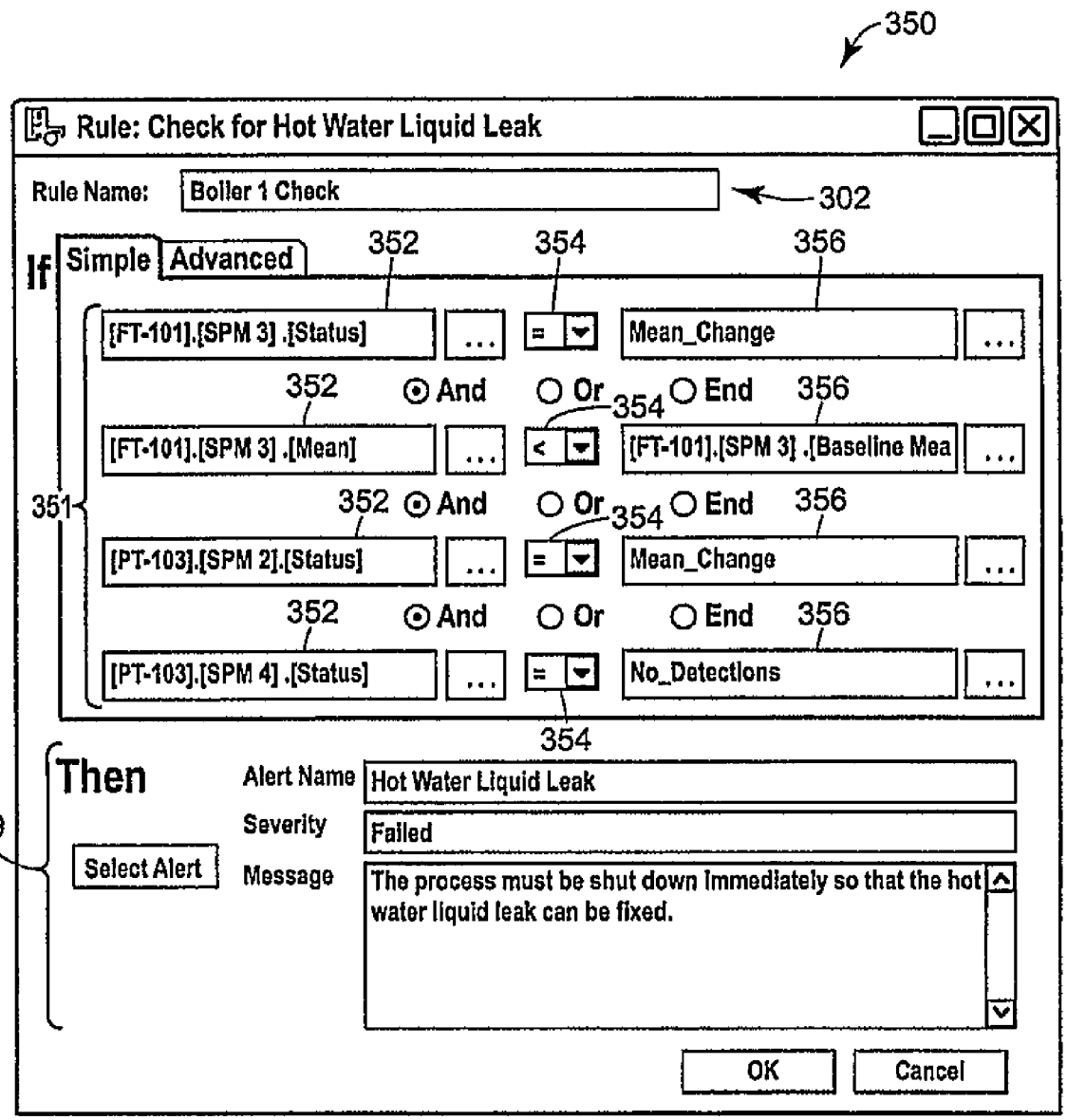
Figure 43:
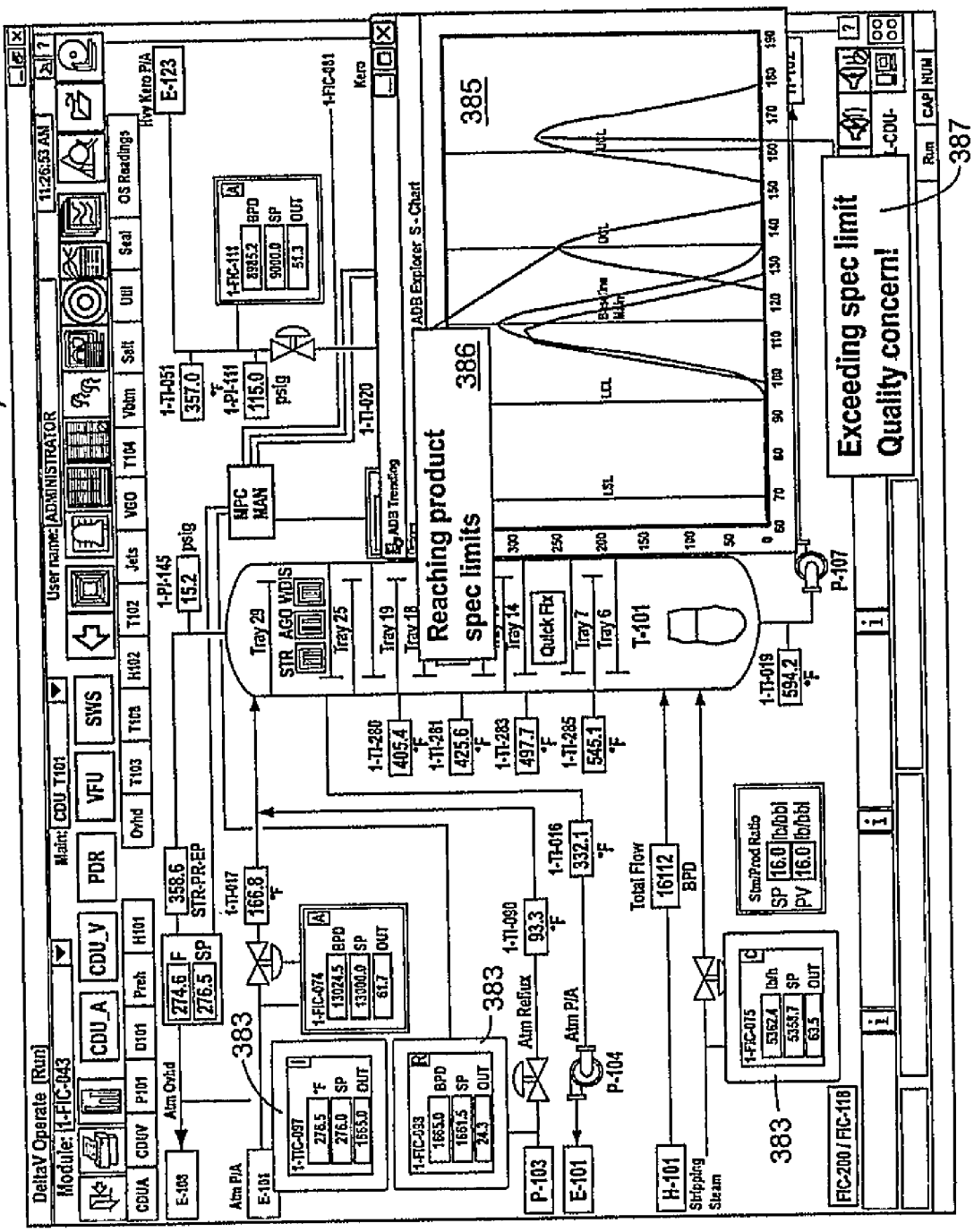

FIG. 47 illustrates a further process plant configuration 500 in which an interface device 410, which may be similar to or the same as that of FIG. 46, is connected between a set of field devices 510 (forming part of a heat exchanger 515) and a process controller system 520. Here, the interface device 410, which may include all of the applications and functionality of the device 410 of FIG. 46, may provide data for viewing to a host 530, and may provide alerts or alarms generated by a rules engine to the controller system 520. The controller system 520 may integrate these alerts or alarms with other controller type alerts and alarms for viewing by, for example, a control operator at an operator workstation 540. Of course, if desired, the host workstation 530 may include any desired viewing application to view the data collected in and provided by the interface device 410 in any desired manner, including any of those discussed herein. Likewise, this data may be made available for viewing by other users via a web browser 550. Thus, as will be understood, the various applications discussed herein as being associated with the abnormal situation prevention system 35 may be distributed in different devices and need not all be operated in a device having a user interface. Instead, the data (such as SPM data) may be collected and processed in one device, such as in the interface device 410, and sent for viewing in a completely different device. Likewise, rules may be created in a user interface device, such as a host, a web browser, a PDA, etc. and sent to a different device, such as the interface device 410, for implementation in a rules engine.

While in the example of FIGS. 1 and 2, the applications 38, 40 and 42 associated with the abnormal situation prevention system 35 are illustrated as being stored on the same workstation or computer, some of these applications or other entities may be stored in and executed in other workstations or computer devices within or associated with the process plant 10. Furthermore, the applications within the abnormal situation prevention system 35 may be broken up and executed on two or more computers or machines and may be configured to operate in conjunction with one another via wired, wireless, and/or intermittent communication connections. Still further, the abnormal situation prevention system 35 described herein may include any or all of the applications 38, 40 and 42 and may include, but does not necessarily include, the ADB or SPM blocks described herein. Still further, while the examples described herein use SPM blocks in the form of Fieldbus SPM blocks, the term SPM block as used herein is intended to refer to and to include any other types of statistical process monitoring blocks, routines, etc. which collect process data or variables and which perform some statistical operation or monitoring thereon, whether or not these blocks or routines conform to the known Fieldbus protocol.

Moreover, although the above description referred to blocks, such as ADB blocks and SPM blocks, that calculate statistical data, other types of signal processing data collection blocks that generate other types of signal processing data may be utilized as well. For example, signal processing data collection blocks that generate frequency analysis data (e.g., data generated based on a Fourier transform or some other transform of a process variable), auto regression data, wavelets data, data generated using a neural network, data generated using fuzzy logic, etc., could be used in an abnormal situation prevention system. Thus, the term signal processing data collection block as used herein is intended to refer to and to include any type of monitoring blocks, software routines, hardware, etc. which collect process data or variables and which perform some signal processing operation or monitoring thereon, such as generating statistical data, mathematically transforming (e.g., using Fourier transform, discrete Fourier transform, fast Fourier transform, short time Fourier transform, Z-transform, Hilbert transform, Radon transform, Wigner distribution, wavelet transform, etc.) process data, extracting information from transformed process data, filtering, extracting information from process data using fuzzy logic, neural networks, auto regression techniques, etc.

Further, although examples have been described in which signal processing data from signal data collection blocks within a single process plant is gathered and analyzed, it will be understood that similar techniques can be used in the context of multiple process plants. For example, signal processing data from multiple process plants can be gathered, and then this data could be provided to an analysis engine and/or a viewing application.

Although examples have been described using particular communication protocols and techniques, a variety of other protocols and techniques, including known protocols and techniques, for accessing configuration data and signal processing data from signal processing data collection blocks can be used as well. For instance, other protocols and techniques besides OPC can be used to identify and/or configure signal processing data collection blocks, gather signal processing data, etc. Other techniques may include, for example, using Internet protocols, Ethernet, XML, proprietary protocols, etc., and other implementations may utilize web servers, and/or proprietary computing devices such as process controllers, I/O devices, workstations, field devices, etc. Similarly, other types of hierarchy data may be utilized including proprietary data.

While the abnormal situation prevention system and the applications described, herein as being associated with the abnormal situation prevention system are preferably implemented in software, they may be implemented in hardware, firmware, etc., and may be implemented by any other processor associated with the process control system. Thus, the elements described herein may be implemented in a standard multi-purpose CPU or on specifically designed hardware or firmware such as an application-specific integrated circuit (ASIC) or other, hard-wired device as desired. When implemented in software, the software routine may be stored in any computer readable memory such as on a magnetic disk, a laser disk (such as a DVD) or other storage medium, in a RAM or ROM of a computer or processor, in any database, etc. Likewise, this software may be delivered to a user or a process plant via any known or desired delivery method including, for example, on a computer readable disk or other transportable computer storage mechanism or over a communication channel such as a telephone line, the internet, etc. (which are viewed as being the same as or, interchangeable with providing such software via a transportable storage medium).

Thus, while the present disclosure has been described with reference to specific examples, which are intended to be illustrative only and not to be limiting, it will be apparent to those of ordinary skill in the art that changes, additions or deletions may be made to the disclosed embodiments without departing from the spirit and scope of the disclosure.

What is claimed is:

1. A method for detecting abnormal conditions associated with a process plant, the method comprising:

receiving signal processing data generated by signal processing data collection blocks implemented by a plurality of devices associated with the process plant;

providing configuration data to an analysis engine to configure the analysis engine to detect at least one abnormal condition associated with the process plant based at least on the collective signal processing data from each of the signal processing data collection blocks;

providing the signal processing data to the analysis engine; and using the analysis engine to determine if an action should be taken.

2. A method according to claim 1, wherein receiving signal processing data comprises receiving signal processing data retrieved from a database.

3. A method according to claim 1, wherein receiving signal processing data comprises receiving signal processing data from at least one field device associated with the process plant.

4. A method according to claim 1, wherein receiving signal processing data comprises receiving a signal processing parameter associated with a process variable.

5. A method according to claim 1, wherein receiving signal processing data comprises receiving an indication of a condition of a signal processing parameter associated with a process variable.

6. A method according to claim 1, wherein receiving signal processing data comprises receiving at least one of statistical data, frequency analysis data, auto regression data, wavelets data, data generated using a neural network, and data generated using fuzzy logic.

7. A method according to claim 1, wherein receiving signal processing data comprises receiving signal processing data generated by at least one statistical data collection block.

8. A method according to claim 1, wherein receiving signal processing data comprises receiving signal processing data generated by at least one signal processing data collection block implemented by a field device.

9. A method according to claim 1, wherein receiving signal processing data comprises receiving signal processing data generated by at least one signal processing data collection block implemented by at least one of a process controller, a data historian, and a workstation.

10. A method according to claim 1, wherein receiving signal processing data comprises receiving data generated by a field device that conforms with at least one of the Foundation Fieldbus protocol, the HART protocol, the Profibus protocol, the WORLDFIP protocol, the Device-Net protocol, the AS-Interface protocol, and the CAN protocol.

11. A method according to claim 1, wherein receiving signal processing data comprises receiving signal processing data via at least one of a wired network and a wireless network.

12. A method according to claim 1, wherein receiving signal processing data comprises receiving signal processing data via at least one of a wired connection, a wireless connection, and an intermittent connection.

13. A method according to claim 1, wherein providing the signal processing data to the analysis engine comprises providing signal processing data to a rules engine.

14. A method according to claim 13, wherein providing signal processing data to the rules engine comprises providing signal processing data to a rules engine configured to apply at least one Boolean rule to at least some of the signal processing data.

15. A method according to claim 13, wherein providing signal processing data to the rules engine comprises providing signal processing data to a rules engine configured to apply at least one fuzzy logic rule to at least some of the signal processing data.

16. A method according to claim 1, wherein providing the signal processing data to the analysis engine comprises providing signal processing data to an analysis engine configured to determine a degree of correlation among at least some of the signal processing data.

17. A method according to claim 1, wherein providing the signal processing data to the analysis engine comprises providing the signal processing data to at least one of a neural network, mathematical computing engine, a fuzzy logic analysis engine, a pattern matching engine, and a regression analysis engine.

18. A method according to claim 1, wherein using the analysis engine comprises using the analysis engine to determine if an alert or alarm should be generated;

the method further comprising generating the alert or alarm.

19. A method according to claim 1, wherein using the analysis engine comprises using the analysis engine to determine if a control setting associated with the process plant should be changed;

the method further comprising causing the control setting to be changed.

20. A method according to claim 1, wherein using the analysis engine comprises using the analysis engine to determine if an operator should be prompted with one or more recommended actions to take regarding an abnormal condition;

the method further comprising causing the operator to be prompted with the one or more recommended actions.

21. A method according to claim 1, wherein using the analysis engine comprises using the analysis engine to determine if at least one of a control condition and a setpoint associated with a controller should be changed;

the method further comprising causing the at least one of the control condition and the setpoint associated with the controller to be changed.

22. A method according to claim 1, further comprising providing, via a user interface, information indicative of a status of the analysis engine during an analysis of the signal processing data.

23. A method according to claim 1, further comprising providing, via a user interface, information indicative of a configuration of the analysis engine during an analysis of the signal processing data.

24. A method according to claim 1, wherein providing configuration data to the analysis engine comprises providing configuration data to the analysis engine to configure the analysis engine to detect at least one abnormal condition associated with the process plant further based on at least one of process configuration data, control strategy data, control output data, process variable data, historical data, simulation data, optimization data, an alert, an alarm, alert/alarm management data, document management data, help/guidance data, rotating equipment data, lab analysis data, and environmental regulation data.

25. A system for detecting abnormal conditions associated with a process plant, the system comprising:

at least one processor communicatively coupled to a network associated with the process plant;

at least one computer readable memory communicatively coupled to the at least one processor;

a first routine stored on the at least one computer readable memory and adapted to be executed on the at least one processor to receive signal processing data generated by signal processing data collection blocks implemented by a plurality of devices associated with the process plant;

a second routine stored on the at least one computer readable memory and adapted to be executed on the at least one processor to provide configuration data to an analysis engine to configure the analysis engine to detect at least one abnormal condition associated with the process plant; and a third routine stored on the at least one computer readable memory and adapted to be executed on the at least one processor to implement the analysis engine to analyze the collective signal processing data from each of the signal processing data collection blocks to determine if an action should be taken.

26. A system according to claim 25, wherein the third routine is to implement the analysis engine to additionally analyze at least one of process configuration data, control strategy data, control output data, process variable data, historical data, simulation data, optimization data, an alert, an alarm, alert/alarm management data, document management data, help/guidance data, rotating equipment data, lab analysis data, and environmental regulation data to determine if the action should be taken.

27. A method for configuring an analysis engine to detect an abnormal condition associated with a process plant, the method comprising:

providing a first user interface mechanism to specify a first signal processing parameter from a plurality of signal processing parameters generated by a plurality of signal processing data collection blocks implemented by a plurality of devices associated with the process plant;

providing a second user interface mechanism to specify a second signal processing parameter from the plurality of signal processing parameters generated by the plurality of signal processing data collection blocks implemented by the plurality of devices;

providing a third user interface mechanism to specify an analysis of at least the first signal processing parameter and the second signal processing parameter to be performed by the analysis engine;

receiving configuration data via the first user interface mechanism, the second user interface mechanism, and the third user interface mechanism; and storing the configuration data.

28. A method according to claim 27, wherein the plurality of signal processing data collection blocks includes signal processing data collection blocks implemented by at least one of a field device, a process controller, a data historian, and a workstation.

29. A method according to claim 27, wherein providing the first user interface mechanism comprises:

providing a fourth user interface mechanism to specify one device from the plurality of devices; and providing a fifth user interface mechanism to specify the first signal processing parameter from a first set of signal processing parameters generated by at least one signal processing data collection block implemented by the one device.

30. A method according to claim 29, wherein providing the fifth user interface mechanism comprises:

providing a sixth user interface device to specify one signal processing data collection block from a set of signal processing data collection blocks implemented by the one device; and providing a seventh user interface device to specify the first signal processing parameter from a second set of signal processing parameters generated by the one signal processing data collection block.

31. A method according to claim 27, wherein providing the third user interface mechanism comprises providing a fourth user interface mechanism to specify a comparison analysis to be performed with respect to the first signal processing parameter.

32. A method according to claim 31, wherein providing the third user interface mechanism comprises providing a fifth user interface mechanism to specify a value to be compared with the first signal processing parameter.

33. A method according to claim 31, wherein providing the third user interface mechanism comprises providing a fifth user interface mechanism to specify a third signal processing parameter to be compared with the first signal processing parameter.

34. A method according to claim 27, wherein providing the third user interface mechanism comprises providing a fourth user interface mechanism to specify a Boolean logic operation to be performed with respect to the first signal processing parameter and the second signal processing parameter.

35. A method according to claim 27, further comprising: providing a fourth user interface mechanism to specify an action to be taken if the analysis indicates a condition has been met;

wherein receiving configuration data comprises receiving configuration data via the fourth user interface mechanism.

36. A method according to claim 35, wherein providing the fourth user interface mechanism comprises providing the fourth user interface mechanism to specify an alert to be generated if the analysis indicates the condition has been met.

37. A method according to claim 35, wherein providing the fourth user interface mechanism comprises providing the fourth user interface mechanism to specify a control setting change if the analysis indicates the condition has been met.

38. A method according to claim 35, wherein providing the fourth user interface mechanism comprises providing the fourth user interface mechanism to specify a prompt for prompting an operator with one or more recommended actions to take if the analysis indicates the condition has been met.

39. A method according to claim 35, wherein providing the fourth user interface mechanism comprises providing the fourth user interface mechanism to specify at least one of a control condition change and a setpoint change if the analysis indicates the condition has been met.

40. A system for configuring an analysis engine to detect an abnormal condition associated with a process plant, the system comprising:

at least one processor communicatively coupled to a network associated with the process plant;

at least one computer readable memory communicatively coupled to the at least one processor;

a first routine stored on the at least one computer readable memory and adapted to be executed on the at least one processor to provide a first user interface mechanism to specify a first signal processing parameter from a plurality of signal processing parameters generated by a plurality of signal processing data collection blocks implemented by a plurality of devices associated with the process plant;

a second routine stored on the at least one computer readable memory and adapted to be executed on the at least one processor to provide a second user interface mechanism to specify a second signal processing parameter from the plurality of signal processing parameters generated by the plurality of signal processing data collection blocks implemented by the plurality of devices;

a third routine stored on the at least one computer readable memory and adapted to be executed on the at least one processor to provide a third user interface mechanism to specify an analysis of at least the first signal processing parameter and the second signal processing parameter to be performed by the analysis engine;

a fourth routine stored on the at least one computer readable memory and adapted to be executed on the at least one processor to receive configuration data via the first user interface mechanism, the second user interface mechanism, and the third user interface mechanism; and a fifth routine stored on the at least one computer readable memory and adapted to be executed on the at least one processor to store the configuration data.

41. A system according to claim 40, wherein the plurality of signal processing data collection blocks includes signal processing data collection blocks implemented by at least one of a field device, a process controller, a data historian, and a workstation.

* * * * *

UNITED STATES PATENT AND TRADEMARK OFFICE
CERTIFICATE OF CORRECTION

PATENT NO. : 7,079,984 B2
APPLICATION NO. : 10/971361
DATED : July 18, 2006
INVENTOR(S) : Evren Eryurek et al.

It is certified that error appears in the above-identified patent and that said Letters Patent is hereby corrected as shown below:

Title Page 3:

At field (56), Other Publications, right column, $2^{nd}$ reference, "Tzovia" should be --Tzovla--.

At field (56), Other Publications, right column, $7^{th}$ reference, "NOv." should be --Nov.--.

In the Drawings: Delete and substitute the attached sheets

At Sheet 13, Fig. 17, chart heading, "Explarer" should be --Explorer--.

At Sheet 18, Fig. 25, 246, "Measuurement" should be --Measurement--.

At Sheet 25, Fig. 35, heading, "Absoulte" should be --Absolute--.

At Sheet 30, Fig. 40, section 360, "Severty" should be --Severity--.

At Sheet 31, Fig. 41, section 376, "Severty" should be --Severity--.

At Sheet 33, Fig. 43, header for graph 385, "Explarer" should be --Explorer--.

In the Specification:

At Column 4, line 59, "then sent" should be --then be sent--.

At Column 5, line 34, "deice" should be --devices--.

At Column 5, line 64, "which," should be --which--.

At Column 9, line 9, "problems" should be --problems,--.

At Column 9, line 49, "the, plant" should be --the plant--.

At Column 9, lines 54-55, "recognize," should be --recognize--.

At Column 10, line 24, "devices 60" should be --devices 64--.

At Column 10, line 27, "devices 60" should be --devices 64--.

UNITED STATES PATENT AND TRADEMARK OFFICE
CERTIFICATE OF CORRECTION

PATENT NO. : 7,079,984 B2
APPLICATION NO. : 10/971361
DATED : July 18, 2006
INVENTOR(S) : Evren Eryurek et al.

It is certified that error appears in the above-identified patent and that said Letters Patent is hereby corrected as shown below:

In the Specification (cont'd):

At Column 10, line 31, "devices 60" should be --devices 64--.

At Column 10, line 36, "devices 60" should be --devices 64--.

At Column 10, line 52, "devices 60" should be --devices 64--.

At Column 10, line 58, "devices 60" should be --devices 64--.

At Column 10, line 60, "devices 60" should be --devices 64--.

At Column 10, lines 62-63, "devices 60" should be --devices 64--.

At Column 10, line 65, "devices 60" should be --devices 64--.

At Column 11, line 42, "devices 60" should be --devices 64--.

At Column 11, line 55, "devices 60" should be --devices 64--.

At Column 11, line 57, "devices 60" should be --devices 64--.

At Column 15, line 24, "type." should be --type--.

At Column 16, line 48, "that nodes" should be --that node--.

At Column 17, lines 13-14, "TRANSDUCERI300" should be --TRANSDUCER1300--.

At Column 18, line 9, "device. I01" should be --device 101--.

At Column 23, line 23, "Which" should be --which--.

At Column 24, line 20, "Versus" should be --versus--.

At Column 25, line 13, "time," should be --time--.

At Column 28, line 4, "not," should be --not--.

At Column 28, line 36, "makes is easier" should be --makes it easier--.

UNITED STATES PATENT AND TRADEMARK OFFICE
CERTIFICATE OF CORRECTION

PATENT NO. : 7,079,984 B2
APPLICATION NO. : 10/971361
DATED : July 18, 2006
INVENTOR(S) : Evren Eryurek et al.

It is certified that error appears in the above-identified patent and that said Letters Patent is hereby corrected as shown below:

In the Specification (cont'd):

At Column 32, line 13, "Vector" should be --vector--.

At Column 32, line 62, " changer" should be --change--.

At Column 34, line 39, "be, generated" should be --be generated--.

At Column 35, line 63, "ascertain" should be --a certain--.

At Column 39, line 31, "device," should be --device--.

At Column 40, line 22, "there into" should be --therein to--.

At Column 42, line 29, "described," should be --described--.

At Column 42, line 37, "other," should be --other--.

At Column 42, line 47, "or," should be --or--.

Signed and Sealed this

Fourth Day of December, 2007

JON W. DUDAS
*Director of the United States Patent and Trademark Office*

FIG. 41

Rule: Check for Measurement Drift in TT-212

Rule Name: Check for Measurement Drift in TT-212

If | Simple | Advanced

[[FT-102].[SMP 3].[Mean]>5 AND [FT-102].[SPM 3].[Mean]<95 AND [[FT-101].[SPM 1].[Status] = Mean_Change OR [FT-101].[SPM 3].[Status] = Mean_Change OR [FT-101].[SPM 4].[Status] = Mean_Change] AND [PT-103].[SPM 2].[Status]= No_Detections AND [PT-103].[SPM 4].[Status] =No_ Detections ADB Parameter | SPM Status | PLD Status | PV Status

AND | OR 7 8 9 /
4 5 6 x
1 2 3 -
0 . +

= <>
< >
<= >=
[ ]

Check Syntax | Clear

Then

Select Alert

Alert Name: Hot Water Outlet Temperature Measurement Drift
Severity: Maintenance
Message: You must re-calibrate the transmitter TT-212

OK | Cancel